US007249047B2

(12) United States Patent
Arguello et al.

(10) Patent No.: US 7,249,047 B2
(45) Date of Patent: Jul. 24, 2007

(54) EMPLOYEE TRANSFER AND LEAVE OPTIMIZATION PROCESSOR

(75) Inventors: Michael Francis Arguello, Austin, TX (US); Niem-Trung Luong Tra, Austin, TX (US)

(73) Assignee: Navitaire, Inc., Minneapolis, MN (US)

( * ) Notice: Subject to any disclaimer, the term of this patent is extended or adjusted under 35 U.S.C. 154(b) by 1119 days.

(21) Appl. No.: 10/045,806

(22) Filed: Jan. 10, 2002

(65) Prior Publication Data

US 2003/0139961 A1    Jul. 24, 2003

(51) Int. Cl.
*G06F 9/46*    (2006.01)
(52) U.S. Cl. .............................................. 705/9; 705/7
(58) Field of Classification Search .................... 705/7, 705/9
See application file for complete search history.

(56) References Cited

U.S. PATENT DOCUMENTS

| | | | | |
|---|---|---|---|---|
| 4,797,839 | A | 1/1989 | Powell ........................ | 364/554 |
| 5,265,006 | A | 11/1993 | Asthana et al. ............. | 364/401 |
| 5,450,317 | A | 9/1995 | Lu et al. ..................... | 364/402 |
| 5,794,224 | A | 8/1998 | Yufik .......................... | 706/14 |
| 5,802,161 | A * | 9/1998 | Svoronos et al. ...... | 379/216.01 |
| 5,911,134 | A * | 6/1999 | Castonguay et al. ........... | 705/9 |
| 6,064,981 | A | 5/2000 | Barni .......................... | 705/26 |
| 6,076,067 | A | 6/2000 | Jacobs et al. .................. | 705/7 |
| 6,078,912 | A | 6/2000 | Buerger ........................ | 707/1 |
| 6,161,097 | A | 12/2000 | Glass et al. ..................... | 705/6 |
| 6,192,346 | B1 * | 2/2001 | Green ............................ | 705/9 |
| 6,240,362 | B1 | 5/2001 | Gaspard, II .................. | 701/209 |
| 6,263,315 | B1 | 7/2001 | Talluri ........................... | 705/8 |
| 6,275,767 | B1 | 8/2001 | Delseny et al. ............. | 701/120 |
| 6,275,812 | B1 | 8/2001 | Haq et al. ..................... | 705/11 |
| 6,278,965 | B1 | 8/2001 | Glass et al. .................. | 703/22 |
| 6,292,806 | B1 | 9/2001 | Sandifer ..................... | 707/104 |
| 6,321,207 | B1 * | 11/2001 | Ye ................................ | 705/8 |
| 6,347,306 | B1 * | 2/2002 | Swart .......................... | 705/32 |
| 6,587,831 | B1 * | 7/2003 | O'Brien ........................ | 705/8 |

OTHER PUBLICATIONS

Beaumont, N. (1997a). "Scheduling Staff Using Mixed Integer Programming." European Journal of Operational Research 98(3), 473-484.*
Stiwell "Transfer decision making: different decision models depending on the transfer conditions", Dec. 1998, Journal of Organization Behavior, 19, pp. 539-557.*
Stojkovic et al "An Optimization Model for the Simultaneous Operation Flight and Pilot Scheduling Problem", Sep. 2001, Management Science vol. 47, No. 9 pp. 1290-1305.*
Bard, Jonathan F. *A Decomposition Approach to the Inventory Routing Problem with Satellite Facilities.* Nov. 1996, pp. 1-29.
*Class Scheduling for Pilot Training.* pp. 1-37.

(Continued)

*Primary Examiner*—Romain Jeanty
(74) *Attorney, Agent, or Firm*—Oppenheimer Wolff & Donnelly LLP

(57) ABSTRACT

An optimization processor which is parameter driven for generating plural solutions for employee transfer requests and leave requests for an entire enterprise in near real time from which an optimal solution avoiding compromises to future staffing requirements may be selected.

15 Claims, 25 Drawing Sheets

OTHER PUBLICATIONS

Bard, Johnathan F. *Class Scheduling For Pilot Training*. Jun. 2001; pp. 1-37.

Verbeek, Peter. Decision Support Systems—*An Application in Strategic Manpower Planning of Airline Pilots*. European Journal of Operational Research 55 (1991) 368-381.

Yu, Gang., et. al. *Optimized Pilot Planning and Training at Continental Airlines*.

Jarrah, A, et. al. *A Decision Support Framework for Airline Flight Cancellations and Delays*. Transportation Science, vol. 27, Aug. 1993.pp. 266-280.

Rakshit, A., et. al. *System Operations Advisor: A Real-Time Decision Support System for Managing Airline Operations at United Airlines*. Interfaces 26: 2 Mar.-Apr. 1996 (pp. 50-58).

Haase, Knut. *Course Planning at Lufthansa Technical Training: Constructing More Profitable Schedules*. Interfaces 29: 5 Sep.-Oct. 1999 (pp. 95-109).

\* cited by examiner

EMPLOYEE TRANSFER AND LEAVE OPTIMIZATION PROCESSOR

FIELD OF THE INVENTION

The invention relates generally to decision support systems, and more specifically to an employee transfer and leave optimization processor designed to process employee transfer and leave requests, award a subset of the requests, and provide location assignments for new hires such that required staffing levels for a target time period are achieved, staffing requirements for future time periods are not compromised, the quantity of awarded higher preference requests is maximized, and employee seniority is respected.

BACKGROUND OF THE INVENTION

An organization may have several locations from which it provides goods or services, and thus require employees in each location for a specific time period to support its objectives.

Each employee may request a transfer to one or more locations for a next time period. An awarded transfer request entitles the associated employee to commence an assignment at the awarded location at the start of the next time period. Until the end of the current time period, the employee remains at its current location.

Each employee may also request a leave of absence for the next time period. An awarded leave of absence request entitles the associated employee to take time off without pay for part or all, depending on the awarded leave type, of the next time period. Leave types consist of full period leaves, first half period leaves, last half period leaves, and jobshares. A full period leave provides time off for the entire time period. A first half period leave provides time off for the first half of the time period. A last half period leave provides time off for the last half of the time period. A jobshare consists of two employees who have designated each other as jobshare partners who share the work responsibilities of one person; it is the equivalent of a full period leave for one person.

The quantity of employees required at each location may vary from one time period to another. The organization determines how many employees will be required for the next time period. By awarding transfer requests, the organization is able to move employees from locations where fewer employees may be required to locations where more employees are required. Similarly, by awarding leaves of absence, the organization may temporarily reduce the number of employees at a location where fewer employees are required.

However, system-wide employee seniority is a factor that complicates transfer and leave processing. Let every employee have a unique seniority ranking. For any two employees making the same request, such as a transfer to the same location or for a particular leave type at the same location, the junior employee may not be awarded the request if the senior employee is not awarded the request.

During organization expansion, new hires may be added by the organization to the employee pool. The transfer and leave optimization processor also places new hires at locations that need additional staffing. In order to do so, and due to seniority requirements, it must assure that for every location to which a new hire is assigned, the most junior employee requesting a transfer to that location is granted its request.

An organization that faces the challenge of employees distributed across several locations who not only request transfers to other locations, but also request leaves of absence is Continental Airlines. At Continental Airlines, 9000 flight attendants are domiciled at three domestic, two international, and eleven language speaker bases. Through contractual rights, the flight attendants are permitted to request transfers from their current base to other bases within the Continental Airlines system. Flight attendants are also permitted to request full period leaves, jobshares, first half period leaves, and last half period leaves. As an organized union, the flight attendants of Continental Airlines adhere strictly to seniority requirements. Thus the rights and privileges afforded through seniority with respect to transfer and leave awards are enforced without exception.

At Continental Airlines, the time periods utilized are bid periods which approximate calendar months. In every bid period, approximately 5% of the flight attendant population has a transfer request on file, and approximately 5% of the flight attendant population has a leave request on file. By the $15^{th}$ day of the calendar month preceding the start of the next bid period, Continental management is required to post the transfer and leave awards for the next bid period. Before doing so, management personnel determine the staffing levels required for the next bid period relative to the current bid period. Anecdotal evidence suggests that flight attendant utilization increases when they are domiciled where they prefer. Thus, there is a desire to award as many transfer requests as possible to increase flight attendant utilization and productivity. This evidence also suggests that flight attendant morale and reliability increases when leaves are granted. when flight attendants are awarded their requests, the entire population of flight attendants benefit through higher morale and fewer unplanned absences. With the flight attendant transfer and leave requests on file, knowledge of oncoming new hires, and knowledge of the required staffing levels for the next bid period, management must balance a desire to award as many transfer and leave requests as possible with the operational necessity to staff correctly and abide by seniority obligations.

Highly skilled Continental flight attendant management personnel with expert knowledge require from several hours to days to manually generate a single set of transfer and leave awards and new hire assignments. In general, the solution adopted in such a time consuming effort is the first that is obtained. Because of the time consuming manual process, there is little opportunity to generate multiple solutions and determine which one best satisfies not only the staffing requirements for the next bid period, but also puts the airline in the best staffing position beyond the next bid period.

Prior art, such as the Pilot Training Optimization System offered commercially by CALEB Technologies Corp. of Austin, Tex., and the paper entitled, "Moving Toward An Integrated Decision Support System For Manpower Planning At Continental Airlines: Optimization Of Pilot Training Assignments", by Gang Yu, Stacy Dugan, and Michael Arguello, Industrial Applications of Combinatorial Optimization, edited by Gang Yu, Jan. 24, 1998, Kluwer Academic Publishers, Boston Mass., solve unrelated problems. Such prior art systems focus on scheduling the advancement of pilots for training and future positions with respect to required staffing levels at each position. These systems are primarily interested in determining the timing of employee transitions which are already awarded to the employees.

In contrast, the problem addressed by this invention determines how to award transfers and leaves, and which combination of awarded transfers and leaves best meets the required staffing levels.

The invention described herein provides a means to generate a solution in seconds to a few minutes, and thus in near real time. The employee transfer and leave optimization processor in accordance with the invention is parameter driven in that parameter values and configuration settings may be varied to control the optimization processor. The parameters include the minimum and maximum quantity of awarded transfers into and out of specific locations, the minimum and maximum quantity of awarded leaves by type at specific locations, indicators allowing new hires into specific locations, indicators requiring transfer requests to be cleared (i.e., the most junior request is awarded) into specific locations, an indicator whether to process only transfer requests, an indicator whether to process only leave requests, and an indicator specifying that the required staffing levels be met exactly for the next time period. Because the invention is parameter driven, it can be executed several times with different parameter settings to generate a variety of solutions. With several solutions in hand, a user can converge towards solutions that were not previously attainable through their manual process.

The invention as described herein has been developed by CALEB Technologies Corp. of Austin, Tex., as part of an integrated decision support system. The system manages large volumes of data and employs state-of-the-art optimization modeling and solution techniques to efficiently allocate human and training resources, and attain optimal operational and cost effective performance.

SUMMARY OF THE INVENTION

An automated, parameter driven optimization process and system for near real-time generation of multiple sets of employee transfer and leave awards, new hire location assignments, and last half period new hire location assignments such that required staffing levels for the target time period are achieved, the quantity of awarded higher preference employee transfer requests and leave requests is maximized, and employee seniority restrictions are enforced.

In one aspect of the invention, employee data and transfer and leave requests, and problem specific parameter values and configuration settings received from a user are represented in C++ objects, and sorted into segregated lists from which variables and constraints are generated to produce a mixed integer programming model.

In another aspect of the invention, a solution is generated for a problem related solely to transfer requests and new hire assignment processing. User set configuration settings may indicate that a solution is sought only with respect to transfer request and new hire assignment processing. In this case, a solution that best meets each location's staffing requirements with awarded transfer requests and new hire assignments is obtained.

In still another aspect of the invention, a solution is generated for a problem related solely to leave requests. User set configuration settings may indicate that a solution is sought only with respect to leave request processing. In this case, a solution that best meets each location's staffing requirements with awarded leave requests is obtained.

In yet another aspect of the invention, a user may set configuration settings for a full solution relating to transfer requests, leave requests, new hire location assignments, and last half period new hire location assignments. In this case, a solution that best meets each location's staffing requirements with a combination of awarded transfer requests, awarded leave requests, new hire location assignments, and last half period new hire location assignments is obtained.

In a further aspect of the invention, a process is provided for enforcing seniority restrictions for all solutions through the generation of seniority processing constraints, constraints for clearing transfer lists, and constraints for allowing new hires into a location. Such constraints are applied by traversing C++ objects representing the locations and employee transfer and leave requests. Specific constraints such as the transfer seniority processing constraints, the full period leave seniority processing constraints, the half period leave seniority processing constraints, the transfer/full period leave seniority processing constraints, and the transfer/half period leave seniority processing constraints insure that seniority restrictions are enforced for all awarded transfer requests, all awarded leave requests, and all combinations of awarded transfer and leave requests. The constraints for clearing transfer lists and allowing new hires into a location further enforce seniority restrictions so that new hires are assigned only to locations where existing employees have already been awarded their transfer requests.

In still a further aspect of the invention, the achievement of required staffing levels is accomplished through both the generation of exact staffing constraints and the generation of approximate staffing constraints, along with the use of transfer understaffing and overstaffing variables and leave under-awarding and over-awarding variables, to penalize deviations to the staffing requirements in the objective function of the mixed integer programming model.

In yet a further aspect of the invention, multiple alternative solutions may be generated by modifying each of the following: the configuration settings including an indicator requiring the processing of employee transfer requests, an indicator requiring the processing of leave requests, an indicator requiring the exact matching of staffing levels at all locations, an indicator requiring the clearance of transfer lists into one or more specified locations, and an indicator allowing the assignment of new hires to one or more specified locations, and parameter values including one or more of the required staffing levels for each location, minimum quantity of awarded transfers into specified locations, maximum quantity of transfers permitted into specified locations, minimum quantity of awarded transfers out of specified locations, maximum quantity of transfers permitted out of specified locations, minimum quantity of awarded full period leaves at specified locations, maximum quantity of full period leaves permitted at specified locations, minimum quantity of awarded first half period leaves at specified locations, maximum quantity of first half period leaves permitted at specified locations, minimum quantity of awarded last half period leaves at specified locations, maximum quantity of last half period leaves permitted at specified locations, the quantity of unassigned new hires, the quantity of unassigned last half period new hires, and the quantity of user-assigned last half period new hires to specified locations.

In an additional aspect of the invention, the transfer and leave optimization problem is represented by a mixed integer programming model comprised of an objective function with variables and constraints which is simplistic enough for commercial software solution.

In still an additional aspect of the invention, the solution of the mixed integer programming model is optimized by maximizing the objective function of the model and producing the greatest value within a region defined by the constraints of the mixed integer programming model.

In yet an additional aspect of the invention, the invention is a parameter driven system (e.g., parameter values and configuration settings may be varied) to conduct what-if analysis of several operating scenarios, and determine the impact of the optimized transfer and leave award solutions on the ability to staff appropriately for each scenario.

BRIEF DESCRIPTION OF THE DRAWINGS

Additional objects, features, and advantages of the present invention will become apparent from the following detailed description when read in conjunction with the accompanying drawings in which.

DESCRIPTION OF PREFERRED EMBODIMENTS

Figure 1:
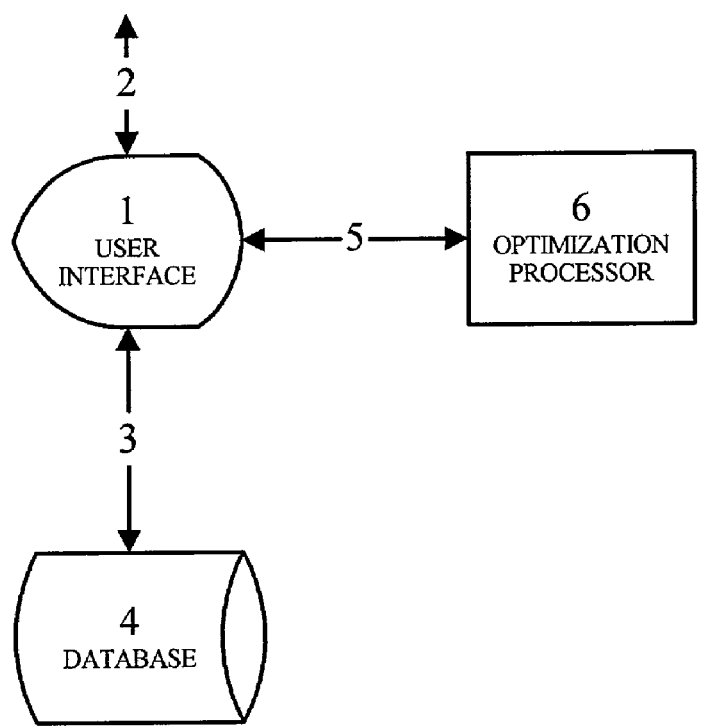
FIG. 1 is a functional block diagram of an employee transfer optimization system in accordance with the invention.

Preferred embodiments of the invention will now be described with reference to the accompanying drawings. In the description, the following terms, whether capitalized or in lower case, shall have the attendant meanings set forth in Table I below:

TABLE I

| TERM | DEFINITION |
| --- | --- |
| Value | The quantity or amount for which a numerical representation stands. |
| Objective Function Coefficient Value | The quantity or amount prefixed as a multiplier for a decision variable in an objective function. |
| Seniority Value | A numerical representation of an employee's seniority. |
| Decision Variable Value | The quantity or amount assigned to a decision variable in a mathematical model. |
| Higher Preference | The distinction of preference within a request. An employee may have a primary transfer request and a secondary transfer request. The primary request is a higher preference than the secondary request. Similarly, an employee may have a primary leave request, a secondary leave request, a third preference leave request, and a fourth preference leave request. The primary request is a higher preference than the secondary request, third preference request, and fourth preference. The secondary request is a higher preference than the third preference request and fourth preference request. The third preference request is a higher preference than the fourth preference request. |

TABLE I-continued

| TERM | DEFINITION |
| --- | --- |
| Bid Period | A time period. In some organizations it approximates a calendar month. |
| Award | A granted, allowed, or awarded transfer request or leave request. |
| Target Time Period | A time period for which transfer requests and leave requests are processed. Transferred employees commence their tenure at a location at the beginning of the target time period. Awarded leave requests are specifically and exclusively for the target time period. |
| Parameter Data | Parameter values: the required staffing levels for each location, minimum quantity of awarded transfers into specified locations, maximum quantity of transfers permitted into specified locations, minimum quantity of awarded transfers out of specified locations, maximum quantity of transfers permitted out of specified locations, minimum quantity of awarded full period leaves at specified locations, maximum quantity of full period leaves permitted at specified locations, minimum quantity of awarded first half period leaves at specified locations, maximum quantity of first half period leaves permitted at specified locations, minimum quantity of awarded last half period leaves at specified locations, maximum quantity of last half period leaves permitted at specified locations, the quantity of unassigned new hires, the quantity of unassigned last half period new hires, and the quantity of user-assigned last half period new hires to specified locations. |
| Configuration Data | Configuration settings: an indicator requiring the processing of employee transfer requests, an indicator requiring the processing of leave requests, an indicator requiring the exact matching of staffing levels at all locations, an indicator requiring the clearance of transfer lists into one or more specified locations, and an indicator allowing the assignment of new hires to one or more specified locations. |
| Under-Awarding Quantity | The amount of a specific leave type for a specific location that is not awarded, resulting in the overstaffing of employees at the location. |
| Over-Awarding Quantity | The amount of a specific leave type for a specific location that is awarded in excess of the amount required to satisfy the staffing requirement, resulting in the understaffing of employees at the location. |
| Constraint Matrix | A representation within a mathematical model of the decision variable constraint coefficients. |
| Last Half Period New Hire Assignments | The location assignments for new hires who become available as employees during the last half of the target time period. |
| Clearing Constraints | The constraints designed to clear a location's inbound transfer list. These constraints function to award transfers into a location as if new hires are assigned to the location without having to actually make new hire assignments to the location. |
| Penalize Deviations | A technique for allowing the awarding of transfer requests and leave requests that do not satisfy the staffing requirement for a location, but make such a deviation in the required staffing level undesirable through a penalty term in the objective function. |
| Optimum Solution | A set of decision variable values within an optimization-based mathematical model that satisfy the corresponding objective function and associated constraints. |
| Decision Variable | A representation of a transfer request, leave request, new hire location assignment, and last half period new hire location assignment in a mathematical model. |
| Feasible, Infeasible | A solution for a mathematical model is feasible if it satisfies the constraints associated with the mathematical model. A solution for a mathematical model is infeasible if it does not satisfy at least one of the constraints associated with the mathematical model. A mathematical model is infeasible if there does not exist any solution that is feasible for the mathematical model. |
| Slack Variable | A variable used within a mathematical model to represent looseness within a constraint. It is used within the invention herein as a mechanism for awarding first half period leaves and last half period leaves in compensation for the lack of sufficient full period leave awards for a location. |
| Container | A generic collection of items. In software programming, examples of a container include a list, vector, or set. |
| Sense | The type of a mathematical expression. Greater than (=) is a type using the = symbol. Equality (=) is a type using the = symbol. Less than (=) is a type using the = symbol. |
| Right Hand Side | The value or expression that follows the sense of a constraint when written mathematically. |
| Staffing Deficit | The amount of additional employees needed to meet the staffing requirement at a location for the target time period. |

Referring to FIG. 1, a functional block diagram of the environment in which the invention operates is shown, where a user interface 1 is in electrical communication with a user by way of a bi-directional communication path 2. The user interface 1 is in electrical communication by way of a bi-directional communication path 3 with a database 4 containing employee data and transfer requests. When requested through communication path 2, the user interface 1 displays the employee data and transfer requests. The user interface 1 receives parameter values and configuration settings, and modifications to transfer and leave requests and the parameter values and configuration settings from the user through communication path 2. The user interface 1 also receives from a user through communication path 2 a request to solve the employee transfer and leave optimization problem for the current employee data and transfer and leave requests, and the current parameter values and configuration settings.

In response to a user request, the user interface 1 transmits over a bi-directional electrical communication path 5 using an XML-based transaction protocol via HTTP over TCP/IP, the employee data, the transfer and leave requests, and the parameter values and configuration settings to the optimization processor 6. In the preferred embodiment, the user optimization processor 6 is deployed on a Compaq ProLiant Server with 4 Pentium m 550 Mhz processors. The user interface 1, database 4, and optimization processor 6 are part of a computer system operating under the Microsoft Windows 2000 Advanced Server Operating System, and the database 4 is a Microsoft SQL Server 2000 relational database. It is to be understood that the user interface 1 and the optimization processor 6 may each be a microprocessor.

The optimization processor 6 in the preferred embodiment implements optimization-based methods and algorithms to generate an optimal solution for the received employee data, transfer and leave requests, and parameter values and configuration settings, and translates the XML data into structures suitable for internal use. The optimization processor 6 also generates an optimal solution for the received input, translates the solution into XML output, and returns to the user interface 1 the problem solution comprised of identification of the awarded transfer and leave requests, and the new hire location assignments, through communication path 5 using an XML-based transaction protocol via HTTP over TCP/IP.

The results obtained by the optimization processor 6 are received by the user interface 1, which translates the XML data and displays for the user the awarded transfer and leave requests, and reports the new hire location assignments.

The problem specification created by a user through the user interface 1 and transmitted to the optimization processor 6 consists of the following data: for each employee with one or more transfer requests: the employee's identification, seniority value, current location, primary transfer preference, and, if applicable, secondary transfer preference; for each employee with one or more leave requests: the employee's identification, seniority value, current location, primary and up to three alternate leave preferences (see Table II for list of all possible leave request preference sequences), and, if applicable, the identification of a jobshare partner; parameter values including the required staffing level for each location, quantity of last half period new hires assigned to specified locations, minimum quantity of awarded transfers into specified locations, maximum quantity of transfers permitted into specified locations, minimum quantity of transfers permitted out of specified locations, maximum quantity of transfers permitted out of specified locations, minimum quantity of awarded full period leaves for specified locations, maximum quantity of permitted full period leaves for specified locations, minimum quantity of awarded first half period leaves for specified locations, maximum quantity of permitted full period leaves for specified locations, minimum quantity of awarded last half period leaves for specified locations, maximum quantity of permitted last half period leaves for specified locations, a value representing the quantity of unassigned new hires requiring assignments, and a value representing the quantity of unassigned last half period new hires requiring assignments; and configuration settings including an indicator requiring transfer request processing, an indicator requiring leave request processing, an indicator requiring staffing levels to be matched exactly at all locations, an indicator allowing new hires into specified locations, and an indicator requiring the inbound transfer lists to be cleared for specified locations. Given this data, the optimization processor 6 is capable of solving the employee transfer and leave optimization problem.

The optimization processor 6 uses this data to generate a solution consisting of a set of awarded transfer and leave requests, and determine the quantity of new hires and last half period new hires assigned to specific locations. The solution is generated such that the combination of awarded primary transfer requests, awarded secondary transfer requests, awarded primary leave requests, awarded secondary leave requests, awarded third preference leave requests, and awarded fourth preference leave requests (with special emphasis towards primary transfer requests and higher preference leave requests) is maximized.

TABLE II

LIST OF ALL LEAVE SEQUENCE REQUESTS

| | |
|---|---|
| <jobshare> | <last half, first half> |
| <full period> | <last half, full period> |
| <first half> | <either half, full period> |
| <last half> | <jobshare, first half, last half> |
| <either half> | <jobshare, first half, full period> |
| <jobshare, full period> | <jobshare, last half, first half> |
| <jobshare, first half> | <jobshare, last half, full period> |
| <jobshare, last half> | <jobshare, either half, full period> |
| <jobshare, either half> | <full period, first half, last half> |
| <full period, first half> | <full period, last half, first half> |
| <full period, last half> | <first half, last half, full period> |
| <full period, either half> | <last half, first half, full period> |
| <first half, last half> | <jobshare, first half, last half, full period> |
| <first half, full period> | <jobshare, last half, first half, full period> |

Based on the above information, a solution comprised of awarded transfer and leave requests, and new hire location assignments, is produced with the following constraints:

i. If the staffing indicator is set to specify that the staffing levels must be matched exactly, the solution either leaves no staffing shortfall for any location, or concludes with a null solution of no awards and no new hire location assignments to indicate that the underlying employee transfer and leave problem was infeasible and that the required staffing levels are not possible to achieve in one or more locations.

ii. If the staffing indicator is set to specify that the staffing levels need not be matched exactly, the solution will match the staffing levels at each location as closely as reasonably possible with a penalty being applied for deviations.

iii. Seniority requirements are strictly enforced.

Specifically, for any two employees with single transfer requests to the same location, awarding the request to the junior employee implies that the senior employee must also be awarded the request. Conversely, if the senior employee is not awarded the request, then the junior employee may not be awarded the request. Additionally, for any two employees requesting a transfer to the same location but with the senior employee having two requests, if the request to the same location is the senior employee's primary request, then awarding the request to the junior employee implies that the senior employee must be awarded its primary request; if the request to the same location is the senior employee's secondary request, then awarding the request to the junior employee implies that the senior employee is awarded one of its primary or secondary requests. Conversely, if the senior employee is not awarded its primary request, then no employee junior to the senior employee may be awarded the same request. Also, if the senior employee is not awarded either of its two requests, then no employee junior to the senior employee may be awarded a request to either of the senior employee's two requested locations. Furthermore, for any two employees requesting a transfer to the same location, but with the junior employee having two requests, if the senior employee is not awarded any request, then the junior employee may be awarded a request as long as the senior employee did not have a request for the junior employee's awarded location.

Similarly, for any two employees with single leave requests, each of the same type at the same location, awarding the request to the junior employee implies that the senior employee must also be awarded the request. Conversely, if the senior employee is not awarded the request, then the junior employee may not be awarded the request. For any two employees with leave requests of the same leave type at the same location, but with the senior employee having alternate leave requests, if the common leave type is the senior employee's primary preference, then awarding the request to the junior employee implies that the senior employee must be awarded the leave request; if the common leave type is one of the senior employee's alternate requests, then awarding the request to the junior employee implies that the senior employee is awarded one of its primary or alternate requests. Conversely, if the senior employee is not awarded its primary leave request, then no employee junior to it may be awarded the same request; also, if the senior employee is not awarded any of its leave requests, then no employee junior to it may be awarded any of the leaves denied to the senior employee. Furthermore, for any two employees with at least one common leave request at the same location, if the senior employee is not awarded any request, the junior employee may be awarded a request that was not denied to the senior employee.

iv. No employee will be awarded more than one transfer request.

v. An employee is awarded a leave request for a location.

vi. No employee will be awarded more than one leave request.

vii. An employee awarded a leave request and a transfer request is awarded the leave at the location of the awarded transfer. An employee with both transfer requests and leave requests is implicitly requesting the leave for the location to which it will be assigned, its current location or a transfer location. Thus leave requests are considered for the employee's current location and for each of the employee's transfer locations. However, jobshare requests are not transferable, and are thus only valid at an employee's current location.

viii. For all locations requiring their inbound transfer lists to be cleared, every employee requesting a transfer to such a location must be awarded exactly one transfer request. Furthermore, all employees whose primary transfer request is to such a location must be awarded their primary transfer request.

ix. If a location allows new hire assignments, and one or more new hires are assigned to such a location, then every employee requesting a transfer to that location must be awarded exactly one transfer request. Furthermore, every employee whose primary transfer request is for that location must be awarded its primary transfer request.

x. If the minimum quantity of awarded transfers into a location is not null, then the sum of all awarded requests into the location must be at least the specified minimum for the location.

xi. If the maximum quantity of transfers permitted into a location is not null, then the sum of all awarded requests into the location may not exceed the specified maximum for the location.

xii. If the minimum quantity of awarded transfers out of a location is not null, then the sum of all awarded requests out of the location must be at least the specified minimum for the location.

xiii. If the maximum quantity of transfers permitted out of a location is not null, then the sum of all awarded requests out of the location may not exceed the specified maximum for the location.

xiv. If the minimum quantity of awarded full period leaves for a location is not null, then the sum of all awarded full period leave requests at the location must be at least the specified minimum for the location.

xv. If the maximum quantity of permitted full period leaves for a location is not null, then the sum of all awarded full period leave requests at the location may not exceed the specified maximum for the location.

xvi. If the minimum quantity of awarded first half period leaves for a location is not null, then the sum of all awarded full period leave requests at the location must be at least the specified minimum for the location.

xvii. If the maximum quantity of permitted first half period leaves for a location is not null, then the sum of all awarded full period leave requests at the location may not exceed the specified maximum for the location.

xviii. If the minimum quantity of awarded last half period leaves for a location is not null, then the sum of all awarded full period leave requests at the location must be at least the specified minimum for the location.

xix. If the maximum quantity of permitted last half period leaves for a location is not null, then the sum of all awarded full period leave requests at the location may not exceed the specified maximum for the location.

xx. Unassigned new hires will be assigned to locations allowing new hires. Unassigned new hires are assumed to impact the staffing at a location for the entire time period. Unassigned new hires may be assigned only in the case when transfer requests are to be processed and in the case when both transfer requests and leave requests are to be processed.

xxi. Unassigned last half period new hires will be assigned to locations allowing new hires. Unassigned last half period new hires are assumed to impact the staffing at a location only for the last half of the time period. Unassigned new hires may be assigned only in the case when both transfer requests and leave requests are to be processed.

xxii. An employee requesting an "either half" period leave request will have the request represented as two preferences, one for first half period leave and the other for last half period leave, at the same priority. For example, an employee requesting a leave with primary preference of "either half" period leave and secondary preference of full period leave will be represented by a primary first half period leave request, another primary last half period leave request, and a secondary full period leave request.

It may be possible that for the input received by the optimization processor 6, a feasible solution does not exist. This may occur if: the staffing levels are required to be matched exactly and no combination of allowable transfer and leave awards and new hire assignments can achieve the specified staffing level at one or more locations; it is not possible to award the minimum quantity of transfers into a location with a non-null specified minimum quantity; it is not possible to award the minimum quantity of transfers out of a location with a non-null specified minimum quantity; it is not possible to award the minimum quantity of full period leaves at a location with a non-null specified minimum quantity; it is not possible to award the minimum quantity of first half period leaves at a location with a non-null specified minimum quantity; it is not possible to award the minimum quantity of last half period leaves at a location with a non-null specified minimum quantity; a non-null specified minimum exceeds the corresponding non-null specified maximum for one or more transfer locations; a non-null specified minimum exceeds the corresponding non-null specified maximum for one or more leave types at a location; any non-null specified minimum or maximum or combination thereof are in conflict with each other (e.g., limiting the quantity of awarded transfer requests out of a location may prohibit the ability to award a minimum quantity of transfer requests into another location; requiring a minimum quantity of awarded full period leaves may prohibit the ability to award a minimum quantity of first half period leaves at a location); any non-null specified minimum or maximum or combination thereof are in conflict with the requirement to match a staffing level exactly (e.g., limiting the quantity of awarded transfer requests into a location may prohibit the ability to match the required staffing level for that location; limiting the quantity of awarded full period leave requests may prohibit the ability to match the required staffing level for the location). For such cases, the optimization processor 6 returns a null solution and a status indicating the input problem was infeasible.

The output produced by the optimization processor 6 and transmitted back to the user interface 1 consists of: a status indicating success or failure in generating a solution; for every employee awarded a transfer request, the employee's identification, seniority value, current location, and awarded location; for every employee awarded a leave request, the employee's identification, seniority value, awarded leave type, and jobshare partner identification, if applicable; and for every location, the location's identification, quantity of awarded transfers into the location, quantity of awarded transfers out of the location, quantity of awarded full period leaves at the location, quantity of first half period leaves at the location, quantity of last half period leaves at the location, quantity of new hires assigned to the location, and quantity of last half period new hires assigned to the location.

The invention described and claimed below resides in the optimization processor 6 in the form of a software program for developing, solving, and interpreting the results of a mixed integer programming model that provides an optimized solution for the employee transfer and leave optimization problem.

Figure 2:
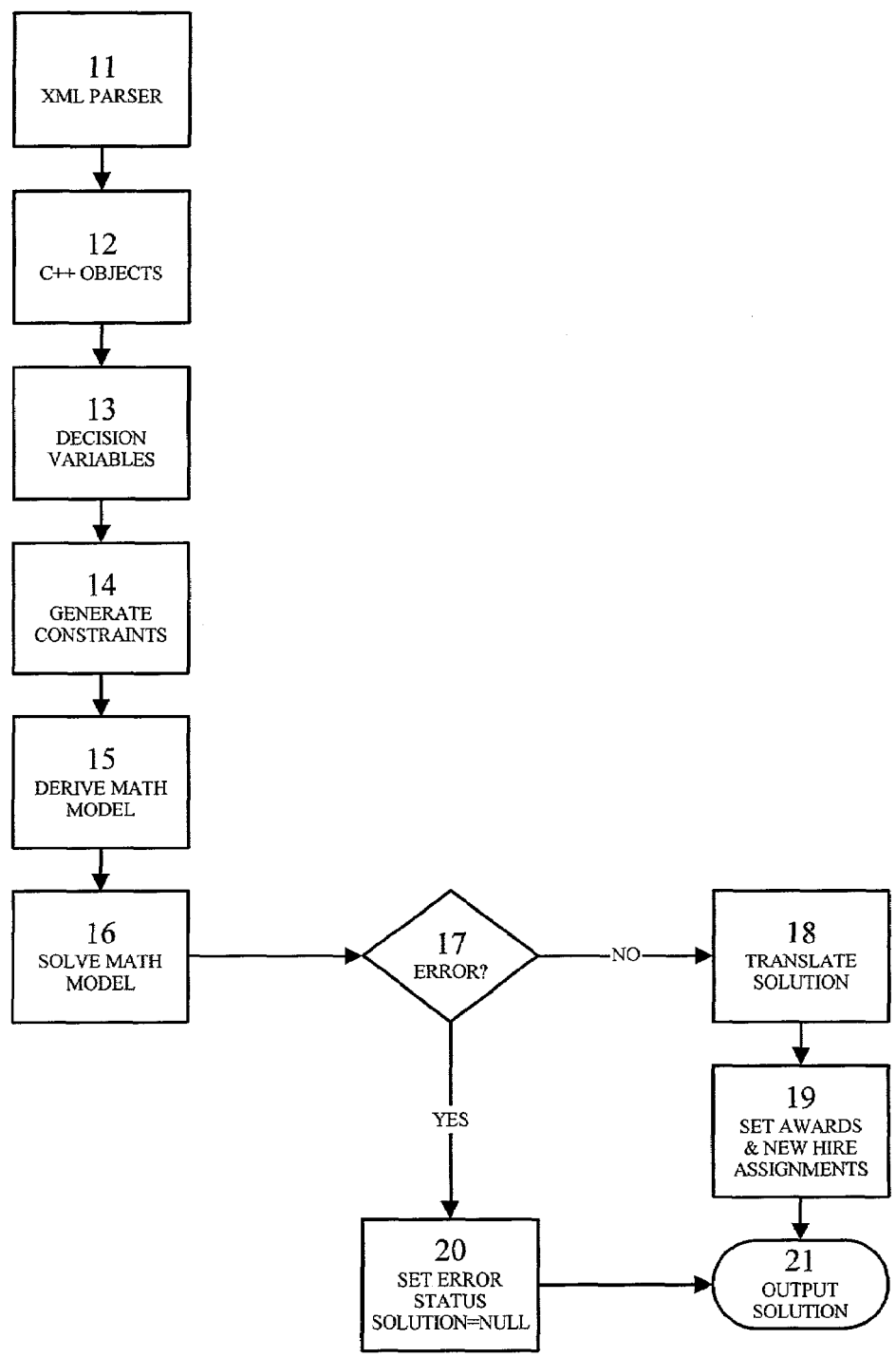
FIG. 2 is a logic flow process diagram of the optimization processor 6 of FIG. 1.

Referring to FIG. 2, a logic flow process diagram of the process performed by the optimization processor 6 of FIG. 1 in generating an optimized solution for the employee transfer and leave optimization problem is illustrated. Through the logic steps in the logic flow process diagram of FIG. 2, input data is processed to create a mixed integer program model representing the employee transfer and leave optimization problem. The mixed integer program model thereafter is solved and a solution is obtained and sent to the user interface 1 of FIG. 1.

The process begins at logic step 11 where the input received from the user interface 1 of FIG. 1 is processed through an XML parser. The input is converted into temporary data structures as the logic flow process proceeds to logic step 12, where the temporary data structures are converted to C++ objects representing employees, transfer requests, leave requests, locations, and non-location specific configuration data. This representation will be used to create a mixed integer programming model of the form:

| Maximize | cx | (objective) |
|---|---|---|
| subject to | Ax = b | (constraints) |
| | x ≧ 0 | (bounds) |

This is a model comprised of an objective function to maximize some utility over a set of decision variables x, subject to a constraint set defining relationships and associations among the decision variables, and bounds on the values that the decision variables may take. The actual models developed to solve the employee transfer and leave optimization problem herein are more restrictive than the form displayed above, in that some of the decision variables are restricted to binary, zero or one, values, and some are restricted to non-negative integer values. The objective value coefficients c, are determined upon decision variable creation as are the bounds.

It should be noted that the constraint set represented by the equation Ax=b is truly a series of expressions, one for each constraint, in which a non-zero coefficient for a decision variable within a constraint implies that the decision variable is included in the constraint. Additionally, the equality in the equation Ax=b is symbolic of the sense of the constraints in the constraint set. In practice, each constraint will have its own specific sense, greater than ($=$), less than ($=$), and equality ($=$). Furthermore, a right hand side value b, must be determined for each specific constraint. Thus, the generation of a constraint is comprised of the retrieval of the decision variables to be included in the constraint, determination of their associated coefficients within the constraint, and determination of the sense for the constraint and its right hand side value. The following expressions illustrate the decomposition of the equation Ax=b into the constraint set.

$$Ax = b \Rightarrow \begin{bmatrix} [A_1] \\ [A_2] \\ [A_3] \end{bmatrix} \begin{bmatrix} \\ x \\ \end{bmatrix} \begin{matrix} \leq [b_1] \\ = [b_2] \\ \geq [b_3] \end{matrix} \Rightarrow \begin{matrix} A_1 x \leq b_1 \\ A_2 x = b_2 \\ A_3 x \geq b_3 \end{matrix}$$

A simple example will serve to illustrate this concept. Let the following represent some optimization problem.

| | |
|---|---|
| Maximize | $2x_1 + 3x_2 - 4x_3$ |
| subject to | $x_1 + x_2 + x_3 \leq 2$ |
| | $x_1 - x_2 + x_3 = 0$ |
| | $x_1 + x_3 \geq 1$ |
| | $x_1, x_2, x_3 \in \{0,1\}$ |

This problem may be modeled as follows.

$$c = \begin{bmatrix} 2 & 3 & -4 \end{bmatrix}, \quad x = \begin{bmatrix} x_1 \\ x_2 \\ x_3 \end{bmatrix}, \quad b = \begin{bmatrix} 2 \\ 0 \\ 1 \end{bmatrix},$$

$$A = \begin{bmatrix} 1 & 1 & 1 \\ 1 & -1 & 1 \\ 1 & 0 & 1 \end{bmatrix} = \begin{bmatrix} [1 \; 1 \; 1] \; A_1 \\ [1 \; -1 \; 1] = A_2 \\ [1 \; 0 \; 1] \; A_3 \end{bmatrix}$$

Thus constraint generation is comprised of the retrieval of the decision variables to be included in each constraint, determination of their associated coefficients within the constraint, and determination of the sense for the constraint and its right hand side value.

The logic flow process of FIG. 2 continues from logic step 12 to logic step 13 where a representation of the decision variables for the mixed integer program model is created, and each decision variable is associated with an objective function coefficient value. The decision variables each represent specific employee transfer requests, leave requests, the quantity of new hires and last half period new hires to be assigned to allowable locations, the understaffing and overstaffing quantities for each location, and the leaves underawarding and over-awarding quantities for each location. The C++ objects obtained in logic step 12 and the decision variables created in logic step 13 are used in logic step 14 to generate the constraints for the mixed integer program model. At this point, all of the information necessary to build a mixed integer program model is contained in the C++ objects. All decision variables have been created, their coefficients in the objective function are determined upon creation, and their coefficients in the constraint matrix are determined through the constraint generation procedures represented by logic step 14 and illustrated in more detail in FIG. 4. Thus associated with each decision variable are its coefficients in the objective function and constraint matrix. Additionally, a C++ structure representing each constraint contains information about its sense (less than, greater than, equal) and its right hand side values.

From logic step 14 of FIG. 2, the process continues onto logic step 15 where the actual mixed integer program model representation is created from the C++ objects representing decision variables and constraints. The information contained in the decision variables and constraints is translated into a format acceptable to commercially available software development kits and runtime libraries capable of solving general mixed integer program mathematical models. The process next proceeds to logic step 16 where the formatted mixed integer program model is passed for solution into a commercial software runtime library such as ILOG Concert Technology 1.0 and ILOG CPLEX 7.0 sold by ILOG, Inc. of Paris, France. Solution of the mixed integer program model consists of a status indicating optimality, and the decision variable values for the optimal solution.

From logic step 16, the logic flow process advances to logic step 17 where the optimality status of the solution is inspected. If the optimality status indicates an error, the logic flow process moves to logic step 20 where the error status is formatted, and passed to logic step 21 for output to the user interface 1 of FIG. 1.

Referring back to FIG. 2, if at logic step 17 it is observed that a solution was generated successfully for the mixed integer program model, then the logic flow process proceeds from logic step 17 to logic step 18 where the solution's non-zero decision variable values are placed back onto their corresponding C++ objects. From logic step 18, the logic flow process moves to logic step 19 where the C++ objects representing each decision variable are inspected. Those decision variables with non-zero optimality values represent transfer and leave request awards and new hire assignments. Such awards and assignments are formatted into XML, and thereafter at logic step 21 the XML representation of the solution is output to the user interface 1 of FIG. 1.

The mixed integer program model is presented below followed by detailed logic flow process descriptions of logic step 13 and logic step 14 as respectively illustrated in FIGS. 3 and 4. The generation of each of the mixed integer program constraints is illustrated in at least one of the accompanying Figures.

Model Indices

The indices used in the mixed integer program model variables and constraint equations are defined in Table III below.

TABLE III

| Index | Description |
|---|---|
| k, k' | employees |
| i, i', j, j' | locations |
| t | leave types |

Model Parameters

The parameters used in the mixed integer program model constraint equations are defined in Table IV.

TABLE IV

| Parameter | Description |
|---|---|
| a | value of an awarded primary leave request |
| b | value of an awarded secondary leave request |
| c | value of an awarded primary transfer request |
| d | value of an awarded secondary transfer request |
| l | value of an awarded third preference leave request |
| m | value of an awarded fourth preference leave request |
| p | per employee cost for understaffing |
| q | per employee cost for overstaffing |
| G | total unassigned last half period new hires |
| H | total unassigned new hires |
| $S_j$ | required staffing deficit relative to current staffing level for location j - it is the difference between the required and current staffing levels |
| $\alpha_j$ | minimum transfers required into location j |
| $\beta_j$ | maximum transfers permitted into location j |
| $\delta_j$ | maximum transfers permitted out of location j |
| $\gamma_j$ | minimum transfers required out of location j |
| $\eta_j$ | quantity of user-specified last half new hires assigned to location j |
| $\lambda_{j,t}$ | minimum leaves of type t required at location j |
| $\mu_{j,t}$ | maximum leaves of type t permitted at location j |

Model Sets

The sets used in the mixed integer program model constraint equations are defined in Table V below.

TABLE V

| Set | Description |
| --- | --- |
| I | set of all locations required to clear transfers into location |
| I' | set of all locations where unassigned new hires are permitted |
| J | set of all locations |
| K | set of all employees with transfer requests |
| L | set of all employees with leave requests |
| T | set of all leave types |
| Γ | set of all jobshare requesting partner pairs, {k', k}, where k' is senior to k |
| $A_j$ | set of all employees who are senior partners of a jobshare request at location j |
| $B_j$ | set of all employees with full period leave requests at location j |
| $B'_j$ | set of all employees whose primary leave request is a full period leave request at location j |
| $C_j$ | set of all employees with first half leave requests at location j |
| $C'_j$ | set of all employees whose primary leave request is a first half leave request at location j |
| $D_j$ | set of all employees with last half leave requests at location j |
| $D'_j$ | set of all employees whose primary leave request is a last half leave request at location j |
| $\Theta_j$ | set of all employees currently at location j with requests to transfer out of location j |
| $\Phi_j$ | set of all employees with requests to transfer into location j |
| $\Phi'_j$ | set of all employees whose primary transfer request is into location j |
| $\Psi_j$ | set of all employees with leave request(s) at location j |

Model Variables

The variables used in the mixed integer program model are defined in Table VI.

TABLE VI

| Variable | Description |
| --- | --- |
| $f_{j,t}$ | under-awarding of leave type t at location j |
| $g_{j,t}$ | over-awarding of leave type t at location j |
| $h_j$ | quantity of first half new hires assigned to location j |
| $n_j$ | understaffing at location j |
| $o_j$ | overstaffing at location j |
| $r_j$ | quantity of last half new hires assigned to location j |
| $s_j$ | full period leave slack variable at location j |
| $u_{k,j}$ | secondary leave request at location j for employee k |
| $v_{k,j}$ | third preference leave request at location j for employee k |
| $w_{k,j}$ | primary leave request at location j for employee k |
| $x_{k,j}$ | primary request for employee k to transfer into location j |
| $y_{k,j}$ | secondary request for employee k to transfer into location j |
| $z_{k,j}$ | fourth preference leave request at location j for employee k |

Special Notation

The special notation k'>>k is used to note that employee k' is senior to employee k.

Mixed Integer Programming Model

Three related but distinct mixed integer program models are created to solve the input problem. Depending on the indicator specifying whether employee transfer requests are to be processed and the indicator specifying whether employee leave requests are to be processed, one mixed integer program model is developed to process only employee transfer requests, one mixed integer program model is developed to process only employee leave requests, and one mixed integer program model is develop to process both employee transfer and employee leave requests simultaneously.

FIGS. 5 through 25, which will be described later in this application, each illustrate the generation of the constraints used in one or more of the mixed integer program models developed.

Transfer Objective Function $$\text{Maximize } Z^{TR} = c \sum_{k \in K} \sum_{j \in J} x_{k,j} + d \sum_{k \in K} \sum_{j \in J} y_{k,j} - p \sum_{j \in J} n_j - q \sum_{j \in J} o_j \quad (1)$$

The above transfer objective function represents the case when only transfer requests are to be processed, and the quantity of awarded primary transfer requests and awarded secondary transfer requests is to be maximized. A penalty is assessed for leaving a location understaffed or overstaffed. The coefficients c, d, p, and q are set so that the model is biased towards awarding primary transfer requests over secondary transfer requests, and biased against understaffing and overstaffing. Empirical results have demonstrated that the following relationship among the coefficients yields acceptable results: for some value d, let c equal 2 times d, let p equal 10 times d, and let q equal 4 times d.

Model Constraints

Exact Transfer Staffing Constraint $$\sum_{k \in \Phi_j} x_{k,j} + \sum_{k \in \Phi_j \backslash \Phi'_j} y_{k,j} - \sum_{k \in \Theta_j} (x_{k,i} + y_{k,i}) + h_j \geq S_j, \quad \forall \, j \in J \quad (2)$$

, where ∀ is a symbol which means "for all", and ∈ is a symbol which means "in the set". The above exact transfer staffing constraint is used in the case when only transfer requests are to be processed. This constraint is created for every location, and enforces the required staffing level. This constraint is created for every location. It will permit overstaffing but not understaffing; additionally, it will not contribute an overstaffing penalty in the objective function of equation (1) above due to the absence of the overstaffing variable in the constraint. The intent of the exact staffing constraint is to either generate solutions that meet the staffing requirements, if possible, or return no solution if an infeasibility is encountered.

The constraint states that the sum of the awarded primary transfer requests into a location, plus the sum of the secondary transfer requests into the location, minus the sum of the primary and secondary transfer requests out of the location, plus the quantity of new hires assigned to the location must be at least the required staffing level for the location.

This constraint is used only if the configuration indicator specifying that the staffing level must be matched exactly is set to yes.

Figure 5:
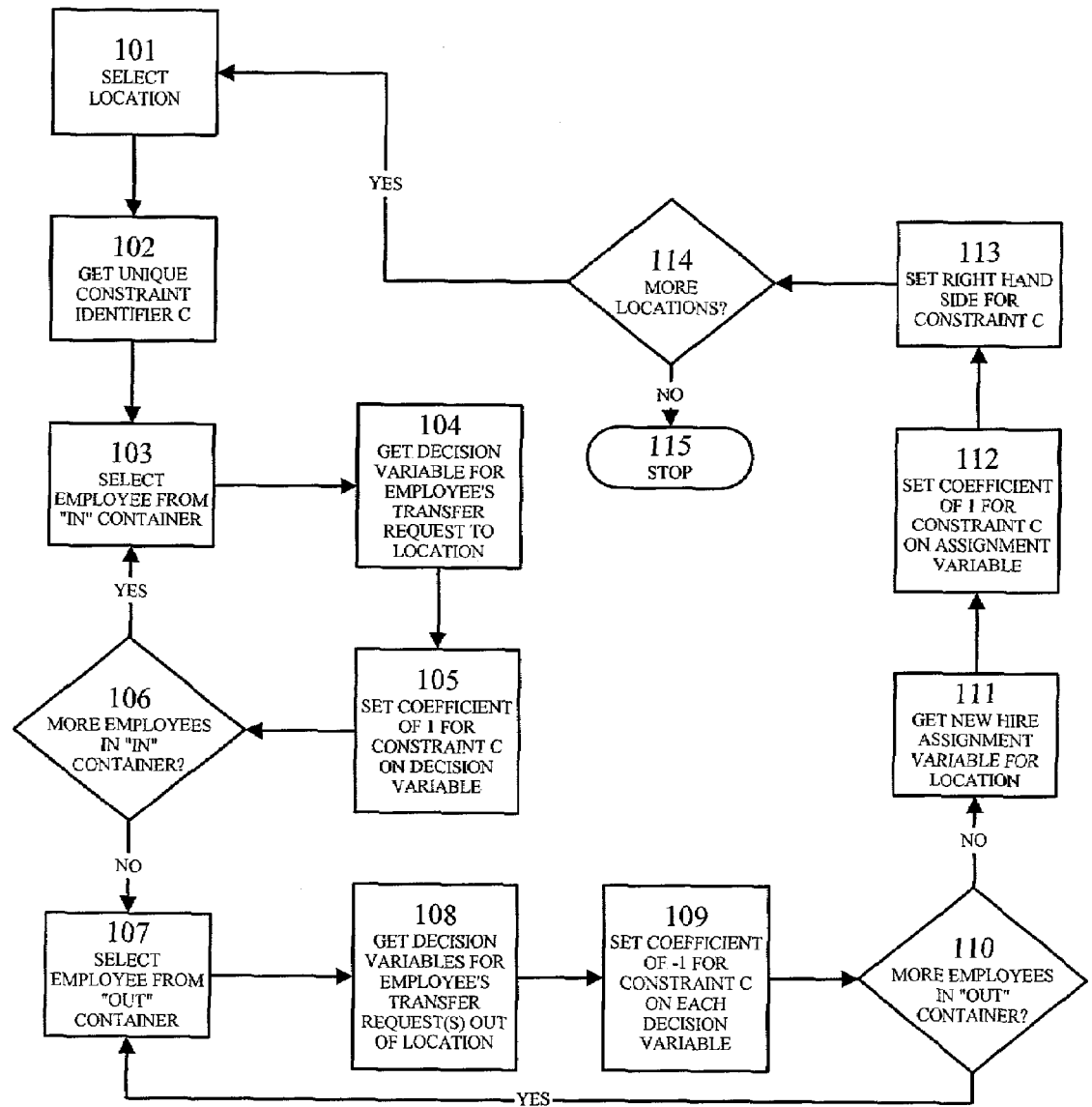
FIG. 5 is a logic flow process diagram of the generation of exact transfer staffing constraints of logic step 76 of FIG. 4.

The generation of this constraint is illustrated in FIG. 5, which will be described in detail later in this specification.

Approximate Transfer Staffing Constraint $$\sum_{k \in \Phi_j} x_{k,j} + \sum_{k \in \Phi_j \backslash \Phi'_j} y_{k,j} - \sum_{k \in \Theta_j} (x_{k,i} + y_{k,i}) + h_j + n_j - o_j = S_j, \ \forall \ j \in J \quad (3)$$

The approximate transfer staffing constraint of equation (3) above is used in the case where only transfer requests are to be processed. This constraint establishes a relationship between awarded transfer requests into and out of a location, and the quantity of assigned new hires and the required staffing level for the location. Based on the awarded transfer requests into and out of a location, and the quantity of new hires assigned to the location, the constraint determines whether the location is understaffed, overstaffed, or neither.

The constraint is created for every location, and states that the sum of the awarded primary transfer requests into a location, plus the sum of the awarded secondary transfer requests into the location, minus the sum of the awarded primary and secondary transfer requests out of the location, plus the quantity of new hires assigned to the location, plus an understaffing term, minus an overstaffing term, equals the required staffing level for the location. Understaffing and overstaffing are recognized in this constraint, and penalized in the objective function of equation (1).

This constraint is used only if the configuration indicator specifying that the staffing level must be matched exactly is set to no.

Figure 6:
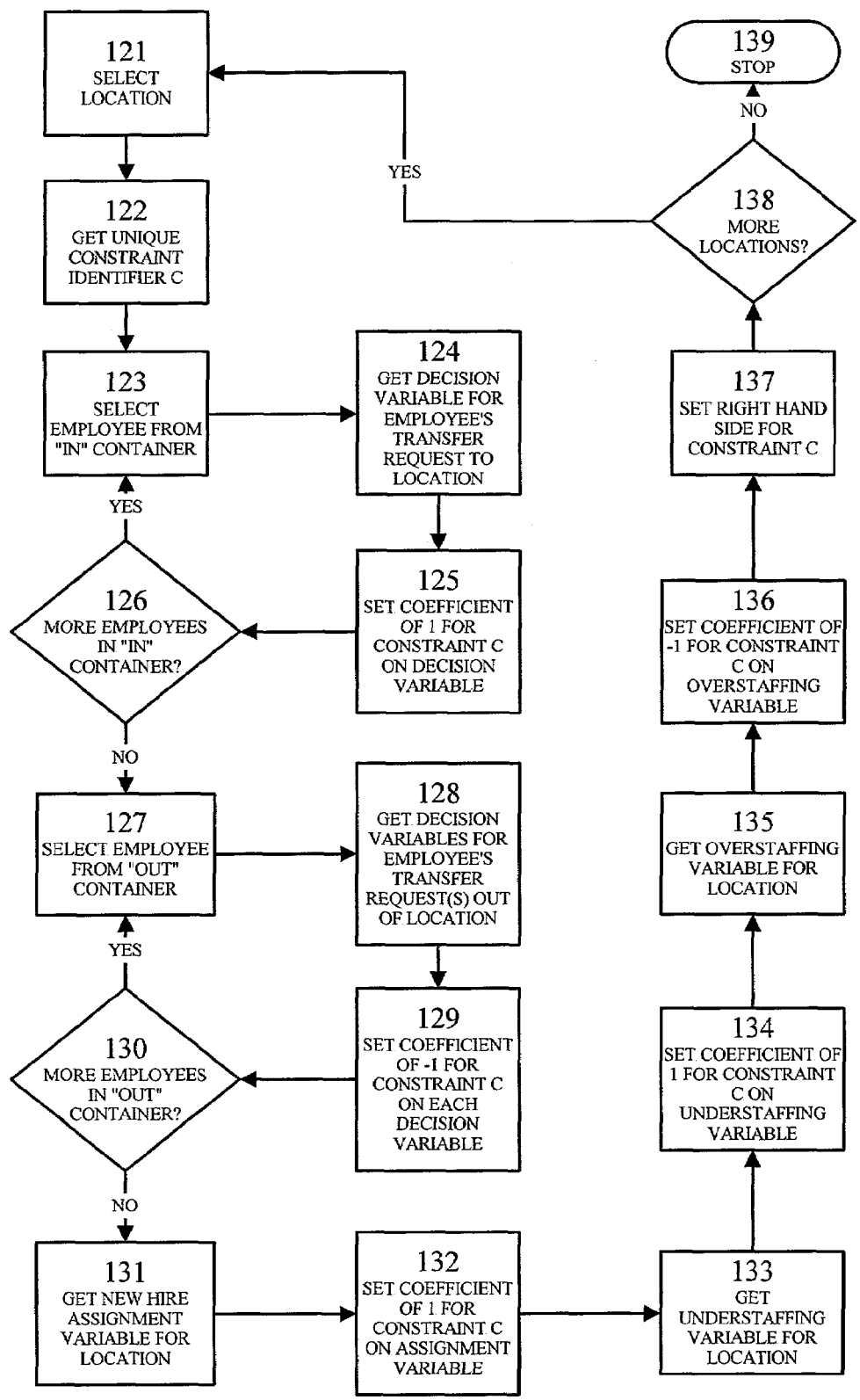
FIG. 6 is a logic flow process diagram of the generation of approximate transfer staffing constraints of logic step 77 of FIG. 4.

The generation of this constraint is illustrated in FIG. 6, which will be described in detail later in this application.

Seniority Transfer Processing Constraints $$x_{k,j} - x_{k',j} \leq 0, \ \forall k \in \Phi'_j, \ \forall k' \in \Phi'_j, \ \forall k' >> k, \ \forall j \in J \quad (4)$$

$$y_{k,j} - x_{k',j} \leq 0, \ \forall k \in \Phi_j \backslash \Phi'_j, \ \forall k' \in \Phi'_j, \ \forall k' >> k, \ \forall j \in J \quad (5)$$

$$x_{k,j} - x_{k',j} - y_{k',j} \leq 0, \ \forall k \in \Phi'_j, \ \forall k' \in \Phi_j \backslash \Phi'_j, \ \forall k' >> k, \ \forall j \in J \quad (6)$$

$$y_{k,j} - x_{k',j} - y_{k',j} \leq 0, \ \forall k \in \Phi_j \backslash \Phi'_j, \ \forall k' \in \Phi_j \backslash \Phi'_j, \ \forall k' >> k, \ \forall j \in J \quad (7)$$

The seniority transfer processing constraints are used in the case where only transfer requests are to be processed, and in the case where both leave requests and transfer requests are to be processed. These constraints establish the seniority relationships among the employees with transfer requests to the same location. These constraints also enforce the seniority rules regarding the awarding of transfer requests in seniority order.

The inequality (4) above states that awarding a junior employee's primary transfer request to a location implies that all employees senior to the junior employee with primary transfer requests to the same location are awarded their primary transfer requests. The inequality (5) above states that awarding a junior employee's secondary transfer request to a location implies that all employees senior to the junior employee with primary transfer requests to the same location are awarded their primary transfer requests.

The inequality (6) above states that awarding a junior employee's primary transfer request to a location implies that all employees senior to the junior employee with secondary transfer requests to the same location are awarded either their primary or secondary transfer requests. Inequality (7) states that awarding a junior employee's secondary transfer request to a location implies that all employees senior to the junior employee with secondary transfer requests to the same location are awarded either their primary or secondary transfer requests.

Figure 7:
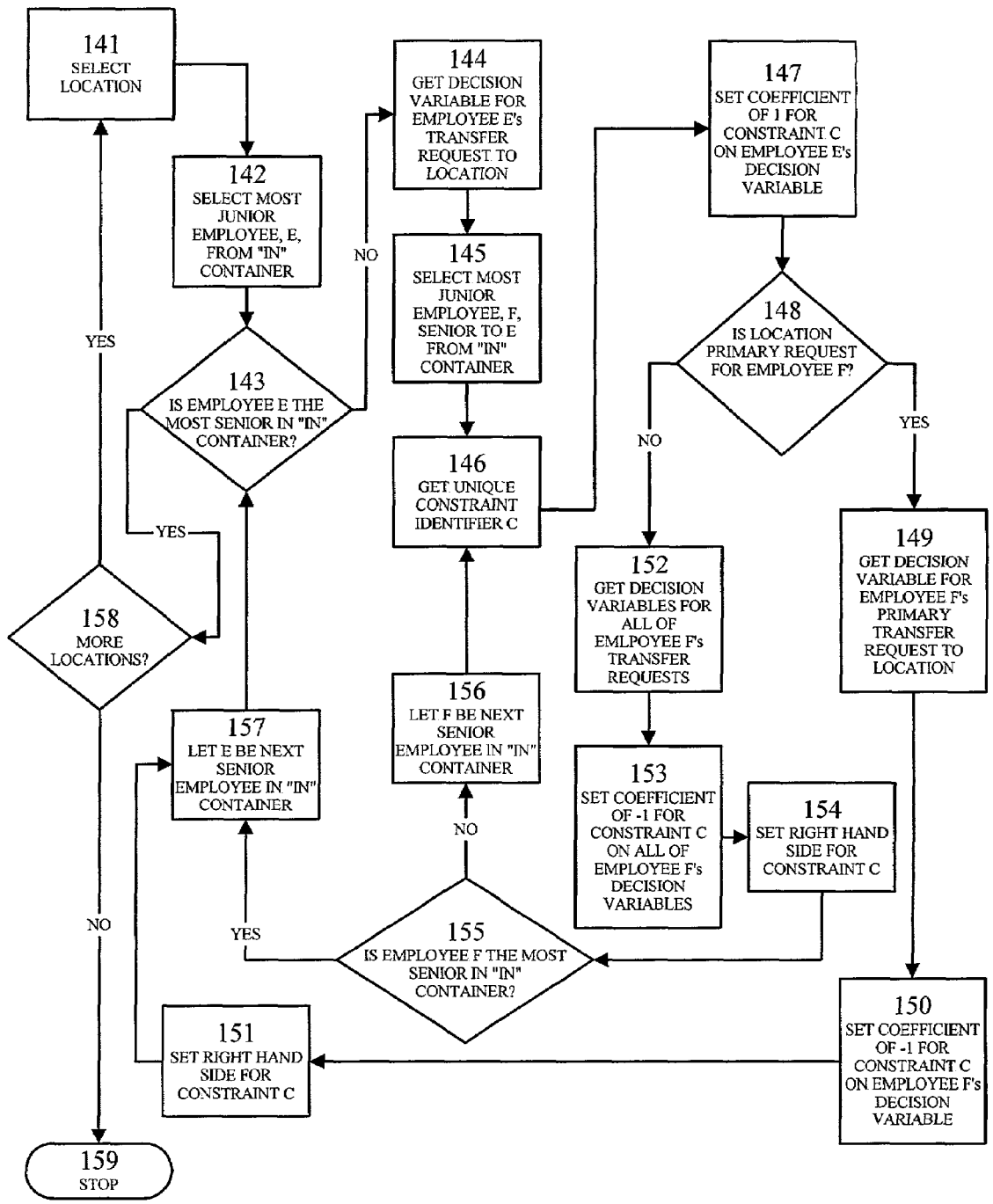
FIG. 7 is a logic flow process diagram of the generation of seniority transfer processing constraints of logic steps 65 and 78 of FIG. 4.

These constraints are created for every location to which a transfer request exists. The generation of this constraint is illustrated in FIG. 7, which is described in detail later in this apecification.

Single Transfer Award Restriction $$x_{k,j} + y_{k,j} \leq 1, \ \forall k \in K \quad (8)$$

The above single transfer award restriction is used in the case where only transfer requests are to be processed. This constraint is used to enforce a requirement that no more than one transfer request is awarded to any employee. Although the condition for the inequality (8) states that this constraint exists for all employees with transfer requests, it is relevant only for all employees with more than one transfer request.

Figure 8:
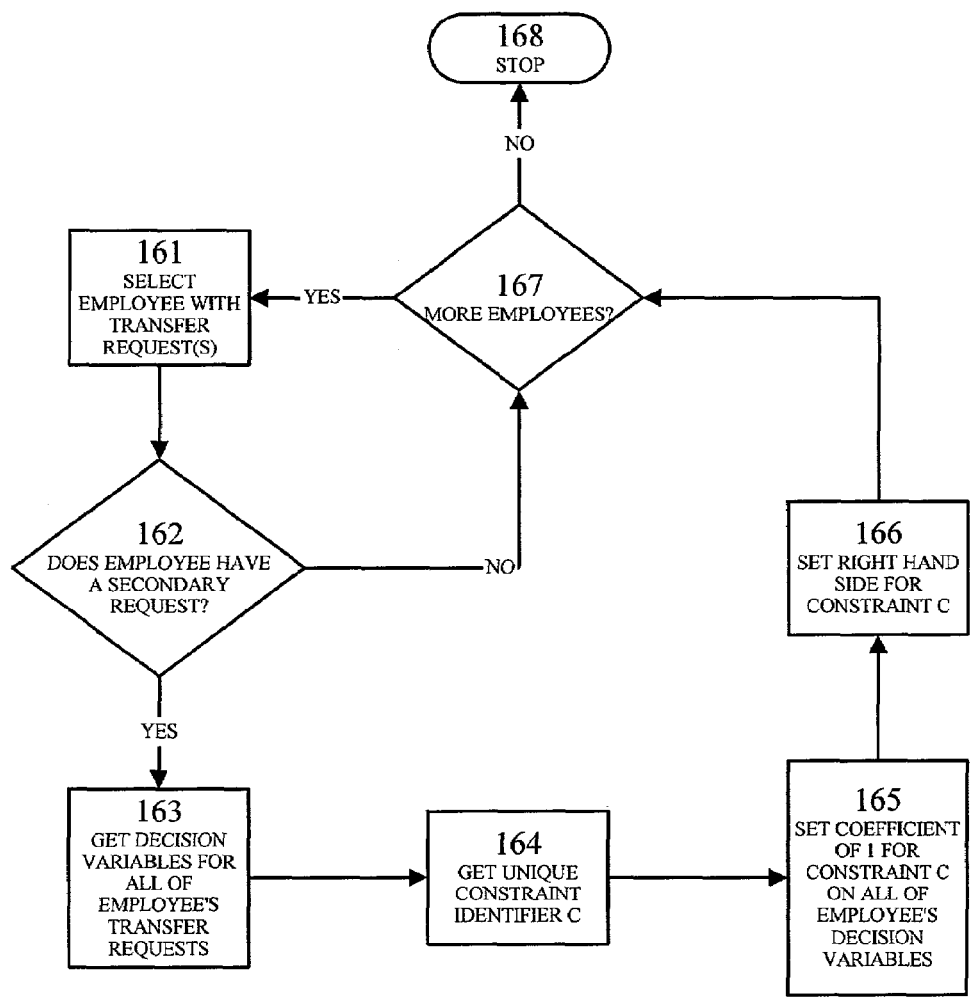
FIG. 8 is a logic flow process diagram of the generation of the single transfer award restrictions of logic step 79 of FIG. 4.

The generation of this constraint is illustrated in FIG. 8, which is described in detail later in this specification.

Clear Transfer List Constraints $$x_{k,j} = 1, \ \forall k \in \Phi'_j, \ \forall j \in I \quad (9)$$

$$x_{k,j} + y_{k,j} = 1, \ \forall k \in \Phi_j \backslash \Phi'_j, \ \forall j \in I \quad (10)$$

The clear transfer list constraints of equations (9) and (10) above are used in the case where only transfer requests are to be processed, and in the case where both leave requests and transfer requests are to be processed. These constraints establish that for a location requiring that its transfer list be cleared, all employees requesting a transfer to the location are awarded their primary request to the location or their secondary request to the location, or their primary request to another location.

The equality (9) above states that an employee must be awarded its primary transfer request for a location that must have its transfer list cleared. The equality (10) above states that an employee must be awarded either his secondary transfer request for a location that must have its transfer list cleared, or his primary transfer request to another location. These constraints are generated for all employees requesting transfers into locations requiring that their transfer lists be cleared.

Figure 9:
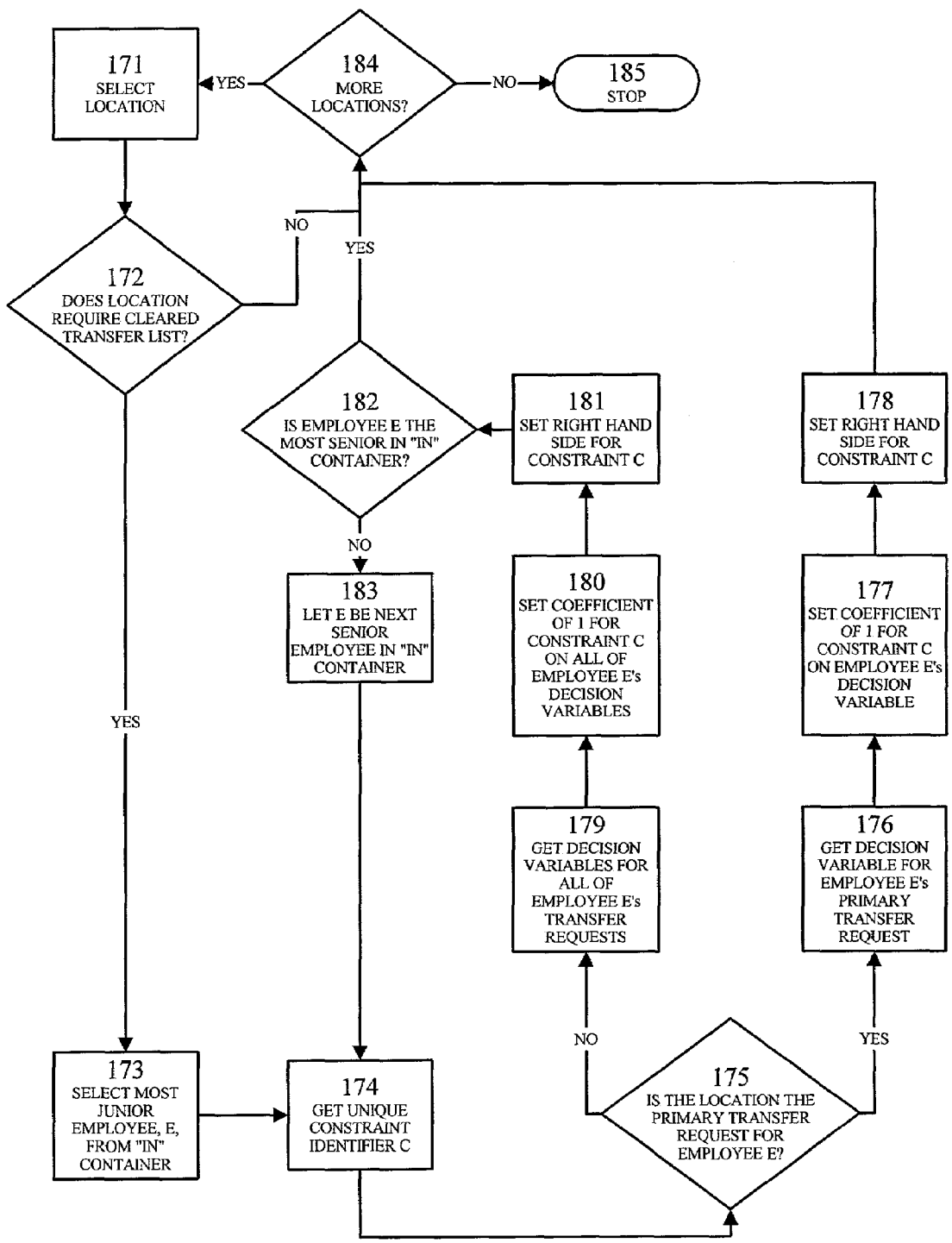
FIG. 9 is a logic flow process diagram of the generation of the constraints to clear the transfer lists of logic steps 69 and 80 of FIG. 4.

The generation of this constraint is illustrated in FIG. 9, which is described in detail later in this specification.

Allow New Hires Constraints $$h_j - Hx_{k,j} \leq 0, \ \forall k \in \Phi'_j, \ \forall j \in I' \quad (11)$$

$$h_j - Hx_{k,j} - Hy_{k,j} \leq 0, \ \forall k \in \Phi_j \backslash \Phi'_j, \ \forall j \in I' \quad (12)$$

$$h_j = 0, \ \forall j \in J \backslash I' \quad (13)$$

$$\sum_{j \in J} h_j = H \quad (14)$$

The allow new hires constraints of inequalities (11)-(12) and the equations (13)-(14) above are used in the case where only transfer requests are to be processed, and in the case where both leave requests and transfer requests are to be processed. These constraints establish that for a location allowing new hires, if new hires are assigned to the location, all employees requesting a transfer to the location are awarded their primary request to the location, or their secondary request to the location, or their primary request to another location.

The inequality (11) above states that the assignment of one or more new hires to a location implies that an employee with a primary transfer request to the location must be awarded his primary transfer request. The inequality (12) states that the assignment of one or more new hires to a location implies that an employee with a secondary transfer request to the location must be awarded either his secondary transfer request to the location, or his primary transfer request to another location. Equality (13) states that new hires will not be assigned to locations that do not allow new hires. Equality (14) states that the sum of new hire assignments equals the total quantity of unassigned new hires.

The inequalities (11) and (12) above are generated for all employees requesting transfers into a location that allows new hires. Equation (13) is generated for all locations that do not allow new hires, and equation (14) is generated only once.

Figure 10:
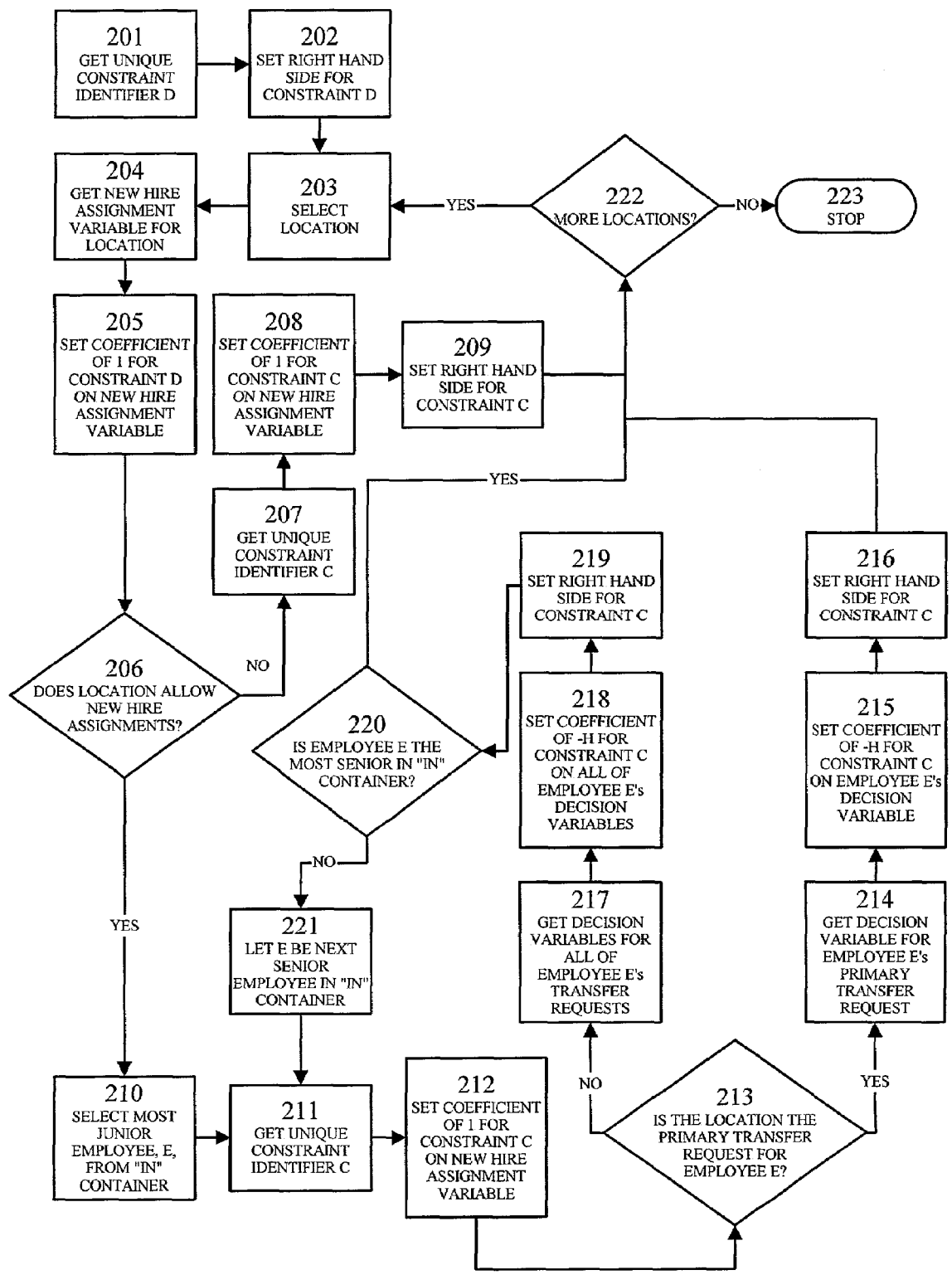
FIG. 10 is a logic flow process diagram of the generation of constraints to allow new hires of logic steps 70, 71, and 81 of FIG. 4.

The generation of the constraint of inequalities (11)-(12) and equations (13)-(14) above, and the forthcoming last half period new hire assignment constraints, are illustrated in FIG. 10 which will be described in detail later in this specification.

Minimum/Maximum Transfer Range Constraints $$\sum_{k \in \Phi_j} x_{k,j} + \sum_{k \in \Phi_j \backslash \theta_j} y_{k,j} \geq \alpha_j, \quad \forall\; j \in J \tag{15}$$

$$\sum_{k \in \Phi_j} x_{k,j} + \sum_{k \in \Phi_j \backslash \theta_j} y_{k,j} \leq \beta_j, \quad \forall\; j \in J \tag{16}$$

$$\sum_{k \in \Theta_j} (x_{k,i} + y_{k,i}) \geq \gamma_j, \quad \forall\; j \in J \tag{17}$$

$$\sum_{k \in \Theta_j} (x_{k,i} + y_{k,i}) \leq \delta_j, \quad \forall\; j \in J \tag{18}$$

The above minimum/maximum transfer range constraints are used in the case where only transfer requests are to be processed, and in the case where both leave requests and transfer requests are to be processed. These constraints require that at least a minimum quantity of transfer requests be awarded into specified locations, a minimum quantity of transfer requests be awarded out of specified locations, the quantity of transfer awards into specified locations be limited to a maximum value, and the quantity of transfer awards out of specified location be limited to a maximum value.

The inequality (15) above states that the sum of awarded primary transfer requests into a location, plus the sum of awarded secondary transfer requests into the same location, is no less than the specified minimum value. The inequality (16) states that the sum of awarded primary transfer requests into a location, plus the sum of awarded secondary transfer requests into the same location, is no more than the specified maximum value. The inequality (17) states that the sum of awarded primary and secondary transfer requests out of a location is no less than the specified minimum value. The inequality (18) states that the sum of awarded primary and secondary transfer requests out of a location is no more than the specified maximum value.

Figure 11:
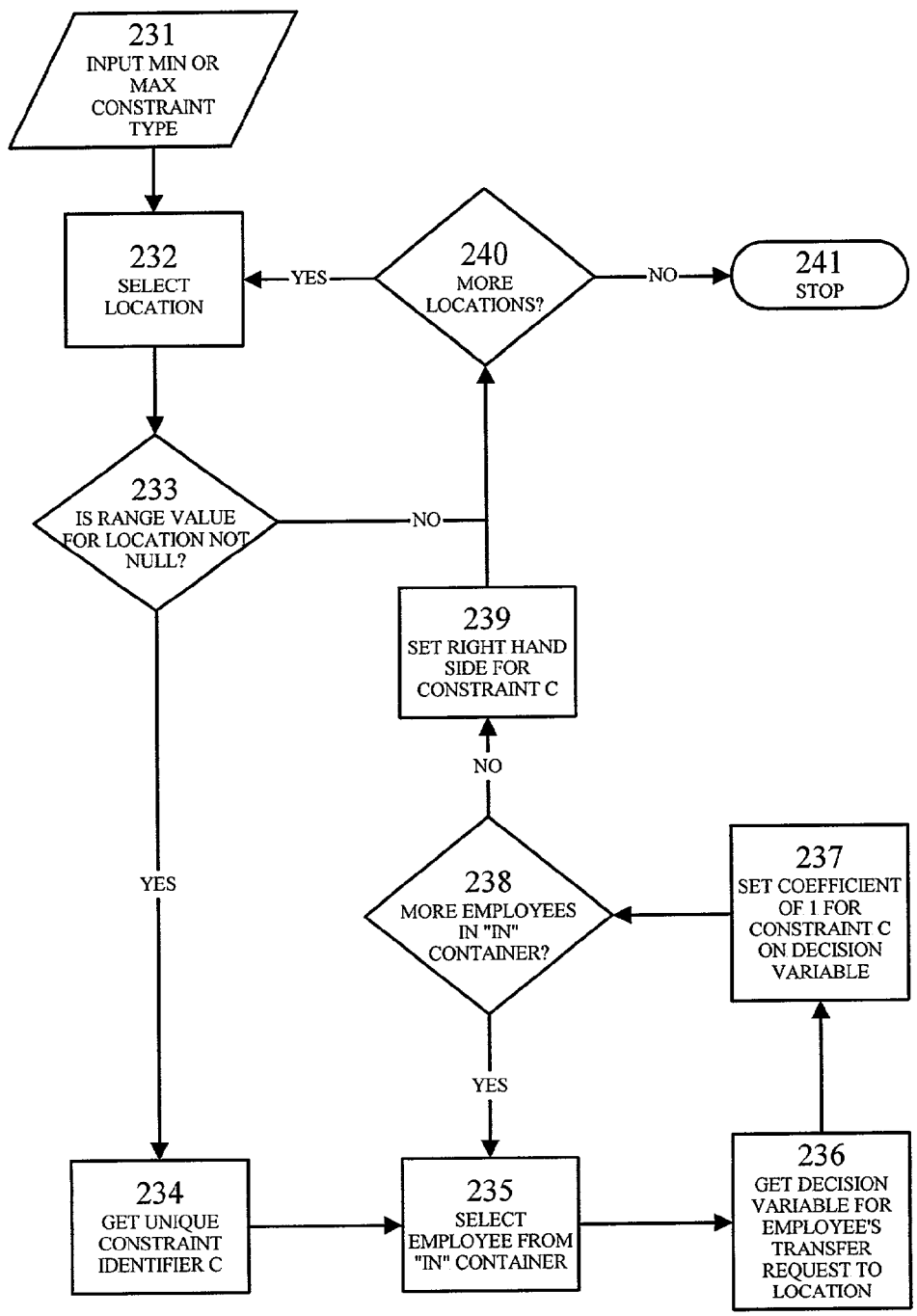
FIG. 11 and FIG. 12 are logic flow process diagrams of the generation of the minimum and maximum transfer award constraints of logic steps 72 and 82 of FIG. 4.
Figure 12:
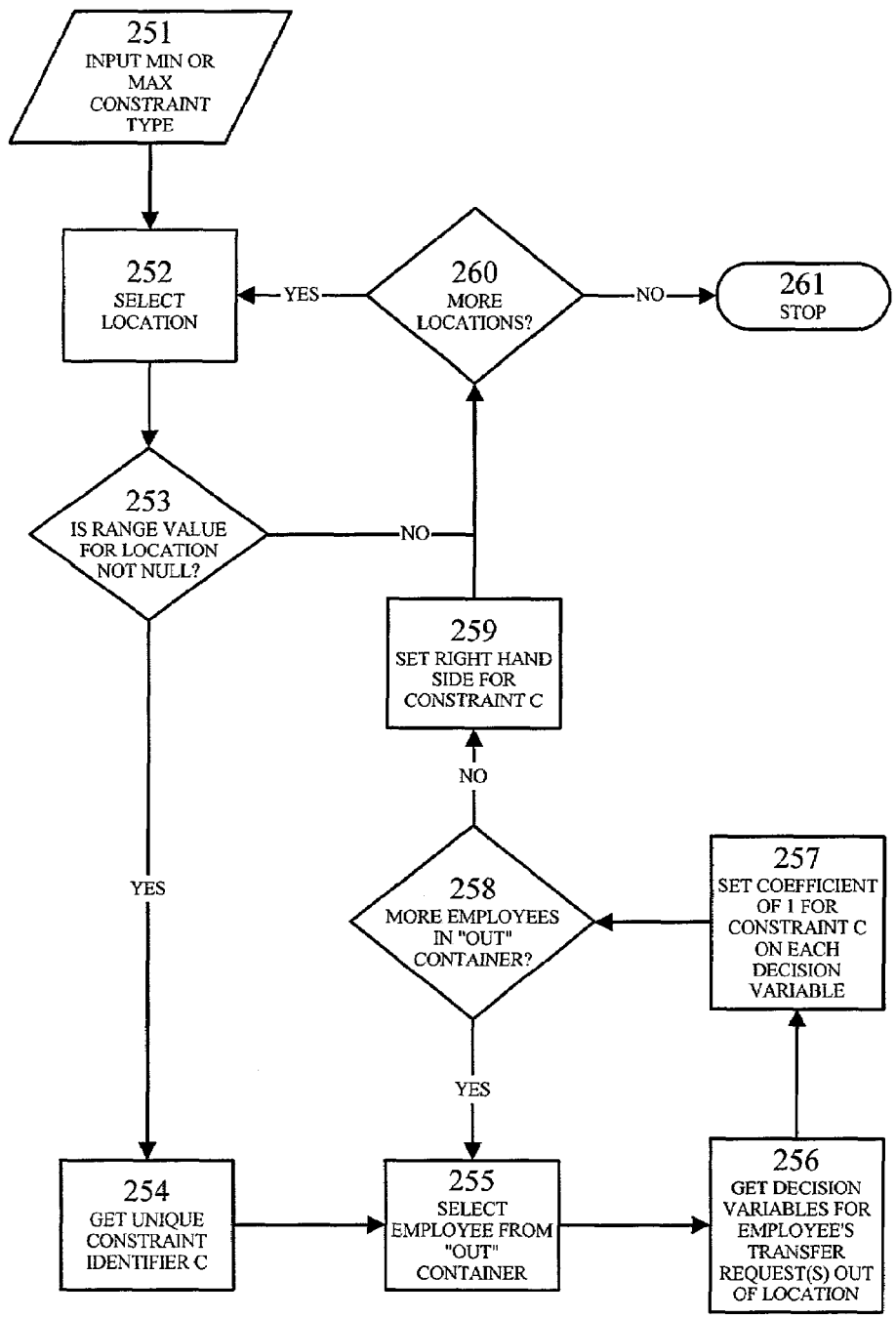

These constraints of inequalities (15)-(18) are generated for locations where the associated parameter values are non-null. The generation of these constraints is illustrated in FIGS. 11 and 12, which will be described in detail later in this specification.

Transfer Decision Variable Bounds $$x_{k,j} \in \{0,1\} \tag{19}$$

$$y_{k,j} \in \{0,1\} \tag{20}$$

$$h_j \in \mathfrak{I}^+ \tag{21}$$

$$n_j \in \mathfrak{R}^+ \tag{22}$$

$$o_j \in \mathfrak{R}^+ \tag{23}$$

The above transfer decision variable bounds are used in the case where only transfer requests are to be processed, and in the case where both leave requests and transfer requests are to be processed. These bounds define the types of values that the decision variables may take. They are applicable to all corresponding decision variables created.

The bound (19) indicates that a primary transfer request is a binary variable, and may only take the values of zero or one. The bound (20) indicates that a secondary transfer request is a binary variable, and may only take the values of zero or one. The bound (21) states that new hire assignments are integer variables that may take only non-negative integer values. The bound (22) indicates that the understaffing variables are continuous variables that may take only non-negative real values. The bound (23) indicates that the overstaffing variables are continuous variables that may take only non-negative real values.

It should be noted that although the understaffing variables and overstaffing variables are defined as continuous variables, it is expected that they take integer variables. This is assured through the definition of the other bounds (19), (20), and (21). Thus the understaffing and overstaffing variables are expected to take non-negative integer values but need not be defined as integer variables because of their relationships to the other decision variables and their associated definitions. This point is relevant because the resulting mixed integer program model is more easily solved with fewer discrete variables.

The mixed integer program model for the case where only transfer requests are to be processed consists of equation (1) as its objective function, the inequality (2) or the inequality (3), depending on the requirement to match staffing levels exactly, the constraints of inequalities (4) through (8), equations (9)-(10), inequalities (11)-(12), equations (13)-(14), inequalities (15)-(18), and bounds (19) through (23).

Leave Objective Function $$\text{Maximize } Z^{LV} = a \sum_{k \in K} \sum_{t \in T} w_{k,t} + b \sum_{k \in K} \sum_{t \in T} u_{k,t} + \tag{24}$$

-continued $$l\sum_{k\in K}\sum_{t\in T}v_{k,t} + m\sum_{k\in K}\sum_{t\in T}z_{k,t} - p\sum_{j\in J}\sum_{t\in T}f_{j,t} - q\sum_{j\in T}\sum_{t\in T}g_{j,t}$$

The leave objective function is used in the case when only leave requests are to be processed. The objective is to maximize the quantity of awarded primary leave requests, awarded secondary leave requests, awarded third preference leave requests, and awarded fourth preference leave requests. A penalty is assessed for under-awarding leaves and for over-awarding leaves. The coefficients a, b, l, m, p, and q are set so that the model is biased towards awarding primary leave requests over secondary leave requests, secondary leave requests over third preference leave requests, third preference leave requests over fourth preference leave requests, and biased against under-awarding or over-awarding leave requests. Empirical results have demonstrated that the following relationships among the coefficients yield acceptable results: for some value a that is divisible by three and divisible by four, let b equal a divided by 2, let l equal a divided by 3, let m equal a divided by four, let p equal four times a, and let q equal 10 times a.

Model Constraints

Exact Leave Staffing Constraints $$\sum_{k\in A_j} w_{k,JS} + \sum_{k\in B_j}(w_{k,FP} + u_{k,FP} + v_{k,FP} + z_{k,FP}) + s_j = -S_j, \forall\ j\in J \quad (25)$$

$$\sum_{k\in C_j}(w_{k,FH} + u_{k,FH} + v_{k,FH} + z_{k,FH}) - s_j = 0, \forall\ j\in J \quad (26)$$

$$\sum_{k\in D_j}(w_{k,LH} + u_{k,LH} + v_{k,LH} + z_{k,LH}) - s_j = 0, \forall\ j\in J \quad (27)$$

The exact leave staffing constraints above are used in the case where only leave requests are to be processed. These constraints are created for every location and enforce the required staffing level for every location. They permit under-awarding of full period leaves if the under-awarding can be compensated by the awarding of first half period leaves and last half period leaves. The intent of the exact leave staffing constraints is to generate solutions that meet the staffing requirements, if possible, or return no solution if an infeasibility is encountered.

Equation (25) above states that the sum of jobshares awarded to senior employee partners at a location, plus the sum of awarded primary, secondary, third, and fourth preference full period leaves at the same location, plus a full period slack term, equals the negative of the relative staffing deficit for the location. It implies that the quantity of awarded full period equivalent leaves plus the full period slack term equals the reduction in staffing level for the next time period at each location.

Equation (26) states that the sum of awarded primary, secondary, third preference, and fourth preference first half period leaves at a location, minus the full period slack term for the same location equals zero. It implies that the quantity of first half period leaves awarded at a location must equal the full period slack term for the location. Similarly, equation (27) states that the sum of awarded primary, secondary, third, and fourth preference last half period leaves at a location, minus the full period slack term for the same location, equals zero. It implies that the quantity of last half period leaves awarded at a location must equal the full period slack term for the location.

This constraint is used only if the configuration indicator specifying that the staffing level must be matched exactly is set to yes.

Figure 13:
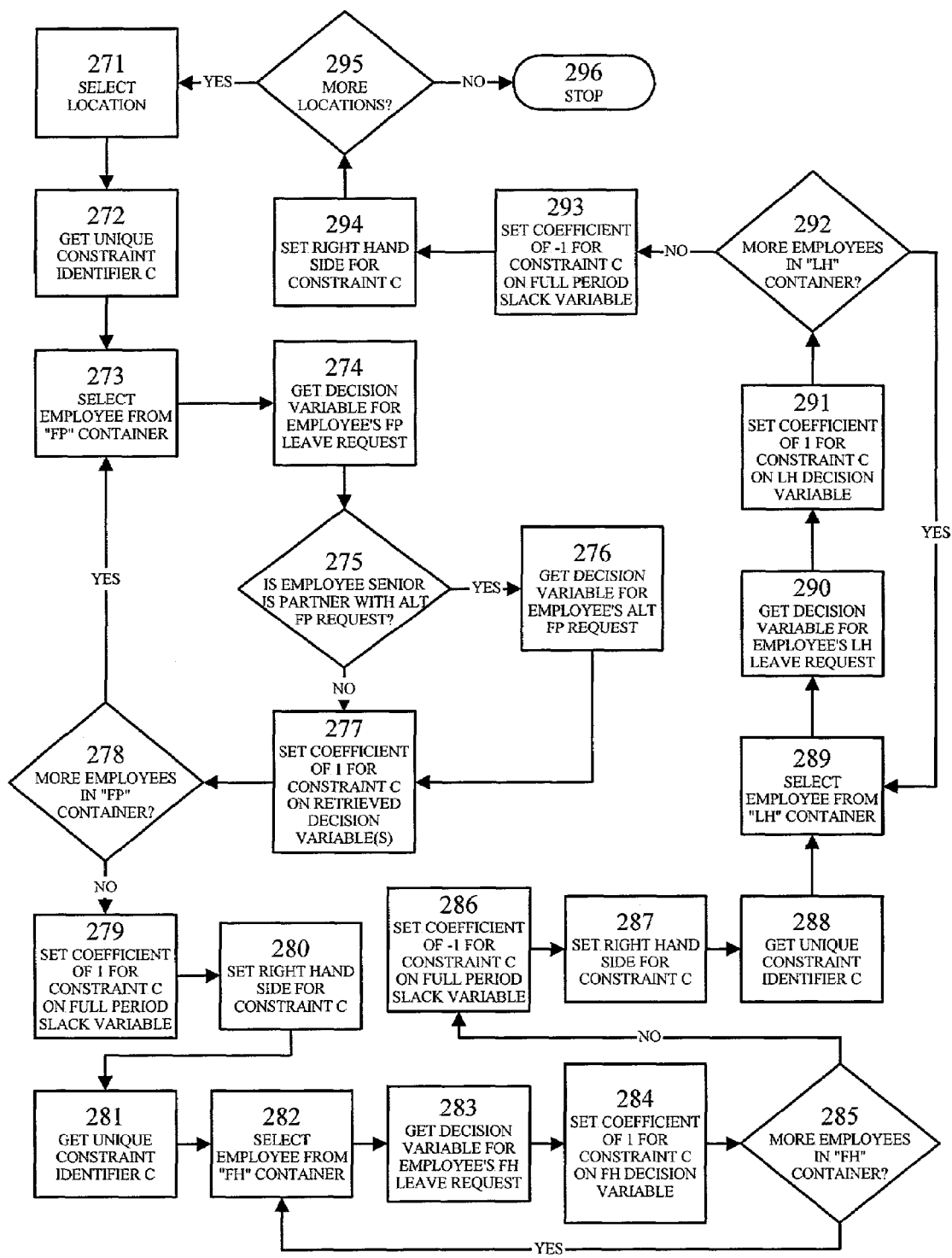
FIG. 13 is a logic flow process diagram of the generation of the exact leave staffing constraints of logic step 85 of FIG. 4.

The generation of the constraints of equations (25)-(27) is illustrated in FIG. 13, which is described in detail later in this specification.

Approximate Leave Staffing Constraints $$\sum_{k\in A_j} w_{k,JS} + \sum_{k\in B_j}(w_{k,FP}u_{k,FP} + v_{k,FP} + z_{k,FP}) + \quad (28)$$

$$s_j + f_{j,FP} - g_{j,FP} = S_j, \forall\ j\in J$$

$$\sum_{k\in C_j}(w_{k,FH} + u_{k,FH} + v_{k,FH} + z_{k,FH}) - s_j + f_{j,FH} - g_{j,FH} = 0, \quad (29)$$

$$\forall\ j\in J$$

$$\sum_{k\in D_j}(w_{k,LH} + u_{k,LH} + v_{k,LH} + z_{k,LH}) - s_j + f_{j,LH} - g_{j,LH} = 0, \quad (30)$$

$$\forall\ j\in J$$

The approximate leave staffing constraints of equations (28)-(30) above are used in the case when only leave requests are to be processed. These constraints establish relationships between awarded full period equivalent leaves, awarded first half period leaves, awarded last half period leaves, and the required staffing level for each location. Based on the awarded leave requests, they determine whether a location has under-awarded or over-awarded full period equivalent leaves, first half period leaves, and/or last half period leaves. Under-awards and over-awards are penalized in the objective function of equation (24). These constraints are generated for every location.

Equation (28) states that the sum of awarded jobshares to senior partners plus the sum of awarded primary, secondary, third, and fourth preference full period leaves, plus a full period slack term, plus a full period under-award term, minus a full period over-award term, equals the negative of the relative staffing deficit for the location. It implies that the sum of awarded full period equivalent leaves should be equal to the reduction in staffing level for the next time period at each location; otherwise, either the under-awarding of full period equivalent leaves are compensated through the awarding of first half period leaves and last half period leaves, or the under-awarding or over-awarding of full period equivalent leaves is penalized in the objective function of equation (24).

Equation (29) states that the sum of awarded primary, secondary, preference, and fourth preference first half period leaves, minus the full period slack term, plus a first half period under-award term, minus a first half period over-award term, equals zero for each location. It implies that the sum of awarded first half period leaves at a location equals the full period slack term for the location, or a first half period under-award or over-award penalty is assessed. Similarly, equation (30) states that the sum of awarded primary, secondary, third, and fourth preference last half period leaves, minus the full period slack term, plus a last half period under-award term, minus a last half period over-award term, equals zero for each location. It implies that the sum of awarded last half period leaves at a location equals the full period slack term for the location, or a last half period under-award or over-award penalty is assessed.

It should be noted that the full period slack term is used to allow flexibility in awarding a combination of full period equivalent leave requests, first half period leave requests, and last half period leave requests that meet the required staffing level for a location. This term permits such flexibility without penalty. However, because of the structure of the approximate leave staffing constraints of equations (28)-(30) and the leave objective function of equation (24), the full period slack term is used sparingly to award as many first half period and last half period leaves as possible to compensate for the full period equivalent leave award shortage; otherwise, a value for the full period slack term above the maximum quantity of awarded first half and last half period leaves will incur a double penalty for under-awarding first half period leaves and last half period leaves.

These constraints are used only if the configuration indicator specifying that the staffing level must be matched exactly is set to no.

Figure 14:
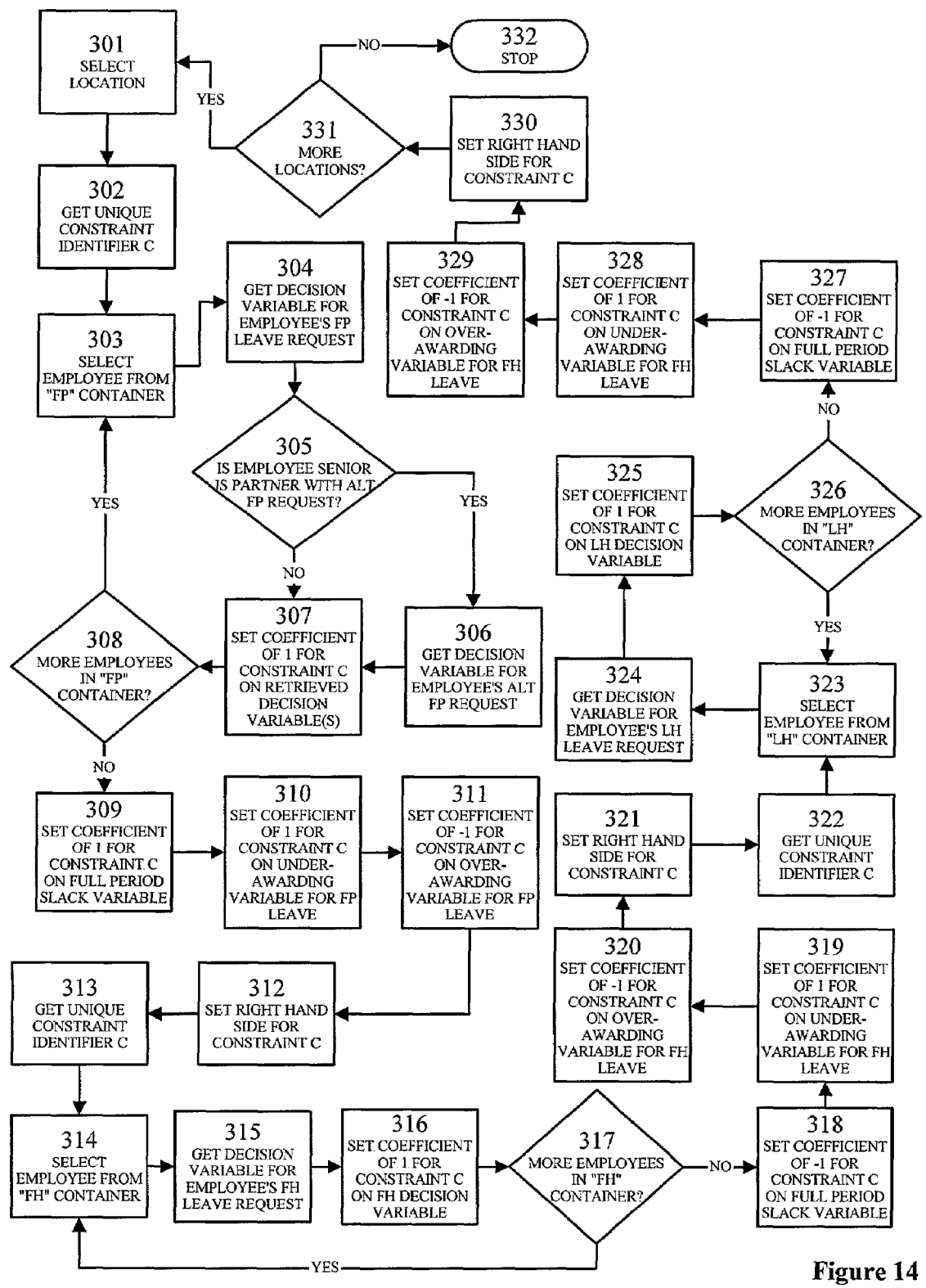
FIG. 14 is a logic flow process diagram of the generation of the approximate leave staffing constraints of logic step 86 of FIG. 4.

The generation of the constraints of equations (28)-(30) is illustrated in FIG. 14, which is described in detail later in this specification.

Full Period Leave Seniority Processing Constraints $$\sum_{t \in \{JS,FP\}} (w_{k,t} + u_{k,t} + v_{k,t} + z_{k,t}) - \sum_{t \in \{JS,FP\}} w_{k',t} \le 0, \quad (31)$$

where $k \in A_j \cup B_j, k' \in A_j \cup B'_j, k' \gg k, \forall j \in J$.

$$\sum_{t \in \{JS,FP\}} (w_{k,t} + u_{k,t} + v_{k,t} + z_{k,t}) - \sum_{t \in T} (w'_{k,t} + u'_{k,t} + v'_{k,t} + z'_{k,t}) \le 0, \quad (32)$$

where $k \in A_j \cup B_j, k' \in B_j \setminus (A_j \cup B'_j), k' \gg k, \forall j \in J$.

The above full period leave seniority processing constraints are used in the case where only leave requests are to be processed. These constraints establish the relationships among the employees with full period equivalent leave requests at the same location. These constraints enforce the seniority rules regarding the awarding of full period leave and jobshare requests in seniority order.

Inequality (31) states that awarding a junior employee's primary, secondary, third, or fourth preference full period equivalent request, either as a senior partner of a jobshare request, or through a full period leave request, implies that all employees at the same location with primary full period equivalent leave requests senior to the junior employee are awarded their primary leave request. Inequality (32) states that awarding a junior employee's primary, secondary, third preference, or fourth preference full period equivalent request, either as a senior partner of a jobshare request, or through a full period leave request, implies that all employees at the same location, with a secondary, third, or fourth preference full period leave request (but not with a primary full period equivalent leave request) senior to the junior employee are awarded one of their leave requests at the location.

Figure 15:
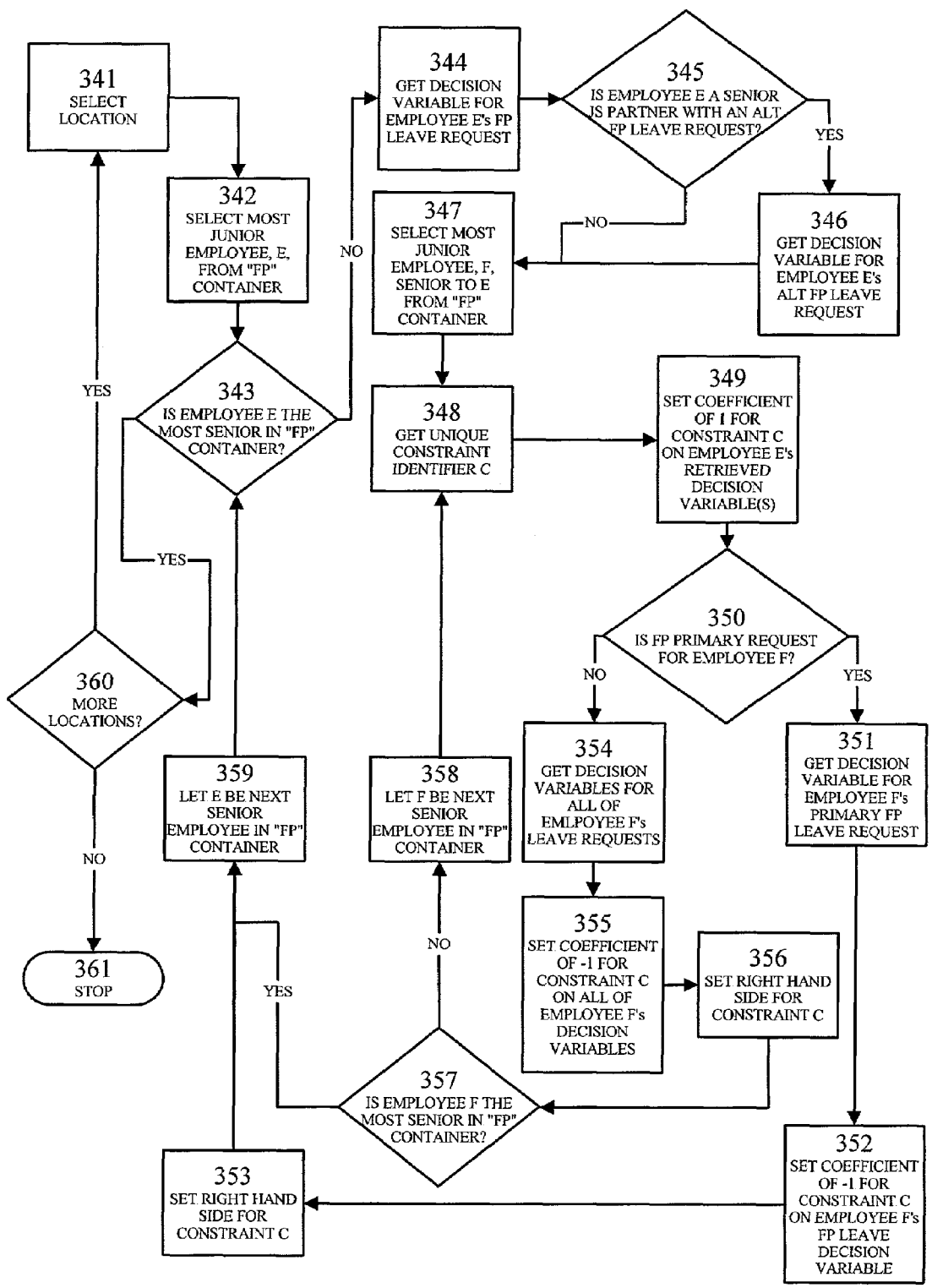
FIG. 15 is a logic flow process diagram of the generation of the full period leave seniority processing constraints of logic step 87 of FIG. 4.

The constraints of inequalities (31)-(32) are created for every location for which full period equivalent leave requests exist. The generation of these constraints is illustrated in FIG. 15, which is described in detail later in this specification.

Half Period Leave Seniority Processing Constraints $$w_{k,FH} + u_{k,FH} + v_{k,FH} + z_{k,FH} - w_{k',FH} \le 0, \text{ where } k \in C_j, k' \in C'_j, k' \gg k, \forall j \in J. \quad (33)$$

$$w_{k,FH} + u_{k,FH} + v_{k,FH} + z_{k,FH} - \sum_{t \in T} (w'_{k,t} + u'_{k,t} + v'_{k,t} + z'_{k,t}) \le 0, \quad (34)$$

where $k \in C_j, k' \in C_j \setminus C'_j, k' \gg k, \forall j \in J$.

$$w_{k,LH} + u_{k,LH} + v_{k,LH} + z_{k,LH} - w_{k',LH} \le 0, \text{ where } k \in D_j, k' \in D'_j, k' \gg k, \forall j \in J. \quad (35)$$

$$w_{k,LH} + u_{k,LH} + v_{k,LH} + z_{k,LH} - \sum_{t \in T} (w'_{k,t} + u'_{k,t} + v'_{k,t} + z'_{k,t}) \le 0, \quad (36)$$

where $k \in D_j, k' \in D_j \setminus D'_j, k' \gg k, \forall j \in J$.

The above half period leave seniority processing constraints are used in the case where only leave requests are to be processed. These constraints establish the relationships among the employees with half period leave requests at the same location. These constraints enforce the seniority rules regarding the awarding of half period leave requests in seniority order.

Inequality (33) states that awarding a junior employee a first half period leave implies that all employees at the same location with a primary first half period leave request senior to the junior employee are awarded their primary leave request. Inequality (34) states that awarding a junior employee a first half period leave implies that all employees at the same location with a secondary, third, or fourth preference first half period leave request senior to the junior employee are awarded one of their leave requests. Inequality (35) states that awarding a junior employee a last half period leave implies that all employees at the same location with a primary last half period leave request senior to the junior employee are awarded their primary leave request. Inequality (36) states that awarding a junior employee a last half period leave implies that all employees at the same location with a secondary, third, or fourth preference last half period leave request senior to the junior employee are awarded one of their leave requests.

Figure 16:
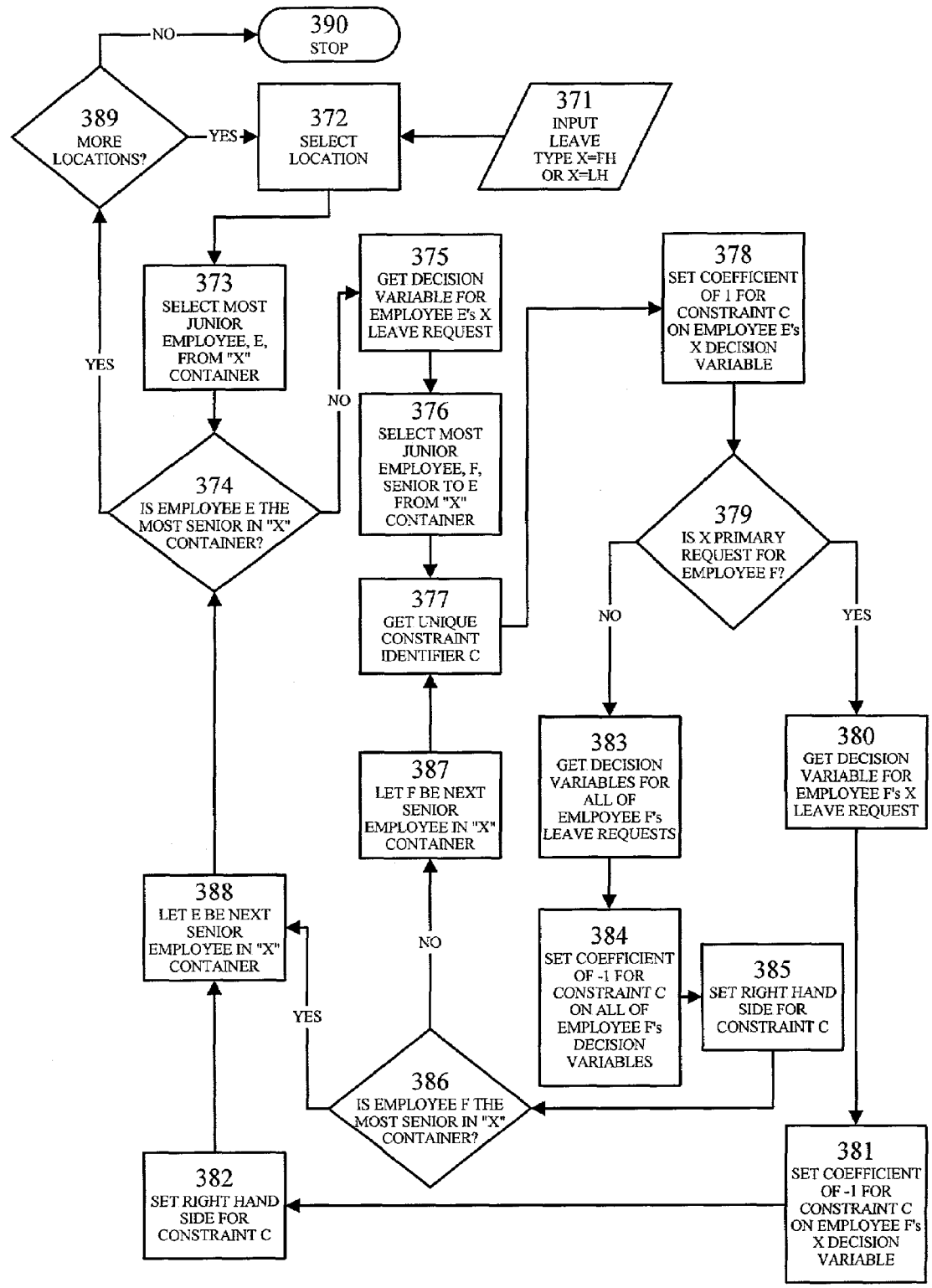
FIG. 16 is a logic flow process diagram of the generation of the half period leave seniority processing constraints of logic step 88 of FIG. 4.

The constraints of inequalities (33)-(36) are created for every location for which half period leave requests exist. The generation of these constraints is illustrated in FIG. 16, which is described in detail later in this specification.

Half Period Leave Award Processing Constraints $$w_{k,FH} + u_{k,FH} + v_{k,FH} + z_{k,FH} - \sum_{t \in T} (w'_{k,t} + u'_{k,t} + v'_{k,t} + z'_{k,t}) \le 0, \quad (37)$$

where $\forall k \in C_j, \forall k' \in A_j \cup B_j, \forall k' \ne k, \forall j \in J$.

$$w_{k,LH} + u_{k,LH} + v_{k,LH} + z_{k,LH} - \sum_{t \in T} (w'_{k,t} + u'_{k,t} + v'_{k,t} + z'_{k,t}) \le 0, \quad (38)$$

where $\forall k \in D_j, \forall k' \in A_j \cup B_j, \forall k' \ne k, \forall j \in J$.

The above half period leave award processing constraints are used in the case where only leave requests are to be processed. These constraints enforce the requirement that at a location every employee who has a full month equivalent leave request must be awarded a leave request if any half period leave request is awarded. These constraints establish a relationship between each employee with a half period leave request, and each employee with a full period equivalent leave request.

The inequality (37) states that an awarded first half period leave request for an employee at a location implies that every other employee with a full period equivalent leave request at the same location must be awarded a leave request. The inequality (38) states that an awarded last half period leave request for an employee at a location implies that every other employee with a full period equivalent leave request at the same location must be awarded a leave request.

Figure 17:
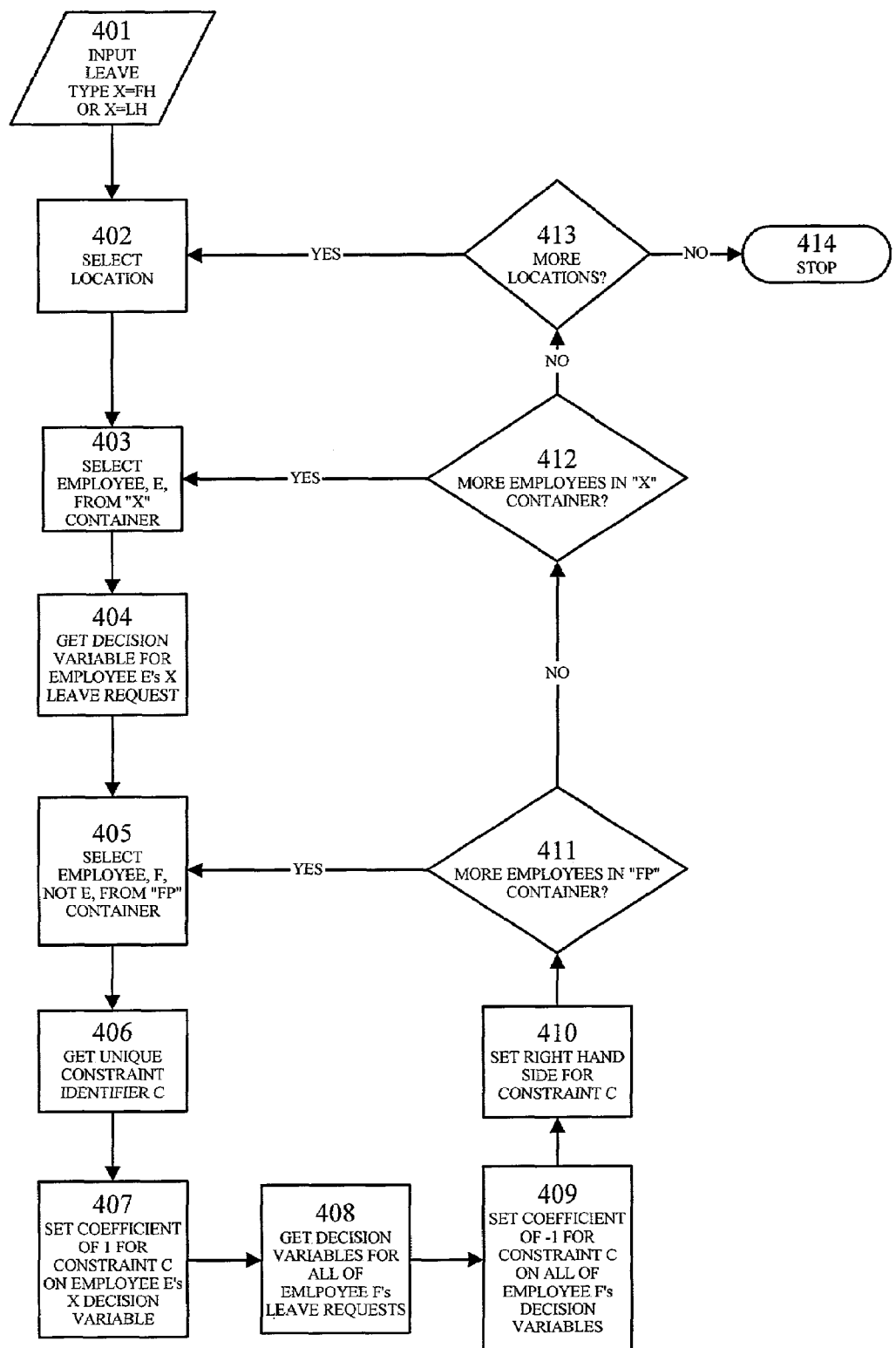
FIG. 17 is a logic flow process diagram of the generation of the half period leave award processing constraints of logic step 89 of FIG. 4.

These constraints are created for every location for which half period and full period equivalent leave requests exist. The generation of the constraints of inequalities (37)-(38) is illustrated in FIG. 17, which is described in detail later in this specification.

Single Leave Award Restriction $$\sum_{t \in T} (w_{k,t} + u_{k,t} + v_{k,t} + z_{k,t}) \leq 1, \forall k \in L \quad (39)$$

The single leave award restriction is used in the case when only leave requests are to be processed. This constraint is used to enforce the requirement that no more than one leave request is awarded to any employee. This constraint states that the sum of the leave requests for an employee may not exceed one. Although the condition for the inequality (39) states that this constraint exists for all employees with leave requests, it is relevant only for all employees with more than one leave request.

Figure 18:
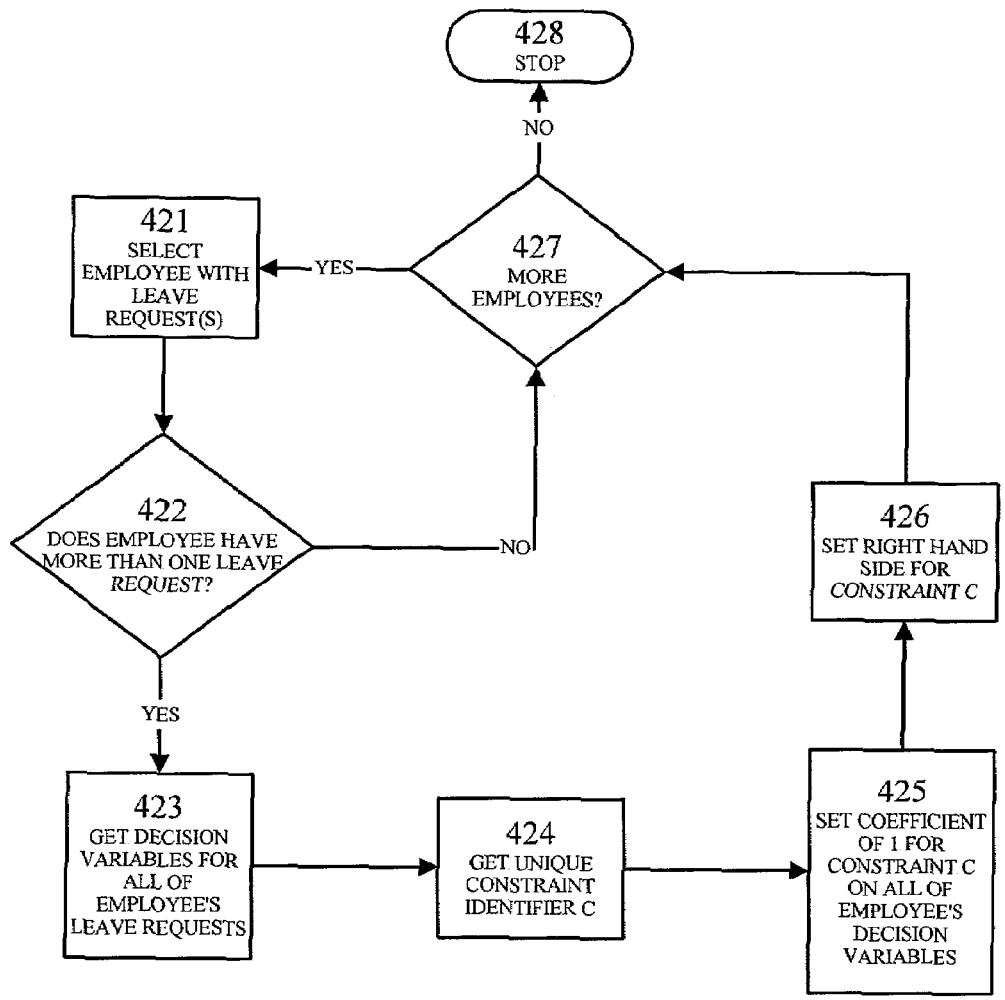
FIG. 18 is a logic flow process diagram of the generation of the single leave award restriction of logic step 90 of FIG. 4.

The generation of this constraint is illustrated in FIG. 18, which is described in detail later in this specification.

Jobshare Junior Partner Award Constraint $$w_{k',JS} - w_{k,JS} = 0, \forall \{k',k\} \in \Gamma \quad (40)$$

The above jobshare junior partner award constraint is used in the case where only leave requests are to be processed, and in the case when both leave requests and transfer requests are to be processed. This constraint states that the jobshare request for a senior jobshare partner, minus the jobshare request for the associated junior jobshare partner, equals zero. This constraint is used to establish a relationship between jobshare requesting partners. It states that the awarding of a senior partner's jobshare request implies that the associated junior partner's jobshare request is awarded.

Figure 19:
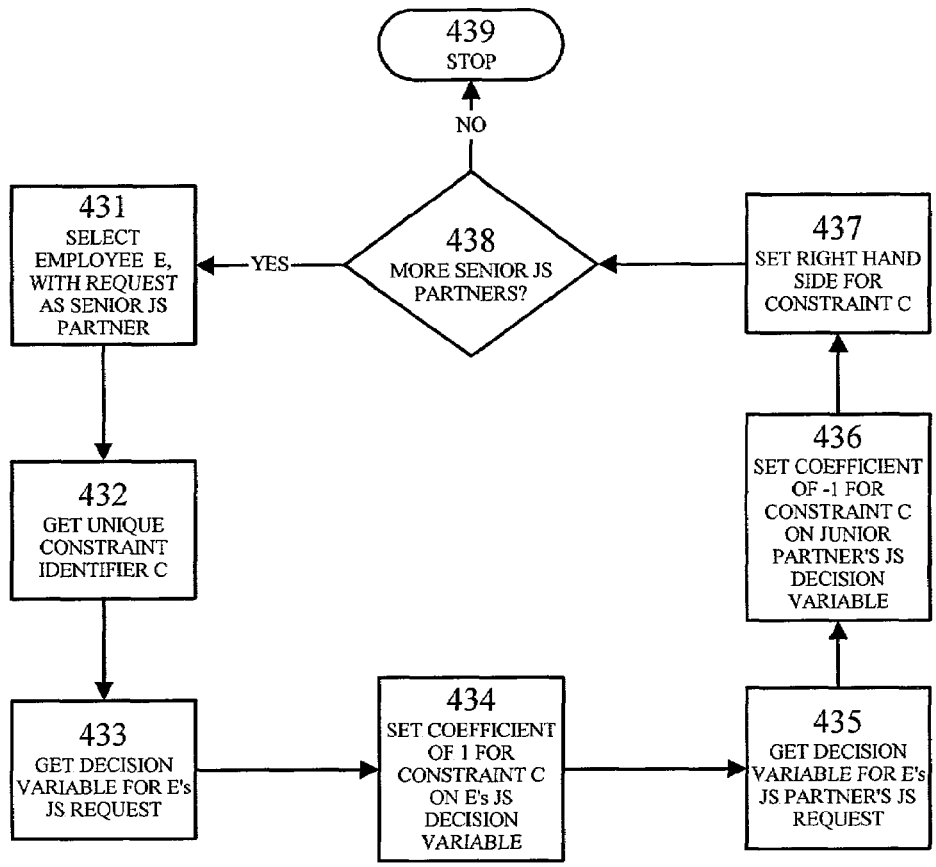
FIG. 19 is a logic flow process diagram of the generation of the junior jobshare partner constraint of logic step 91 of FIG. 4.

The constraint of equation (40) is generated for all jobshare partner employee pairs, and is illustrated in FIG. 19 which will be described in detail later in this specification.

Minimum/Maximum Leave Range Constraints $$\sum_{k \in A_j} w_{k,JS} + \sum_{k \in B_j} (w_{k,FP} + u_{k,FP} + v_{k,FP} + z_{k,FP}) \geq \lambda_{j,FP}, \quad (41)$$
$$\forall j \in J$$

$$\sum_{k \in C_j} (w_{k,FH} + u_{k,FH} + v_{k,FH} + z_{k,FH}) \geq \lambda_{j,FH}, \forall j \in J \quad (42)$$

$$\sum_{k \in D_j} (w_{k,LH} + u_{k,LH} + v_{k,LH} + z_{k,LH}) \geq \lambda_{j,LH}, \forall j \in J \quad (43)$$

$$\sum_{k \in A_j} w_{k,JS} + \sum_{k \in B_j} (w_{k,FP} + u_{k,FP} + v_{k,FP} + z_{k,FP}) \leq \mu_{j,FH}, \quad (44)$$
$$\forall j \in J$$

$$\sum_{k \in C_j} (w_{k,FH} + u_{k,FH} + v_{k,FH} + z_{k,FH}) \leq \mu_{j,FH}, \forall j \in J \quad (45)$$

$$\sum_{k \in D_j} (w_{k,LH} + u_{k,LH} + v_{k,LH} + z_{k,LH}) \leq \mu_{j,LH}, \forall j \in J \quad (46)$$

The above minimum/maximum leave range constraints are used in the case where only leave requests are to be processed, and in the case where both leave requests and transfer requests are to be processed. These constraints require that at least a minimum quantity of full period leave requests be awarded at specified locations, a minimum quantity of first half period leave requests be awarded at specified locations, a minimum quantity of last half period leave requests be awarded at specified locations, the quantity of full period leave awards at specified locations be limited to a maximum value, the quantity of first half period leave awards at specified locations be limited to a maximum value, and the quantity of last half period leave awards at specified locations be limited to a maximum value.

Inequality (41) states that the sum of awarded full period equivalent leaves through senior partner jobshare requests or full period leave requests at a location is no less than the specified minimum value. Inequality (42) states that the sum of awarded first half period leaves at a location is no less that the specified minimum value. Inequality (43) states that the sum of awarded last half period leaves at a location is no less than the specified minimum value. Inequality (44) states that the sum of awarded full period equivalent leaves through senior partner jobshare requests or full period leave requests at a location is no more than the specified maximum value. Inequality (45) states that the sum of awarded first half period leaves at a location is no more than the specified maximum value. Inequality (46) states that the sum of awarded last half period leaves at a location is no more than the specified maximum value.

Figure 20:
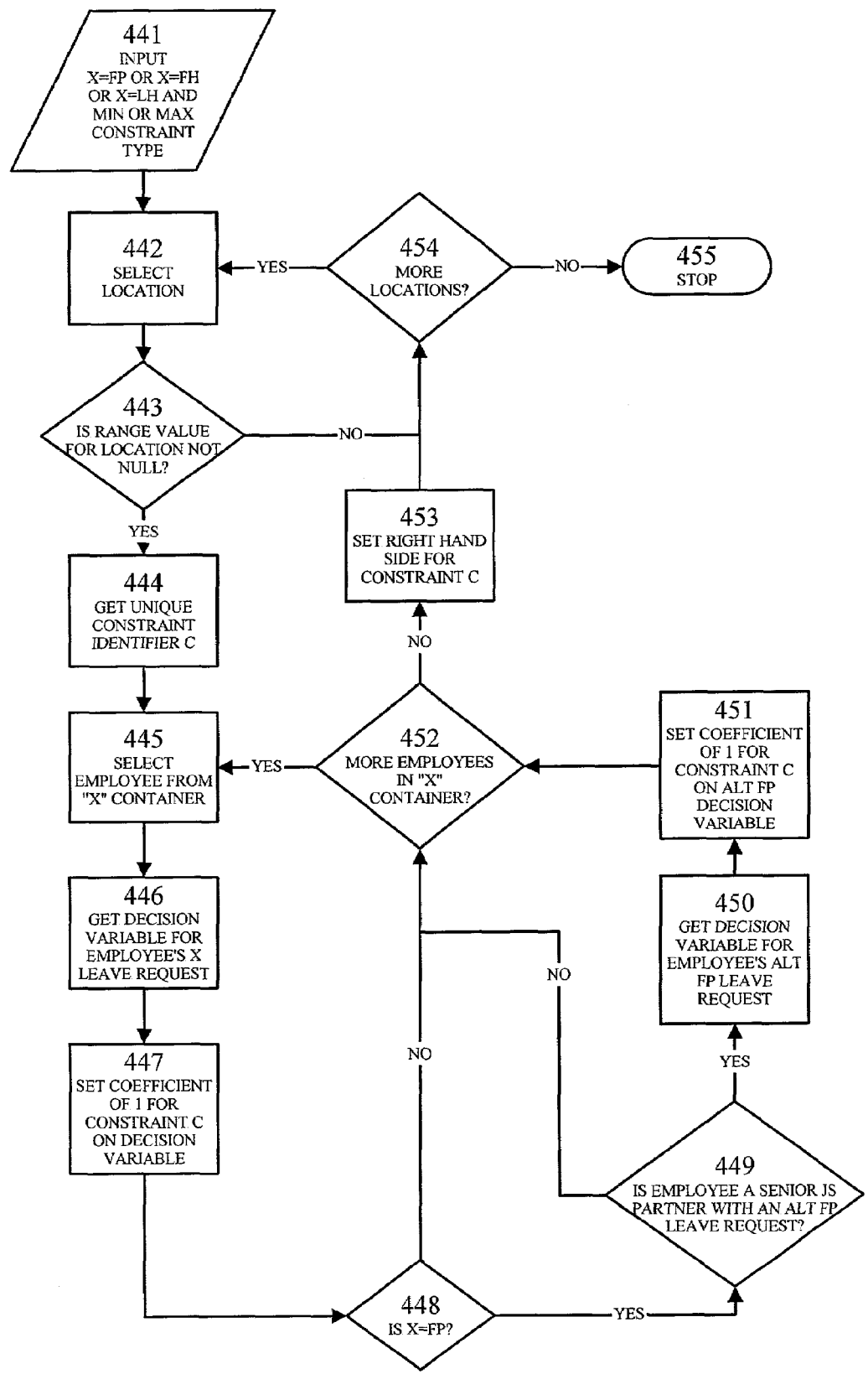
FIG. 20 is a logic flow process diagram of the generation of the minimum and maximum leave award constraints of logic steps 73 and 92 of FIG. 4.

These constraints are generated for locations where the corresponding parameter values are non-null. The generation of the constraints of inequalities (41)-(46) is illustrated in FIG. 20, which is described in detail later in this specification.

Leave Decision Variable Bounds $$w_{k,j} \in \{0,1\} \quad (47)$$

$$u_{k,j} \in \{0,1\} \quad (48)$$

$$v_{k,j} \in \{0,1\} \quad (49)$$

$$z_{k,j} \in \{0,1\} \quad (50)$$

$$f_{j,t} \in \Re^+ \quad (51)$$

$$g_{j,t} \in \Re^+ \quad (52)$$

$$s_j \in \Re^+ \quad (53)$$

The leave decision variable bounds are used in the case where only leave requests are to be processed, and in the case where both leave requests and transfer requests are to be processed. These bounds define the types of values that the decision variables may take. They are applicable to all corresponding decision variables that are created.

Bound (47) indicates that a primary leave request is a binary variable, and may only take the values of zero or one. Bound (48) indicates that a secondary leave request is a binary variable, and may only take the values of zero or one. Bound (49) indicates that a third preference leave request is a binary variable, and may only take the values of zero or one. Bound (50) indicates that a fourth preference leave request is a binary variable, and may only take the values of zero or one. Bound (51) indicates that the under-awarding variables are continuous variables that may take only non-negative real values. Bound (52) indicates that the over-awarding variables are continuous variables that may take only non-negative real values. Bound (53) indicates that the full period leave slack variables are continuous variables that may take only non-negative real values.

It should be noted that although the under-awarding variables, over-awarding variables, and full period leave slack variables are defined as continuous variables, it is expected that they take integer variables. This is assured through the definition of the other bounds (47), (48), (49), and (50). Thus the under-awarding, over-awarding, and full period leave slack variables are expected to take non-negative integer values, but need not be defined as integer variables because of their relationships to the other decision variables and their associated definitions. This point is relevant because the resulting mixed integer program model is more easily solved with fewer discrete variables.

The mixed integer program model for the case where only leave requests are to be processed consists of equation (24) as its objective function, inequalities (25)-(27) or inequalities (28)-(30), depending on the requirement to match staffing levels exactly, the constraints of inequalities (31) through (39), equation (40), inequalities (41)-(46), and bounds (47) through (53).

Transfer/Leave Objective Function

Maximize (54)

$$Z^{TL} = c \sum_{k \in K} \sum_{j \in J} x_{k,j} + d \sum_{k \in K} \sum_{j \in J} y_{k,j} + a \sum_{k \in K} \sum_{t \in T} w_{k,t} +$$
$$b \sum_{k \in K} \sum_{t \in T} u_{k,t} + l \sum_{k \in K} \sum_{t \in T} v_{k,t} + m \sum_{k \in K} \sum_{t \in T} z_{k,t} -$$
$$p \sum_{k \in K} \sum_{t \in T} f_{j,t} - q \sum_{j \in J} \sum_{t \in T} g_{j,t}$$

The above transfer/leave objective function is used in the case where both leave requests and transfer requests are to be processed. The objective is to maximize the quantity of awarded primary transfer requests, awarded secondary transfer requests, awarded primary leave requests, awarded secondary leave requests, awarded third preference leave requests, and awarded fourth preference leave requests. A penalty is assessed for under-awarding leaves and for over-awarding leaves. The under-awarding and over-awarding leave variables also serve as a mechanism for penalizing overstaffing or understaffing at a location. The coefficients a, b, c, d, l, m, p, and q are set so that the model is biased towards awarding transfer requests over leave requests, primary transfer requests over secondary transfer requests, primary leave requests over secondary leave requests, secondary leave requests over third preference leave requests, and third preference leave requests over fourth preference leave requests, and biased against under-awarding or over-awarding leave requests. Empirical results have demonstrated that the following relationship among the coefficients yields acceptable results: for some value a that is divisible by three and divisible by four, let b equal a divided by 2, let c equal two times a, let d equal a, let l equal a divided by 3, let m equal a divided by four, let p equal four times a, and let q equal 10 times a.

Model Constraints

Exact Transfer/Leave Staffing Constraints $$\sum_{k \in \Phi'_j} x_{k,j} + \sum_{k \in \Phi_j \setminus \Phi'_j} y_{k,j} - \sum_{k \in \Theta_j} (x_{k,i} + y_{k,i}) + h_j - \sum_{k \in A_j} w_{k,JS} - \quad (55)$$
$$\sum_{k \in B_j} (w_{k,FP} + u_{k,FP} + v_{k,FP} + z_{k,FP}) - s_j = S_j, \forall j \in J$$

$$\sum_{k \in C_j} (w_{k,FH} + u_{k,FH} + v_{k,FH} + z_{k,FH}) - s_j = 0, \forall j \in J \quad (56)$$

$$r_j - \sum_{k \in D_j} (w_{k,LH} + u_{k,LH} + v_{k,LH} + z_{k,LH}) + s_j = -\eta_j, \forall j \in J \quad (57)$$

The exact transfer/leave staffing constraints of the above equations (55)-(57) are used in the case when both leave requests and transfer requests are to be processed. These constraints enforce the required staffing level for every location. They permit the under-awarding of full period leaves (overstaffing) if the under-awarding can be compensated by the awarding of first half period leaves and last half period leaves. These constraints are created for every location. The intent of the exact transfer/leave staffing constraints is to generate solutions that meet the staffing requirements, if possible, or encounter infeasibility and return no solution.

Equation (55) states that the sum of awarded primary transfer requests into a location, plus the sum of awarded secondary transfer requests into the location, minus the sum of awarded primary and secondary transfer requests out of the location, plus the quantity of new hires assigned to the location, minus the sum of awarded senior partner jobshare requests at the location, minus the sum of awarded primary, secondary, third, and fourth preference full period leave requests at the location, minus the full period slack term for the location, equals the required staffing level for the location. It implies that the difference in employees, including new hires, assigned to the location minus the full period equivalent leaves awarded at the location minus the full period slack term equals the required staffing level for the next time period.

Equation (56) is identical to equation (26) and has the same implications. Equation (57) states that the quantity of assigned last half period new hires to a location, minus the sum of awarded primary, secondary, third, and fourth preference last half period leaves at the location, plus the full period slack term for the location, equals the negative of the user-specified last half period new hires assigned to the location. This equation implies that the quantity of last half period leaves awarded at a location must equal the sum of the user-specified last half period new hires, the assigned last half period new hires, and the full period slack term.

These constraints are used only if the configuration indicator specifying that the staffing level must be matched exactly is set to yes.

Figure 21:
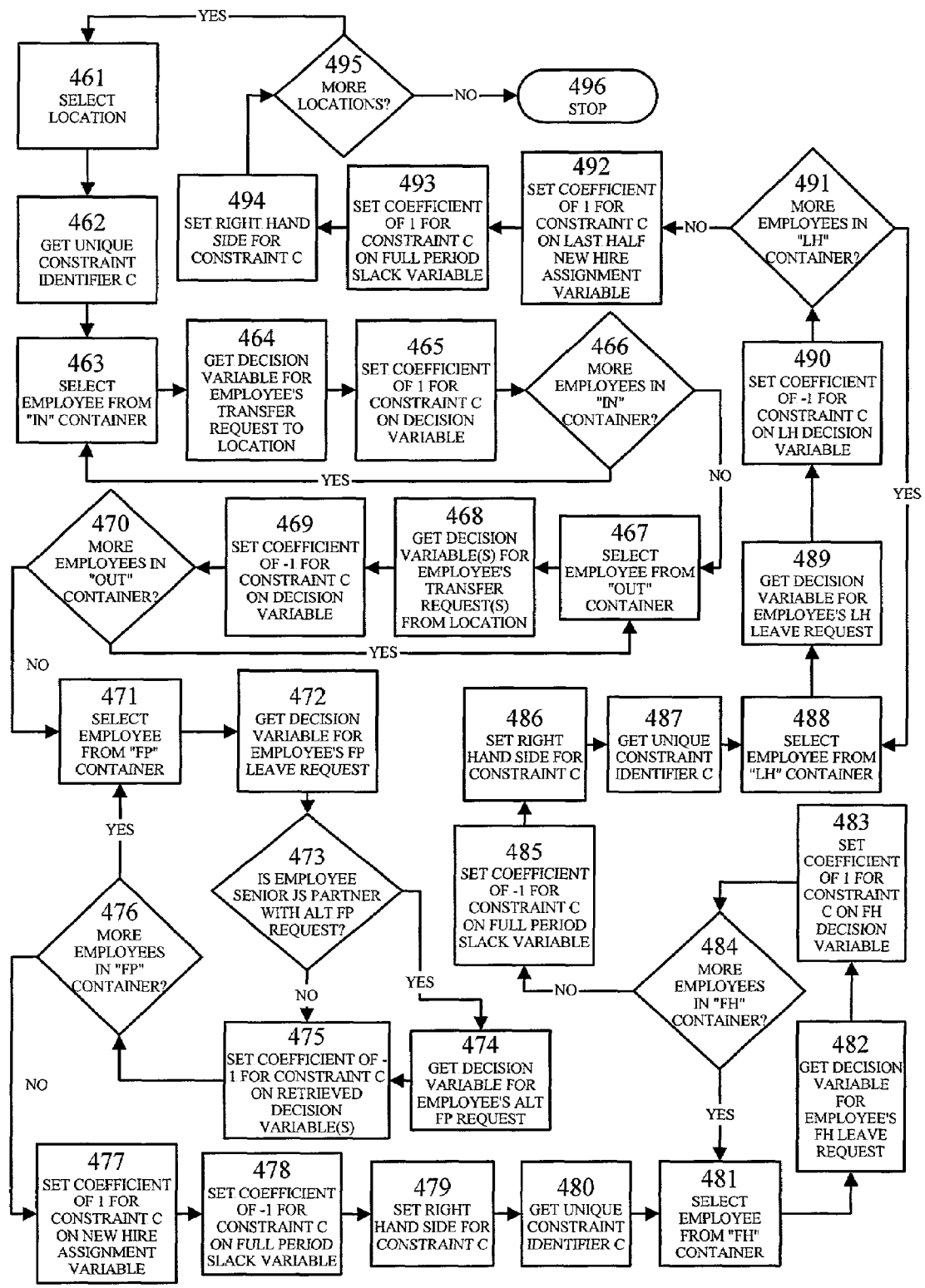
FIG. 21 is a logic flow process diagram of the generation of the exact transfer and leave staffing constraints of logic step 63 of FIG. 4.

The generation of the constraints of equations (55)-(57) is illustrated in FIG. 21, which is described in detail later in this specification.

Approximate Transfer/Leave Staffing Constraints $$\sum_{k \in \Phi'_j} x_{k,j} + \sum_{k \in \Phi_j \setminus \Phi'_j} y_{k,j} - \sum_{k \in \Theta_j} (x_{k,i} + y'_{k,i}) + h_j - \sum_{k \in A_j} w_{k,JS} - \quad (58)$$

$$\sum_{k \in B_j} (w_{k,FP} + u_{k,FP} + v_{k,FP} + z_{k,FP}) \forall \; j \in J - f_{j,FP} + g_{j,FP} =$$

$$S_j, \forall \; j \in J$$

$$\sum_{k \in C_j} (w_{k,FH} + u_{k,FH} + v_{k,FH} + z_{k,FH}) - \quad (59)$$

$$f_{j,FP} + g_{j,FP} + f_{j,FH} - g_{j,FH} = 0, \forall \; j \in J$$

$$r_j - \sum_{k \in D_j} (w_{k,LH} + u_{k,LH} + v_{k,LH} + z_{k,LH}) + \quad (60)$$

$$f_{j,FP} - g_{j,FP} - f_{j,FH} + g_{j,FH} = -\eta_j, \forall \; j \in J$$

The approximate transfer/leave staffing constraints are used in the case where both leave requests and transfer requests are to be processed. These constraints establish relationships between awarded transfer requests, awarded full period equivalent leaves, awarded first half period leaves, awarded last half period leaves, assigned new hires, assigned last half period new hires, and the required staffing level for each location. Based on the awarded transfer and leave requests, these constraints determine if a location is understaffed through a full period leave over-awarding variable, and if a location is overstaffed through a first half period under-awarding variable and a last half period under-awarding variable. Understaffing and overstaffing are penalized in the objective function of equation (54). These constraints are generated for every location.

Equation (58) states that the sum of awarded primary transfer requests into a location, plus the sum of awarded secondary transfer requests into the location, minus the sum of awarded primary and secondary transfer requests out of the location, plus the quantity of new hires assigned to the location, minus the sum of awarded senior partner jobshare requests at the location, minus the sum of awarded primary, secondary, third, and fourth preference full period leave requests at the location, minus the full period under-awarding variable, plus the full period over-awarding variable, equals the required staffing level for the location. It implies that the difference in employees, including new hires, assigned to the location, minus the full period equivalent leaves awarded at the location, should be equal to the required staffing level for the next time period; otherwise, understaffing through the realization of a positive-valued over-awarding variable, and overstaffing through the realization of a positive-valued under-awarding variable are penalized in the objective function of equation (54).

Equation (59) states that the sum of awarded primary, secondary, third preference, and fourth preference full period leave requests at a location, minus the full period under-awarding variable for the location, plus the full period over-awarding variable for the location, plus the first half period under-awarding variable for the location, minus the first half period over-awarding variable for the location, equals zero. It implies that the sum of awarded first half period leaves at a location equals the overstaffing quantity determined by equation (58); otherwise, additional penalties are assessed for under-awarding first half period leaves and for over-awarding first half period leaves.

Equation (60) states that the quantity of assigned last half period new hires to a location, minus the sum of awarded primary, secondary, third, and fourth preference last half period leaves at the location, plus the full period under-awarding variable for the location, minus the full period over-awarding variable for the location, minus the last half period under-awarding variable for the location, plus the last half period over-awarding variable for the location, equals the negative of the user-specified last half period new hires assigned to the location. This equation implies that the quantity of last half period leaves awarded at a location equals the sum of the user-specified last half period new hires, the assigned last half period new hires, and the overstaffing quantity determined by equation (58); otherwise, additional penalties are assessed for under-awarding last half period leaves, and for over-awarding last half period leaves.

Noteworthy of the structure of the approximate transfer/leave staffing constraints is that if awarded transfers and leaves result in understaffing a location, the understaffing penalty is assessed at least twice and potentially a third time. This occurs when the full period over-awarding variable realizes a positive value thus forcing an equal value upon the first half period over-awarding variable. The understaffing thereupon is penalized twice in the objective function of equation (54). The penalty may be assessed again if no last half period new hires, user specified or otherwise, are assigned to the location. Additionally, the structure of these constraints penalizes full period under-awarding even if the under-awarding can be compensated by the awarding of first half period leaves, the awarding of last half period leaves, and the assignment (user-specified or otherwise) of last half period new hires. This structure has the advantage of placing high importance on meeting required staffing levels without the use of first half period leaves and last half period leaves. In practice, this advantage has eliminated the need to use the half period leave award processing constraints of inequalities (37) and (38) to enforce the requirement that at a location, every employee who has a full month equivalent leave request must be awarded a leave request if any half period leave request is awarded.

The constraints are used only if the configuration indicator specifying that the staffing level must be matched exactly is set to no.

Figure 22:
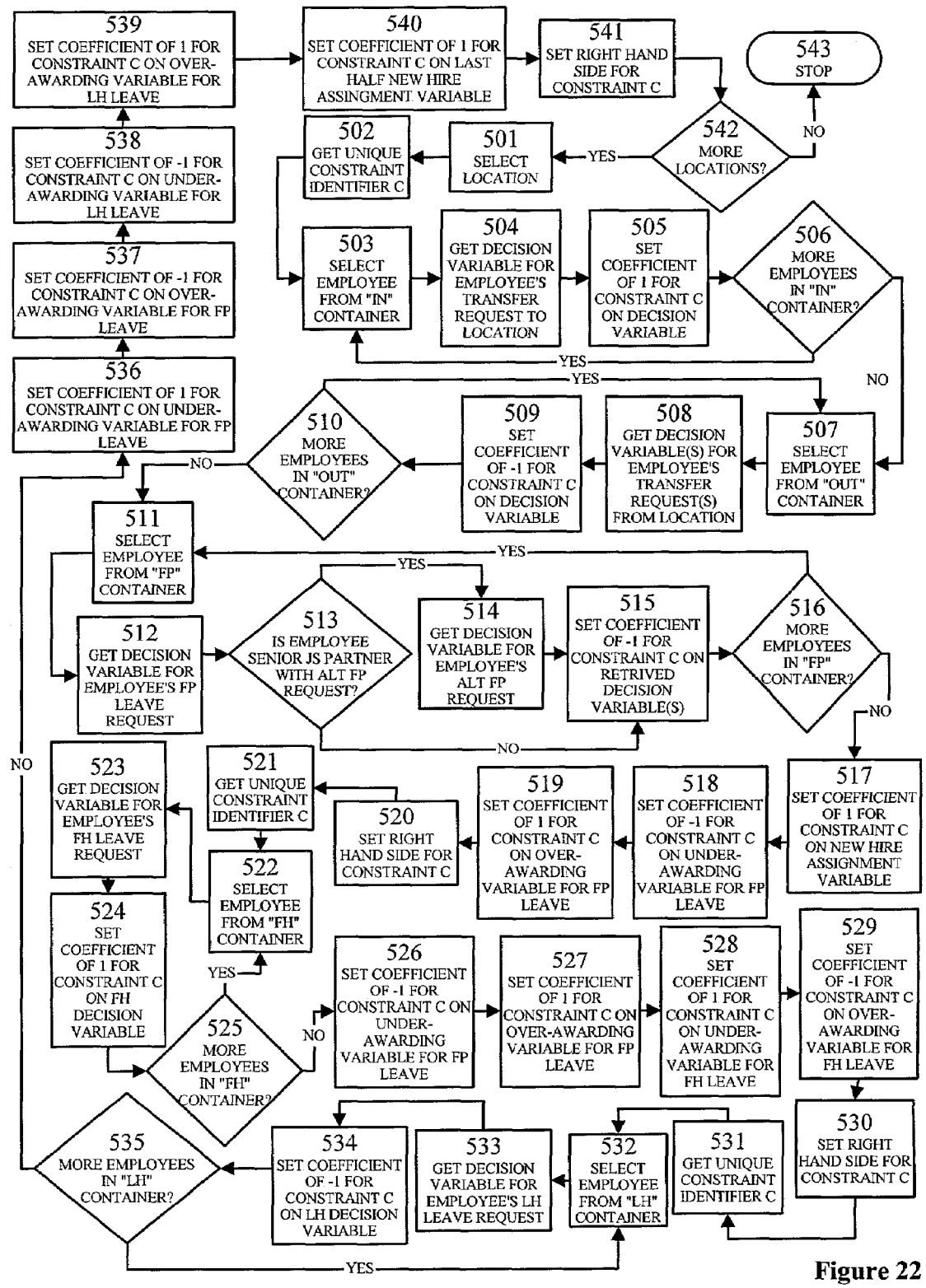
FIG. 22 is a logic flow process diagram of the generation of the approximate transfer and leave staffing constraints of logic step 64 of FIG. 4.

The generation of the constraints of equations (58)-(60) is illustrated in FIG. 22, which is described in detail later in this specification.

Transfer/Full Period Leave Seniority Processing Constraints $$\sum_{t \in \{JS,FP\}} (w_{k,t} + u_{k,t} + v_{k,t} + z_{k,t}) - \sum_{t \in \{JS,FP\}} w_{k',t} \leq 0, \text{ where} \quad (61)$$

$$k \in A_j \cup B_j, k' \in (A_j \cup B'_j) \setminus \Theta_j \setminus \Phi_j, k' \gg k, \forall j \in J.$$

$$\sum_{t \in \{JS,FP\}} (w_{k,t} + u_{k,t} + v_{k,t} + z_{k,t}) - \sum_{t \in \{JS,FP\}} w_{k',t} - x_{k',j} - y_{k',j'} 0, \quad (62)$$

$$\text{where } k \in A_j \cup B_j, k' \in (A_j \cup B'_j) \cap \Theta_j, k' \gg k, \forall j \in J.$$

$$0 \leq \sum_{t \in \{JS,FP\}} (w_{k,t} + u_{k,t} + v_{k,t} + z_{k,t}) - 2 \sum_{t \in \{JS,FP\}} w_{k',t} + x_{k',j} \leq 1, \quad (63)$$

$$\text{where } k \in A_j \cup B_j, k' \in (A_j \cup B'_j) \cap \Phi_j, k' \gg k, \forall j \in J.$$

$$0 \leq \sum_{t \in \{JS,FP\}} (w_{k,t} + u_{k,t} + v_{k,t} + z_{k,t}) - 2 \sum_{t \in \{JS,FP\}} w_{k',t} + y_{k',j} \leq 1, \quad (64)$$

$$\text{where } k \in A_j \cup B_j, k' \in (A_j \cup B'_j) \cap (\Phi_j \setminus \Phi'_j), k' \gg k, \forall j \in J.$$

$$\sum_{t \in \{JS,FP\}} (w_{k,t} + u_{k,t} + v_{k,t} + z_{k,t}) - \sum_{t \in T} (w_{k',t} + u_{k',t} + v_{k',t} + z_{k',t}) \leq 0, \quad (65)$$

$$\text{where } k \in A_j \cup B_j, k' \in (B_j \setminus B'_j \setminus A_j) \setminus \Theta_j \setminus \Phi_j, k' \gg k, \forall j \in J.$$

$$\sum_{t \in \{JS,FP\}} (w_{k,t} + u_{k,t} + v_{k,t} + z_{k,t}) - \quad (66)$$

$$\sum_{t \in T} (w_{k',t} + u_{k',t} + v_{k',t} + z_{k',t}) - x_{k',j} - y_{k',j'} \leq 0,$$

$$\text{where } k \in A_j \cup B_j, k' \in (B_j \setminus B'_j \setminus A_j) \cap \Theta_j, k' \gg k, \forall j \in J.$$

$$0 \leq \sum_{t \in \{JS,FP\}} (w_{k,t} + u_{k,t} + v_{k,t} + z_{k,t}) - \quad (67)$$

$$2 \sum_{t \in T} (w_{k',t} + u_{k',t} + v_{k',t} + z_{k',t}) + x_{k',j} \leq 1,$$

$$\text{where } k \in A_j \cup B_j, k' \in (B_j \setminus B'_j \setminus A_j) \cap \Phi_j, k' \gg k, \forall j \in J.$$

$$0 \leq \sum_{t \in \{JS,FP\}} (w_{k,t} + u_{k,t} + v_{k,t} + z_{k,t}) - \quad (68)$$

$$2 \sum_{t \in T} (w_{k',t} + u_{k',t} + v_{k',t} + z_{k',t}) + y_{k',j} \leq 1,$$

$$\text{where } k \in A_j \cup B_j, k' \in (B_j \setminus B'_j \setminus A_j) \cap (\Phi_j \setminus \Phi'_j), k' \gg k, \forall j \in J.$$

The transfer/full period leave seniority processing constraints are used in the case where both leave requests and transfer requests are to be processed. These constraints establish the relationships among the employees with full period equivalent leave requests at the same location. They account for exceptional relationships among employees with transfer requests and full period equivalent leave requests. These constraints enforce the seniority rules regarding the awarding of full period leave and jobshare requests in seniority order.

Inequality (61) is similar to inequality (31). It states that awarding a junior employee's primary, secondary, third preference, or fourth preference full period equivalent request, either as a senior partner of a jobshare request or through a full period leave request, implies that all employees at the same location, with primary full period equivalent leave requests (but without any transfer requests) senior to the junior employee are awarded their primary leave request. Inequality (62) states that awarding a junior employee's primary, secondary, third, or fourth preference full period equivalent request, either as a senior partner of a jobshare request or through a full period leave request, implies that all employees at the same location, with primary full period equivalent leave requests and transfer requests out of the location, who are senior to the junior employee are awarded either their primary leave request or one of their transfer requests.

Inequality (63) states that awarding a junior employee's primary, secondary, third preference, or fourth preference full period equivalent request, either as a senior partner of a jobshare request or through a fill period leave request, implies that all employees with primary full period equivalent leave requests and primary transfer requests to the location who are senior to the junior employee, are either awarded both their transfer request to the location and their primary leave request, or not awarded either request. Inequality (64) states that awarding a junior employee's primary, secondary, third preference, or fourth preference full period equivalent request, either as a senior partner of a jobshare request or through a full period leave request, implies that all employees with primary full period equivalent leave requests and secondary transfer requests to the location who are senior to the junior employee are either awarded both their transfer request to the location and their primary leave request, or not awarded either request.

Inequality (65) is similar to inequality (32). It states that awarding a junior employee's primary, secondary, third, or fourth preference full period equivalent leave request, either as a senior partner of a jobshare request or through a full period leave request, implies that all employees at the same location, with secondary, third, or fourth preference full period leave requests (but without a primary full period equivalent leave request or any transfer requests) who are senior to the junior employee are awarded one of their leave requests. Inequality (66) states that awarding a junior employee's primary, secondary, third, or fourth preference full period equivalent leave request, either as a senior partner of a jobshare request or through a full period leave request, implies that all employees at the same location, with secondary, third, or fourth preference full period leave requests and transfer requests out of the location (but without a primary full period equivalent leave request) who are senior to the junior employee are awarded either one of their leave requests at the location or one of their transfer requests.

Inequality (67) states that awarding a junior employee's primary, secondary, third preference, or fourth preference full period equivalent request, either as a senior partner of a jobshare request or through a full period leave request, implies that all employees with secondary, third, or fourth preference full period leave requests and primary transfer requests to the location (but without a primary full period equivalent leave request who are senior to the junior employee are either awarded both their transfer request to the location and one of their leave requests for the location, or not awarded the transfer request to the location or one of the leave requests for the location. Inequality (68) states that awarding a junior employee's primary, secondary, third, or fourth preference full period equivalent request, either as a senior partner of a jobshare request or through a full period leave request, implies that all employees with secondary, third, or fourth preference full period leave requests and secondary transfer requests to the location (but without a primary full period equivalent leave request) who are senior to the junior employee are either awarded both their transfer request to the location and one of their leave requests for the location, or not awarded the transfer request to the location or one of the leave requests for the location.

Figure 23:
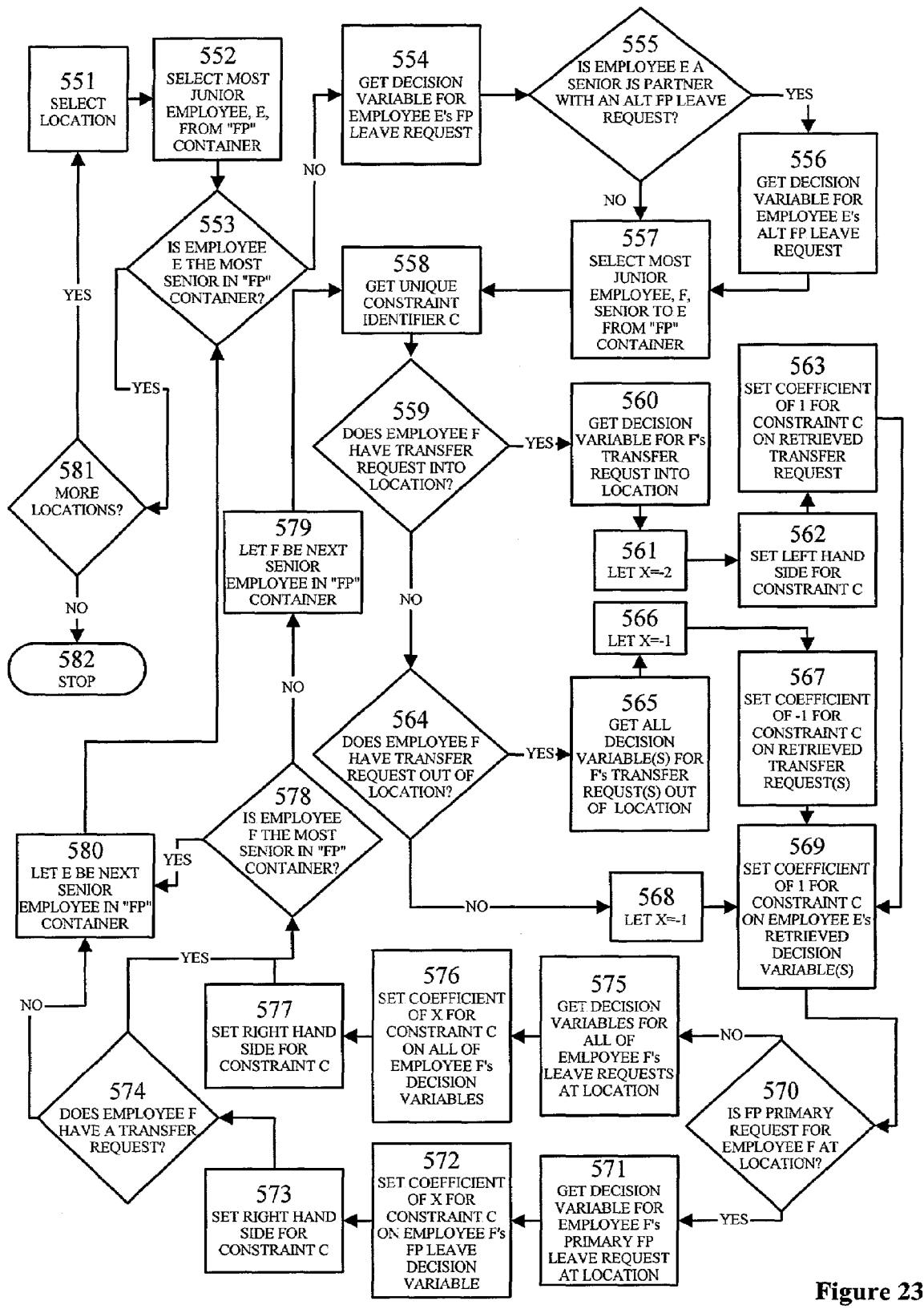
FIG. 23 is a logic flow process diagram of the generation of the transfer and full period leave seniority processing constraints of logic step 66 of FIG. 4.

These constraints are created for every location for which full period equivalent leave requests exist. The generation of the constraints of inequalities (61)-(68) is illustrated in FIG. 23, which is described in detail later in this specification.

Transfer/First Half Period Leave Seniority Processing Constraints $$w_{k,FH}+u_{k,FH}+v_{k,FH}+z_{k,FH}-w_{k',FH} \leq 0, \text{ where } k \in C_j, k' \in C'_j \backslash \Theta_j \backslash \Phi_j, k' \gg k, \forall j \in J. \tag{69}$$

$$w_{k,FH}+u_{k,FH}+v_{k,FH}+z_{k,FH}-w_{k',FH}-x_{k',j}-y_{k',j} \leq 0 \text{ where } k \in C_j, k' \in C'_j \cap \Theta_j, k' \gg k, \forall j \in J. \tag{70}$$

$$0 \leq w_{k,FH}+u_{k,FH}+v_{k,FH}+z_{k,FH}-2w_{k',FH}+x_{k',j} \leq 1, \text{ where } k \in C_j, k' \in C'_j \cap \Phi'_j, k' \gg k, \forall j \in J. \tag{71}$$

$$0 \leq w_{k,FH}+u_{k,FH}+v_{k,FH}+z_{k,FH}-2w_{k',FH}+y_{k',j} \leq 1, \text{ where } k \in C_j, k' \in C'_j \cap (\Phi_j \backslash \Phi'_j), k' \gg k, \forall j \in J. \tag{72}$$

$$w_{k,FH}+u_{k,FH}+v_{k,FH}+z_{k,FH}-\sum_{t \in T}(w_{k',t}+u_{k',t}+v_{k',t}+z_{k',t}) \leq 0, \tag{73}$$
where $k \in C_j, k' \in (C_j \backslash C'_j) \backslash \Theta_j \backslash \Phi_j, k' \gg k, \forall j \in J$.

$$w_{k,FH}+u_{k,FH}+v_{k,FH}+z_{k,FH}- \tag{74}$$
$$\sum_{t \in T}(w_{k',t}+u_{k',t}+v_{k',t}+z_{k',t})-x_{k',i}-y_{k',i'} \leq 0,$$
where $k \in C_j, k' \in (C_j \backslash C'_j) \cap \Theta_j, k' \gg k, \forall j \in J$.

$$0 \leq w_{k,FH}+u_{k,FH}+v_{k,FH}+z_{k,FH}- \tag{75}$$
$$2\sum_{t \in T}(w_{k',t}+u_{k',t}+v_{k',t}+z_{k',t})+x_{k',j} \leq 1,$$
where $k \in C_j, k' \in (C_j \backslash C'_j) \cap \Phi'_j, k' \gg k, \forall j \in J$.

$$0 \leq w_{k,FH}+u_{k,FH}+v_{k,FH}+z_{k,FH}- \tag{76}$$
$$2\sum_{t \in T}(w_{k',t}+u_{k',t}+v_{k',t}+z_{k',t})+y_{k',j} \leq 1,$$
where $k \in C_j, k' \in (C_j \backslash C'_j) \cap (\Phi_j \backslash \Phi'_j), k' \gg k, \forall j \in J$.

The transfer/first half period leave seniority processing constraints are used in the case where both leave requests and transfer requests are to be processed. These constraints establish the relationships among the employees with first half period leave requests at the same location. They account for exceptional relationships among employees with transfer requests and first half period leave requests. These constraints enforce the seniority rules regarding the awarding of first half period leave requests in seniority order.

Inequality (69) is similar to inequality (33). It states that awarding a junior employee's primary, secondary, third, or fourth preference first half period leave request implies that all employees at the same location, with primary first half period leave requests but without any transfer requests, who are senior to the junior employee are awarded their primary leave request. Inequality (70) states that awarding a junior employee's primary, secondary, third, or fourth preference first half period leave request implies that all employees at the same location, with primary first half period leave requests and transfer requests out of the location, who are senior to the junior employee are awarded either their primary leave request or one of their transfer requests.

Inequality (71) states that awarding a junior employee's primary, secondary, third, or fourth preference first half period leave request implies that all employees with primary first half period leave requests and primary transfer requests to the location who are senior to the junior employee, are either awarded both their transfer request to the location and their primary leave request, or are not awarded either request. Inequality (72) states that awarding a junior employee's primary, secondary, third, or fourth preference first half period leave request, implies that all employees with primary first half period leave requests and secondary transfer requests to the location who are senior to the junior employee are either awarded both their transfer request to the location and their primary leave request, or not awarded either request.

Inequality (73) is similar to inequality (34). It states that awarding a junior employee's primary, secondary, third, or fourth preference first half period leave request implies that all employees at the same location, with secondary, third, or fourth preference first half period leave requests (but without a primary first half period leave request or any transfer requests) who are senior to the junior employee are awarded one of their leave requests. Inequality (74) states that awarding a junior employee's primary, secondary, third, or fourth preference first half period leave request implies that all employees at the same location, with secondary, third, or fourth preference first half period leave requests and transfer requests out of the location (but without a primary first half period leave request) who are senior to the junior employee are awarded either one of their leave requests at the location, or one of their transfer requests.

Inequality (75) states that awarding a junior employee's primary, secondary, third, or fourth preference first half period leave request implies that all employees with secondary, third, or fourth preference first half period leave requests and primary transfer requests to the location (but without a primary first half period leave request) who are senior to the junior employee are either awarded both their transfer request to the location and one of their leave requests for the location, or are not awarded the transfer request to the location or one of the leave requests for the location. Inequality (76) states that awarding a junior employee's primary, secondary, third, or fourth preference first half period leave request implies that all employees with secondary, third, or fourth preference first half period leave requests and secondary transfer requests to the location (but without a primary first half period leave request) who are senior to the junior employee are either awarded both their transfer request to the location and one of their leave requests for the location, or are not awarded the transfer request to the location or one of the leave requests for the location.

Figure 24:
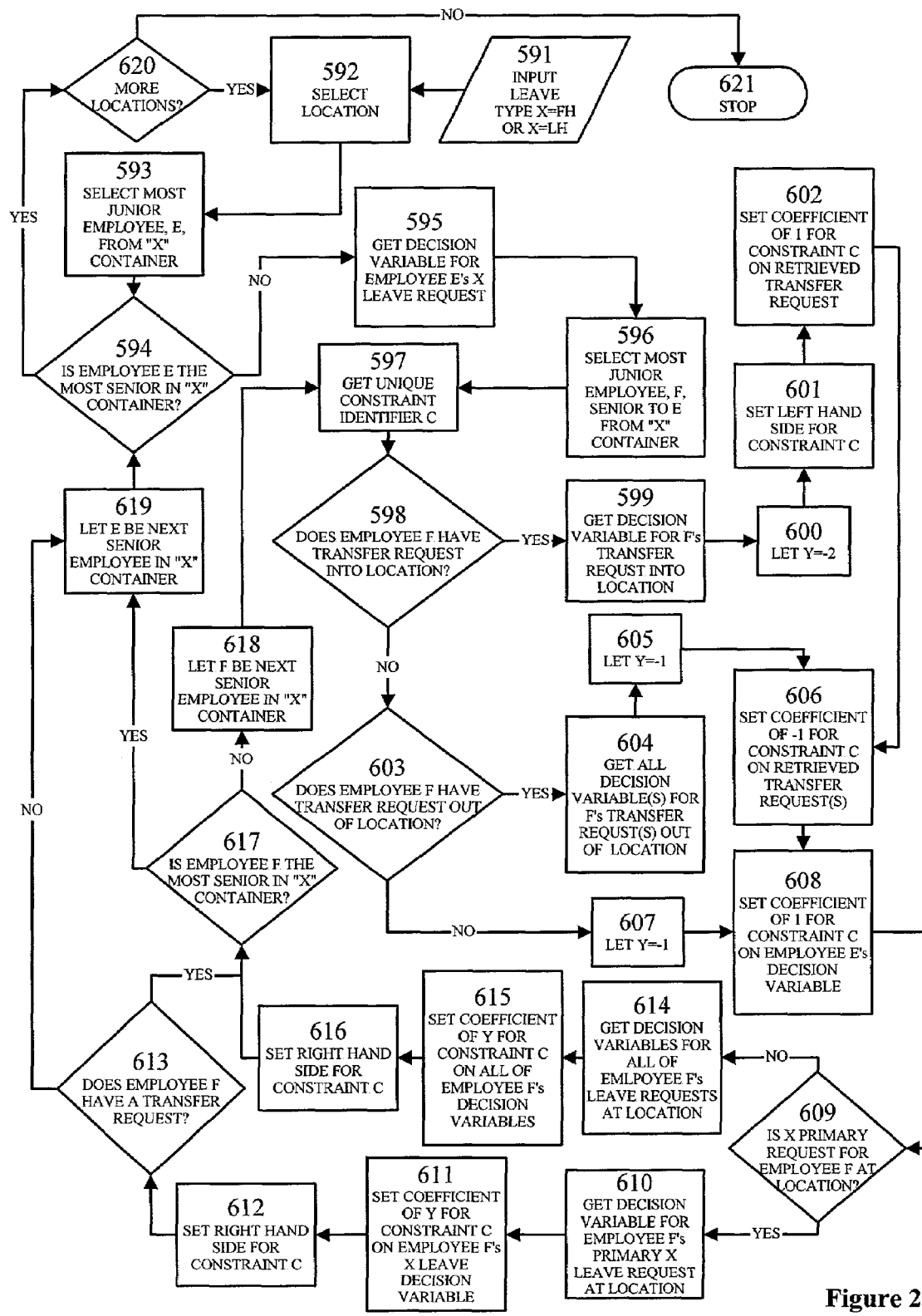
FIG. 24 is a logic flow process diagram of the generation of the transfer and half period leave seniority processing constraints logic step 67 of FIG. 4.

The generation of the constraints of inequalities (69)-(76) above, and the transfer/last half period leave seniority processing constraints below, is illustrated in FIG. 24 which is described in detail later in this specification.

Transfer/Last Half Period Leave Seniority Processing Constraints $$w_{k,LH}+u_{k,LH}+v_{k,LH}+z_{k,LH}-w_{k',LH} \leq 0, k \in D_j, k' \in D'_j \backslash \Theta_j \backslash \Phi_j, k' \gg k, \forall j \in J \tag{77}$$

$$w_{k,LH}+u_{k,LH}+v_{k,LH}+z_{k,LH}-w_{k',LH}-x_{k',i}-y_{k',i'} \leq 0, k \in D_j, k' \in D'_j \cap \Theta_j, k' \gg k, \forall j \in J \tag{78}$$

$$0 \leq w_{k,LH}+u_{k,LH}+v_{k,LH}+z_{k,LH}-2w_{k',LH}+x_{k',j} \leq 1, k \in D_j, k' \in D'_j \cap \Phi'_j, k' \gg k, \forall j \in J \tag{79}$$

$$0 \leq w_{k,LH}+u_{k,LH}+v_{k,LH}+z_{k,LH}-2w_{k',LH}+y_{k',j} \leq 1, k \in D_j, k' \in D'_j \cap (\Phi_j \backslash \Phi'_j), k' \gg k, \forall j \in J \tag{80}$$

$$w_{k,LH} + u_{k,LH} + v_{k,LH} + z_{k,LH} - \sum_{t \in T}(w_{k',t} + u_{k',t} + v_{k',t} + z_{k',t}) \leq 0, \quad (81)$$

$$k \in D_j, k' \in (D_j \setminus D'_j) \setminus \Theta_j \setminus \Phi_j, k' \gg k, \forall j \in J$$

$$w_{k,LH} + u_{k,LH} + v_{k,LH} + z_{k,LH} - \quad (82)$$
$$\sum_{t \in T}(w_{k',t} + u_{k',t} + v_{k',t} + z_{k',t}) - x_{k',i} - y_{k',i'} \leq 0,$$

$$k \in D_j, k' \in (D_j \setminus D'_j) \cap \Theta_j, k' \gg k, \forall j \in J$$

$$0 \leq w_{k,LH} + u_{k,LH} + v_{k,LH} + z_{k,LH} - \quad (83)$$
$$2\sum_{t \in T}(w_{k',t} + u_{k',t} + v_{k',t} + z_{k',t}) + x_{k',j} \leq 1,$$

$$k \in D_j, k' \in (D_j \setminus D'_j) \cap \Phi'_j, k' \gg k, \forall j \in J$$

$$0 \leq w_{k,LH} + u_{k,LH} + v_{k,LH} + z_{k,LH} - \quad (84)$$
$$2\sum_{t \in T}(w_{k',t} + u_{k',t} + v_{k',t} + z_{k',t}) + y_{k',j} \leq 1,$$

k∈$D_j$, k'∈($D_j$\$D'_j$)∩($\Phi_j$\$\Phi'_j$), k'>>k, ∀j∈J

The above transfer/last half period leave seniority processing constraints are used in the case where both leave requests and transfer requests are to be processed. These constraints establish the relationships among the employees with last half period leave requests at the same location. They account for exceptional relationships among employees with transfer requests and last half period leave requests. These constraints enforce the seniority rules regarding the awarding of last half period leave requests in seniority order.

Inequality (77) is similar to inequality (35). It states that awarding a junior employee's primary, secondary, third, or fourth preference last half period leave request implies that all employees at the same location, with primary last half period leave requests (but without any transfer requests) who are senior to the junior employee are awarded their primary leave request. Inequality (78) states that awarding a junior employee's primary, secondary, third, or fourth preference last half period leave request implies that all employees at the same location, with primary last half period leave requests and transfer requests out of the location, who are senior to the junior employee are awarded either their primary leave request or one of their transfer requests.

Inequality (79) states that awarding a junior employee's primary, secondary, third preference, or fourth preference last half period leave request implies that all employees with primary last half period leave requests and primary transfer requests to the location, who are senior to the junior employee are either awarded both their transfer request to the location and their primary leave request, or are not awarded either request. Inequality (80) states that awarding a junior employee's primary, secondary, third, or fourth preference last half period leave request implies that all employees with primary last half period leave requests and secondary transfer requests to the location, who are senior to the junior employee are either awarded both their transfer request to the location and their primary leave request, or are not awarded either request.

Inequality (81) is similar to inequality (36). It states that awarding a junior employee's primary, secondary, third, or fourth preference last half period leave request implies that all employees at the same location, with secondary, third, or fourth preference last half period leave requests (but without a primary last half period leave request or any transfer requests) who are senior to the junior employee are awarded one of their leave requests. Inequality (82) states that awarding a junior employee's primary, secondary, third, or fourth preference last half period leave request implies that all employees at the same location, with secondary, third, or fourth preference last half period leave requests and transfer requests out of the location (but without a primary last half period leave request) who are senior to the junior employee are awarded either one of their leave requests at the location or one of their transfer requests.

Inequality (83) states that awarding a junior employee's primary, secondary, third, or fourth preference last half period leave request implies that all employees, with secondary, third, or fourth preference last half period leave requests and primary transfer requests to the location (but without a primary last half period leave request) who are senior to the junior employee are either awarded both their transfer request to the location and one of their leave requests for the location, or are not awarded the transfer request to the location or one of the leave requests for the location. Inequality (84) states that awarding a junior employee's primary, secondary, third, or fourth preference last half period leave request implies that all employees with secondary, third, or fourth preference last half period leave requests and secondary transfer requests to the location (but without a primary last half period leave request) who are senior to the junior employee are either awarded both their transfer request to the location and one of their leave requests for the location, or are not awarded the transfer request to the location or one of the leave requests for the location.

The generation of the constraints of inequalities (77)-(88) is illustrated in FIG. 24, which is described in detail later in this specification.

Transfer/Leave Single Award Restrictions $$x_{k,j} + y_{k,j'} \leq 1, \forall k \in K \setminus L \quad (85)$$

$$\sum_{t \in T}(w_{k,t} + u_{k,t} + v_{k,t} + z_{k,t}) \leq 1, \quad \forall k \in L \setminus K \quad (86)$$

$$x_{k,i} + y_{k,i'} + \quad \forall k \in \Theta_j \cup \Psi_j, \forall j \in J \quad (87)$$
$$\sum_{t \in T}(w_{k,t} + u_{k,t} + v_{k,t} + z_{k,t}) \leq 1,$$

$$\sum_{t \in T}(w_{k,t} + u_{k,t} + v_{k,t} + z_{k,t}) - x_{k,j} \leq 0, \quad \forall k \in \Phi'_j \cup \Psi_j, \forall j \in J \quad (88)$$

$$\sum_{t \in T}(w_{k,t} + u_{k,t} + v_{k,t} + z_{k,t}) - y_{k,j} \leq 0, \quad \forall k \in (\Phi_j \setminus \Phi'_j) \cup \Psi_j, \forall j \in J \quad (89)$$

The transfer/leave single award constraints are used in the case when both leave requests and transfer requests are to be processed. These constraints are used to enforce that no more than one transfer request is awarded to any employee, no more than one leave request is awarded to any employee, an employee with transfer and leave requests may be awarded either a transfer request out of its current location or a leave request for its current location but not both, and an employee with transfer and leave requests awarded a leave request for a transfer location must be awarded the transfer to the location.

Inequality (85) is similar to inequality (8). It states that an employee with transfer requests but without leave requests may be awarded no more than one transfer request. Inequality (86) is similar to inequality (39). It states that an employee with leave requests but without transfer requests may be awarded no more than one leave request. Inequality (87) states that an employee with transfer requests and leave requests may be awarded either a transfer request out of its current location or a leave request for its current location but not both. Inequality (88) states that an employee with a primary transfer request to a location and leave requests for the location may only be awarded one of the leave requests for the transfer location if the primary transfer request to the location is awarded. Inequality (89) states that an employee with a secondary transfer request to a location and leave requests for the location may only be awarded one of the leave requests for the transfer location if the secondary transfer request to the location is awarded.

Although the condition for inequality (85) states that this constraint exists for all employees with transfer requests and no leave requests, it is relevant for only those employees with more than one transfer request and no leave requests. Although the condition for inequality (86) states that this constraint exists for all employees with leave requests and no transfer requests, it is relevant for only those employees with more than one leave request and no transfer requests. Inequalities (87)-(89) are generated for all employees with both transfer and leave requests.

Figure 25:
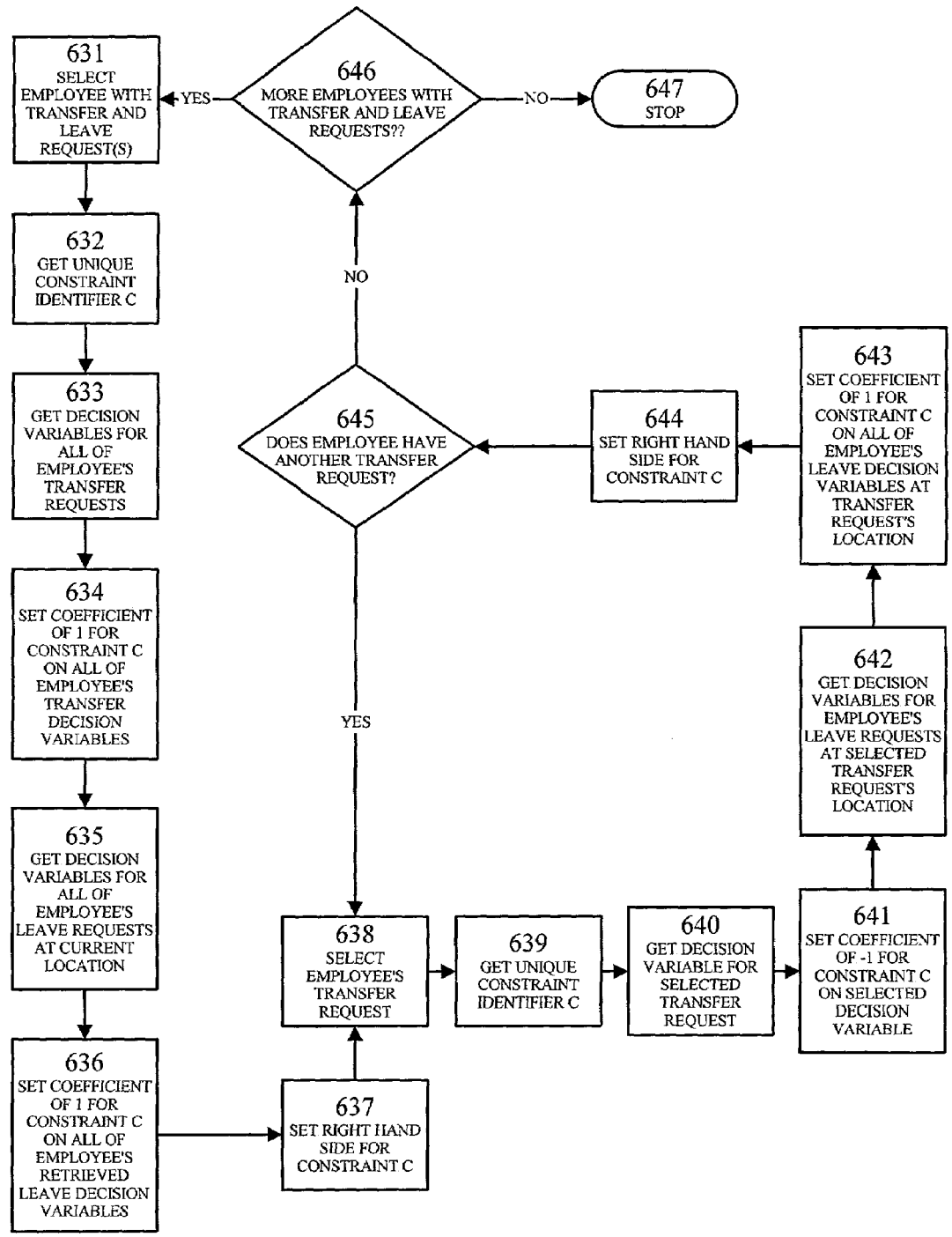
FIG. 25 is a logic flow process diagram of the generation of the transfer and leave single award restrictions of logic step 68 of FIG. 4.

The generation of the constraints of inequalities (85)-(89) above is illustrated in FIG. 25, which is described in detail later in this specification.

Last Half Period New Hire Assignment Constraints $$r_j - Gx_{k,j} \leq 0, \forall k \in \Phi'_j, \forall j \in I' \quad (90)$$

$$r_j - Gx_{k,j} - Gy_{k,j} \leq 0, \forall k \in \Phi_j \backslash \Phi'_j, \forall j \in I' \quad (91)$$

$$r_j = 0, \forall j \in J \backslash I' \quad (92)$$

$$\sum_{j \in J} r_j = G \quad (93)$$

The last half period new hire assignment constraints are used in the case when both leave requests and transfer requests are to be processed. They are similar to the allow new hire constraints. These constraints establish that for a location allowing new hires, if last half period new hires are assigned to the location, all employees requesting a transfer to the location are awarded their primary request to the location, or their secondary request to the location, or their primary request to another location.

Inequality (90) states that the assignment of one or more last half period new hires to a location implies that an employee with a primary transfer request to the location must be awarded its primary transfer request. Inequality (91) states that the assignment of one or more last half period new hires to a location implies that an employee with a secondary transfer request to the location must be awarded either its secondary transfer request to the location or its primary transfer request to another location. Equality (92) states that last half period new hires will not be assigned to locations that do not allow new hires. Equality (93) states that the sum of last half period new hire assignments equals the total quantity of unassigned last half period new hires.

Inequality (90) and inequality (91) are generated for all employees requesting transfers into a location that allows new hires. Equation (92) is generated for all locations that do not allow new hires. Equation (93) is generated once.

The generation of the above constraints is illustrated in FIG. 10, which is described in detail later in this specification.

Last Half Period New Hire Decision Variable Bound $$r_j \in \Re^+ \quad (94)$$

The last half period new hire decision variable is used in the case where both leave requests and transfer requests are to be processed. Bound (94) states that last half period new hire assignments are integer variables that may take only non-negative integer values.

The mixed integer program model for the case where both leave requests and transfer requests are to be processed consists of equation (54) as its objective function, inequalities (55)-(57) or inequalities (58)-(60), depending on the requirement to match staffing levels exactly, inequalities (4)-(7), (11)-(12), (15)-(18), (41)-(46), (61)-(89), and (90)-(91), equations (9), (10), (13)-(14), and (92)-(93), and bounds (19)-(23), (47)-(53), and (94).

Figure 3:
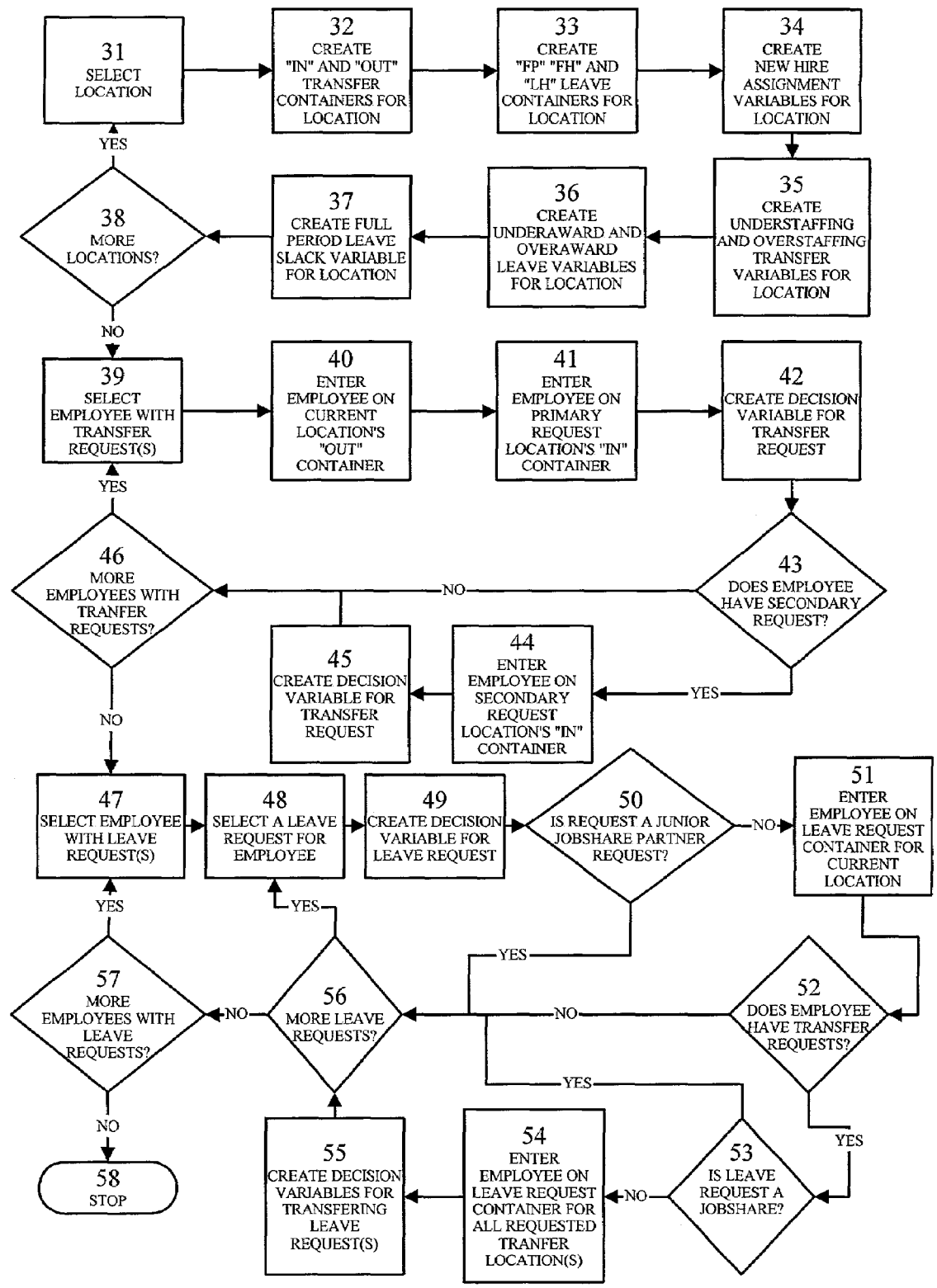
FIG. 3 is a logic flow process diagram of the creation of decision variables of logic step 13 of FIG. 2.

Referring to FIG. 3, the logic step 13 of FIG. 2 is illustrated in more detail. At logic step 31 of FIG. 3 a location is selected, and the logic flow process thereafter then proceeds to logic step 32 where a container for placing employees with transfer requests into the location is created for the location, and another container for placing employees with transfer requests out of the location is created for the location. The logic flow process next proceeds to logic step 33 where a container for placing employees with full period equivalent leave requests for the location is created for the location, a container for placing employees with first half period leave requests for the location is created for the location, and a container for placing employees with last half period leave requests for the location is created for the location. From logic step 33, the logic flow process moves to logic step 34 where the new hire assignment variable and the last half period new hire assignment variable are created for the location. From logic step 34, the logic flow process continues to logic step 35. At logic step 35, the understaffing variable and overstaffing variable are created for the location. From logic step 35, the logic flow process proceeds to logic step 36 where the under-awarding full period leave variable, the under-awarding first half period leave variable, the under-awarding last half period leave variable, the over-awarding full period leave variable, the over-awarding first half period leave variable, and the over-awarding last half period leave variable are created for the location. The logic flow process next proceeds to logic step 37 where the full period leave slack variable is created for the location. Thereafter, the logic flow process moves to logic step 38 where a determination is made whether an additional location exists for processing. If so, the logic flow process loops back to logic step 31 to continue as before described. Otherwise, the logic flow process moves from logic step 38 to logic step 39.

At logic step 39, an employee with transfer requests is selected. Next, the logic flow process moves to logic step 40 where the employee is placed in his current location's transfer out container. The logic flow process then continues from logic step 40 to logic step 41 where the employee is placed in his primary transfer request location's transfer in container. From logic step 41, the logic flow process continues to logic step 42 where a decision variable is created to represent the employee's primary transfer request. Thereafter, the logic flow process process moves to logic step 43 where a determination is made whether the employee has a secondary transfer request. If so, the logic flow process proceeds to logic step 44. Otherwise, the logic flow process moves to logic step 46.

At logic step 44, the employee is placed in his secondary transfer request location's transfer in container. From logic step 44, the logic flow process continues to logic step 45 where a decision variable is created to represent the employee's secondary transfer request. The logic flow process next moves to logic step 46. At logic step 46, a determination is made whether there exists another employee with a transfer request. If so, the logic flow process loops back to logic step 39 to continue as before described. Otherwise, the logic flow process continues to logic step 47.

At logic step 47, an employee with leave requests is selected. Next, the logic flow process moves to logic step 48 where one of the employee's leave requests is selected, and then continues to logic step 49 where a decision variable representing the employee's selected leave request is created. From logic step 49, the logic flow process proceeds to logic step 50 where a determination is made whether the employee's selected leave request is a jobshare and the employee is the junior partner for the request. If so, the employee need not be placed in the fall period equivalent container, because the associated senior jobshare partner will account for the jobshare request, and the logic flow process therefore moves to logic step 56. Otherwise, the logic flow process continues from logic step 50 to logic step 51 where the employee is placed in the container corresponding to the selected leave at the employee's current location. From logic step 51, the logic flow process next proceeds to logic step 52 where a determination is made whether the employee has transfer requests. If so, the logic flow process continues to logic step 53. Otherwise, the logic flow process proceeds to logic step 56.

At logic step 53, a determination is made whether the employee's selected leave request is a jobshare. If so, the logic flow process continues to logic step 56, because jobshare requests are limited to the employee's current location. Otherwise, the logic flow process moves from logic step 53 to logic step 54 where the employee is placed in the container corresponding to the selected leave at each of the employee's requested transfer locations. From logic step 54, the logic flow process continues to logic step 55 where decision variables representing the employee's selected leave request at each of the employee's requested transfer locations are created. From logic step 55, the logic flow process continues to logic step 56.

A determination is made at logic step 56 whether the employee has more leave requests. If so, the logic flow process loops back to logic step 48 to continue as before described. Otherwise, the logic flow process moves to logic step 57 where a determination is made whether there exists another employee with a leave request. If so, the logic flow process loops back to logic step 47 to continue as before described. Otherwise, the logic flow process continues to logic step 58. At logic step 58, the logic flow process is concluded.

Figure 4:
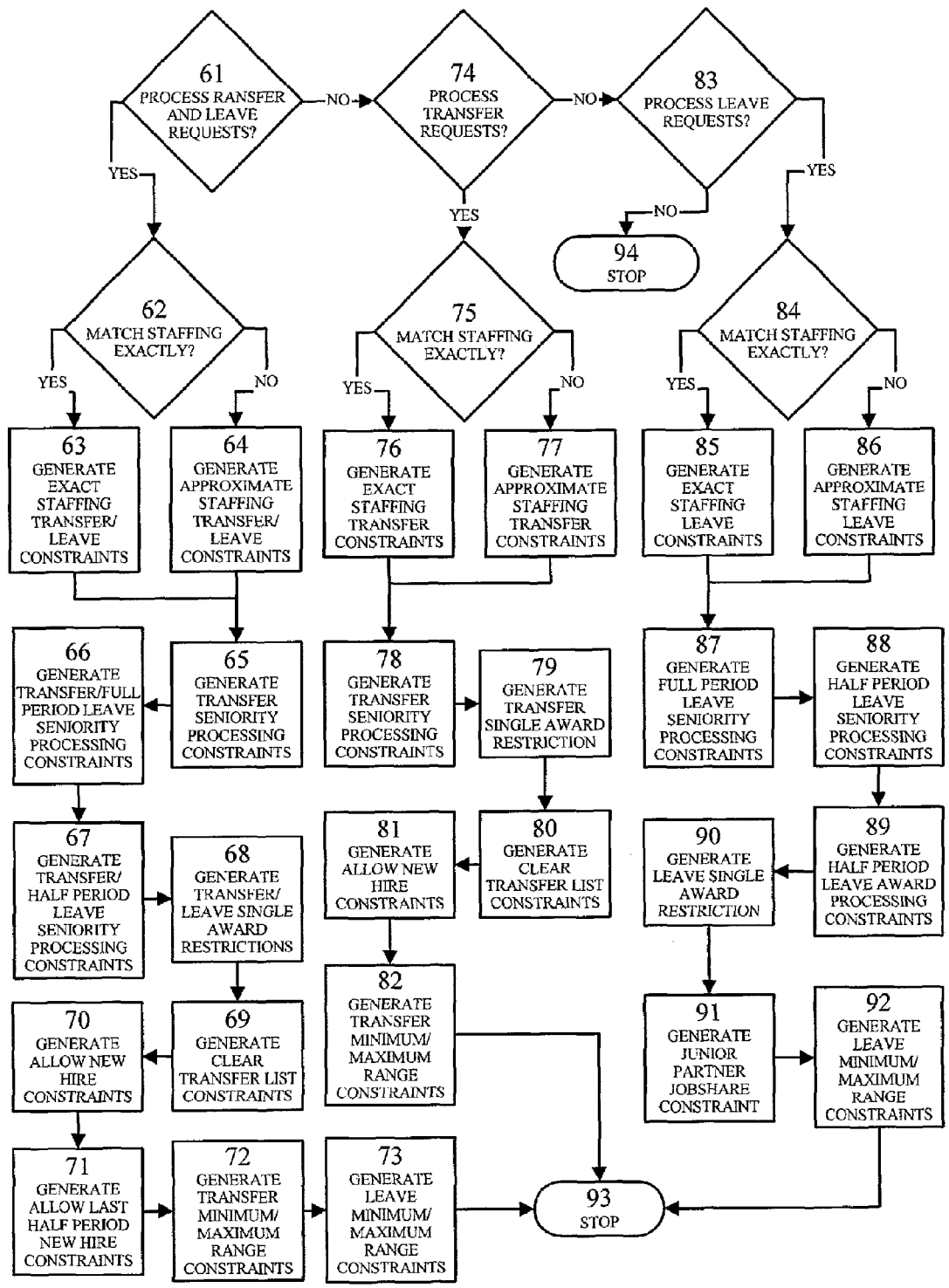
FIG. 4 is a logic flow process diagram of the generation of constraints of logic step 14 of FIG. 2.

Referring to FIG. 4, the logic step 14 of FIG. 2 is illustrated in more detail. The logic flow process begins at logic step 61 where a determination is made whether leave requests and transfer requests are to be processed. If so, the logic flow process proceeds to logic step 62. Otherwise, the logic flow process moves to logic step 74. At logic step 62, a determination is made whether the staffing levels are required to be matched exactly. If so, the logic flow process jumps to logic step 63. Otherwise, the logic flow process continues to logic step 64. At logic step 63, the exact transfer/leave staffing constraints of equations (55)-(57) are generated. From logic step 63, the logic flow process proceeds to logic step 65. At logic step 64, the approximate transfer/leave staffing constraints of equations (58)-(60) are generated. From logic step 64, the logic flow process continues to logic step 65.

At logic step 65, the seniority transfer processing constraints of inequalities (4)-(7) are generated. From logic step 65, the logic flow process moves to logic step 66 where the transfer/full period leave seniority processing constraints of inequalities (61)-(68) are generated. The logic flow process next proceeds from logic step 66 to logic step 67 where the transfer/first half period seniority processing constraints of inequalities (69)-(76) and the transfer/last half period seniority processing constraints of inequalities (77)-(84) are generated. From logic step 67, the logic flow process continues to logic step 68 where the transfer/leave single award constraints of inequalities (85)-(89) are generated, and then proceeds to logic step 69 where the clear transfer list constraints of equations (9)-(10) are generated. Next, the logic flow process moves to logic step 70 where the allow new hire constraints of inequalities (11)-(12) and equations (13) and (14) are generated. The logic flow process then advances to logic step 71 where the last half period new hire assignment constraints of inequalities (90)-(91) and equations (92)-(93) are generated. From logic step 71, the logic flow process proceeds to logic step 72 where the minimum/maximum transfer range constraints of inequalities (15)-(18) are generated. From logic step 72, the logic flow process moves to logic step 73 where the minimum/maximum leave range constraints of inequalities (41)-(46) are generated. From logic step 73, the logic flow process concludes at logic step 93.

A determination is made at logic step 74 whether transfer requests are to be processed. If so, the logic flow process proceeds to logic step 75. Otherwise, the logic flow process continues from logic step 74 to logic step 83. At logic step 75 a determination is made whether the staffing levels are required to be matched exactly. If so, the logic flow process proceeds to logic step 76; otherwise, the logic flow process moves to logic step 77. At logic step 76, the exact transfer staffing constraint of inequality (2) is generated. From logic step 76, the logic flow process continues to logic step 78. At logic step 77, the approximate transfer staffing constraint of equation (3) is generated. From logic step 77, the logic flow process continues to logic step 78. At logic step 78, the seniority transfer processing constraints of inequalities (4)-(7) are generated. From logic step 78, the logic flow process moves to logic step 79 where the single transfer award restriction of inequality (8) is generated, and then continues to logic step 80 where the clear transfer list constraints of equations (9)-(10) are generated. Next, the logic flow process moves to logic step 81 where the allow new hire constraints of inequalities (11)-(14) are generated, and then proceeds to logic step 82 where the minimum/maximum transfer range constraints of inequalities (15)-(18) are generated. From logic step 82, the logic flow process concludes at logic step 93.

At logic step 83 a determination is made whether leave requests are to be processed. If so, the logic flow process proceeds to logic step 84. Otherwise, the logic flow process concludes at logic step 94. At logic step 84, a determination is made whether the staffing levels are required to be matched exactly. If so, the logic flow process proceeds to logic step 85. Otherwise, the logic flow process moves to logic step 86. At logic step 85, the exact leave staffing constraints of equations (25)-(27) are generated. From logic step 85, the logic flow process moves to logic step 87. At logic step 86, the approximate leave staffing constraints of equations (28)-(30) are generated. From logic step 86, the logic flow process continues to logic step 87.

At logic step 87, the full period leave seniority processing constraints of inequalities (31)-(32) are generated. From logic step 87, the logic flow process proceeds to logic step 88 where the half period leave processing constraints of inequalities (33)-(36) are generated, and then continues to logic step 89 where the half period leave award processing constraints of inequalities (37)-(38) are generated. Next, the logic flow process moves to logic step 90 where the single leave award restriction of inequality (39) is generated, and then continues to logic step 91 where the jobshare junior partner award constraint of equation (40) is generated. From logic step 91, the logic flow process continues to logic step 92 where the minimum/maximum leave range constraints of inequalities (41)-(46) are generated. From logic step 92, the logic flow process concludes at logic step 93.

Referring to FIG. 5, the logic step 76 of FIG. 4 (the generation of the exact transfer staffing constraint of inequality (2)) is illustrated in more detail. The logic flow process commences at logic step 101 where a location is selected. From logic step 101, the logic flow process continues to logic step 102 where a unique constraint identifier C is generated. Next the logic flow process proceeds to logic step 103 where an employee is selected from the location's transfer in container. From logic step 103, the logic flow process moves to logic step 104 where the decision variable representing the employee's transfer request into the location is retrieved. Proceeding further, the logic flow process continues from logic step 104 to logic step 105 where the decision variable is given the coefficient of "1" for constraint C. Next, the logic flow process proceeds to logic step 106 where a determination is made whether there are more employees in the location's transfer in container. If so, the logic flow process loops back to logic step 103 to continue as before described. Otherwise, the logic flow process continues from logic step 106 to logic step 107.

At logic step 107, an employee is selected from the location's transfer out container. From logic step 107, the logic flow process proceeds to logic step 108 where the decision variables representing all of the employee's transfer requests out of the location are retrieved. Next, the logic flow process moves to logic step 109 where the decision variables are given the coefficient of "−1" for constraint C. From logic step 109, the logic flow process proceeds to logic step 110 where a determination is made whether there are more employees in the location's transfer out container. If so, the logic flow process moves to logic step 107. Otherwise, the logic flow process continues from logic step 110 to logic step 111.

At logic step 111, the new hire assignment variable for the location is retrieved. Next, the logic flow process proceeds to logic step 112 where the new hire assignment variable is given a coefficient of "1" for constraint C. From logic step 112, the logic flow process continues to logic step 113 where the sense for constraint C is set to greater than (=), and the right hand side is set to the required staffing deficit for the location. The logic flow process continues from logic step 113 to logic step 114 where a determination is made whether there are more locations. If so, the logic flow process returns to logic step 101 to continue as before described. Otherwise, the logic flow process concludes at logic step 115.

Referring to FIG. 6, the logic step 77 of FIG. 4 (the generation of the approximate transfer staffing constraint of equation (3)) is illustrated in more detail. The logic flow process commences at logic step 121 where a location is selected. From logic step 121, the logic flow process continues to logic step 122 where a unique constraint identifier C is generated. Next, the logic flow process proceeds to logic step 123 where an employee is selected from the location's transfer in container. From logic step 123, the logic flow process moves to logic step 124 where the decision variable representing the employee's transfer request into the location is retrieved. Proceeding further, the logic flow process continues from logic step 124 to logic step 125 where the decision variable is given the coefficient of "1" for constraint C. Next, the logic flow process proceeds to logic step 126 where a determination is made whether there are more employees in the location's transfer in container. If so, the logic flow process returns to logic step 123 to continue as before described. Otherwise, the logic flow process continues from logic step 126 to logic step 127.

At logic step 127, an employee is selected from the location's transfer out container. From logic step 127, the logic flow process proceeds to logic step 128 where the decision variables representing all of the employee's transfer requests out of the location are retrieved. Next the logic flow process moves to logic step 129 where the decision variables are given the coefficient of "−1" for constraint C. From logic step 129, the logic flow process moves to logic step 130 where a determination is made whether there are more employees in the location's transfer out container. If so, the logic flow process returns to logic step 127 to continue as before described. Otherwise, the logic flow process continues to logic step 131.

At logic step 131, the new hire assignment variable for the location is retrieved. Next, the logic flow process proceeds to logic step 132 where the new hire assignment variable is given a coefficient of "1" for constraint C. From logic step 132, the logic flow process continues to logic step 133 where the understaffing variable for the location is retrieved, and then proceeds to logic step 134 where the understaffing variable is given the coefficient of "1" for constraint C. From logic step 134, the logic flow process moves to logic step 135 where the overstaffing variable is retrieved, and then continues to logic step 136 where the overstaffing variable is given the coefficient of "−1" for constraint C. Next, the logic flow process continues to logic step 137 where the sense for constraint C is set to equality (=), and the right hand side is set to the required staffing deficit for the location. The logic flow process continues from logic step 137 to logic step 138 where a determination is made whether there are more locations. If so, the logic flow process returns to logic step 121 to continue as before described. Otherwise, the logic flow process concludes at logic step 139.

Referring to FIG. 7, the logic step 78 of FIG. 4 (the generation of the seniority transfer processing constraints (4)-(7)) is illustrated in more detail. The logic flow process begins at logic step 141 where a location is selected. From logic step 141, the logic flow process continues to logic step 142 where the most junior employee E is selected from the location's transfer in container. The logic flow process then proceeds to logic step 143 where a determination is made whether the selected employee is the most senior employee in the transfer in container for the location. If so, the logic flow process moves to logic step 158. Otherwise, the logic flow process continues from logic step 143 to logic step 144. At logic step 144, the decision variable representing the employee's transfer request into the location is retrieved.

Next, the logic flow process proceeds to logic step 145 where the most junior employee F who is senior to employee E and in the location's transfer in container is selected. From logic step 145, the logic flow process advances to logic step 146 where a unique constraint identifier C is generated, and then continues to logic step 147 where employee E's decision variable is given a coefficient of "1" for constraint C. Next, the logic flow process proceeds to logic step 148 where it is determined whether the location is the primary transfer location for employee F. If so, the logic flow process continues to logic step 149, Otherwise, the logic flow process moves to logic step 152.

At logic step 149, the decision variable for employee F's primary transfer request to the location is retrieved. The logic flow process continues from logic step 149 to logic step 150 where employee F's decision variable is given a coefficient of "−1" for constraint C. The logic flow process moves next to logic step 151 where the sense for constraint C is set to less than (−), and the right hand side is set to zero. This reflects the generation of the constraints of inequalities (4) and (5) depending on whether employee E's transfer request into the location is its primary or secondary request. It is noteworthy to observe that any more seniority transfer processing constraints based on junior employee E at the selected location are mathematically redundant to the constraint just generated. From logic step 151 the logic flow process proceeds to logic step 157.

At logic step 152, the decision variables representing all of employee F's transfer requests are retrieved. The logic flow process continues from logic step 152 to logic step 153 where employee F's decision variables are given the coefficient of "−1" for constraint C. The logic flow process next moves to logic step 154 where the sense for constraint C is set to less than (=), and the right hand side is set to zero. This reflects the generation of the constraints of inequalities (6) and (7) depending on whether employee E's transfer request into the location is its primary or secondary request. From logic step 154, the logic flow process continues to logic step 155 where a determination is made whether employee F is the most senior employee in the location's transfer in container. If so, the logic flow process proceeds to logic step 157. Otherwise, the logic flow process continues from logic step 155 to logic step 156. At logic step 156, employee F is replaced with the next senior employee in the location's transfer in container. From logic step 156, the logic flow process continues to logic step 146 to proceed as before described.

At logic step 157, employee E is replaced with the next senior employee in the location's transfer in container. From logic step 157, the logic flow process proceeds to logic step 143 to continue as before described. At logic step 158, a determination is made whether more locations exist. If so, the logic flow process proceeds to logic step 141 to continue as before described. Otherwise, the logic flow process concludes at logic step 159.

Referring to FIG. 8, the logic step 79 of FIG. 4 (the generation of the single transfer award restriction of inequality (8)) is illustrated in more detail. The logic flow process begins at logic step 161 where an employee with transfer requests is selected. From logic step 161, the logic flow process continues to logic step 162 where a determination is made whether the employee has more than one transfer request. If so, the logic flow process continues to logic step 163. Otherwise, the logic flow process moves to logic step 167. At logic step 163, the decision variables representing all of the employee's transfer requests are retrieved. The logic flow process next proceeds to logic step 164 where a unique constraint identifier C is generated, and then continues to logic step 165 where the decision variables are given a coefficient of "1" for constraint C. Next, the logic flow process proceeds to logic step 166 where the sense for constraint C is set to less than (=), and the right hand side is set to one. The logic flow process continues from logic step 166 to logic step 167 where a determination is made whether there exist more employees with transfer requests. If so, the logic flow process returns to logic step 161 to continue as before described. Otherwise, the logic flow process concludes at logic step 168.

Referring to FIG. 9, the logic steps 69 and 80 of FIG. 4 (the generation of the clear transfer lists constraints of equations (9)-(10)) is illustrated in more detail. The logic flow process begins at logic step 171 where a location is selected. From logic step 171, the logic flow process continues to logic step 172 where a determination is made whether the location is required to have its transfer list cleared. If so, then the logic flow process proceeds to logic step 173. Otherwise, the logic flow process moves to logic step 184. At logic step 173 the most junior employee E is selected from the location's transfer in container. The logic flow process then proceeds from logic step 173 to logic step 174 where a unique constraint identifier C is generated, and thereafter continues to logic step 175 where it is determined whether the location is the primary transfer location for employee E. If so, the logic flow process continues to logic step 176; otherwise the logic flow process moves to logic step 179.

At logic step 176, the decision variable for employee E's primary transfer request to the location is retrieved. The logic flow process next continues from logic step 176 to logic step 177 where employee E's decision variable is given a coefficient of "1" for constraint C. The logic flow process then proceeds to logic step 178 where the sense for constraint C is set to equality (=), and the right hand side is set to one. This reflects the generation of the constraint of equation (9). It is noteworthy to observe that any more clear transfer list constraints for the location are mathematically redundant to the constraint just generated. From logic step 178, the logic flow process moves to logic step 184.

At logic step 179, the decision variables representing all of employee E's transfer requests are retrieved. The logic flow process continues from logic step 179 to logic step 180 where employee E's decision variables are given the coefficient of "1" for constraint C. The logic flow process then proceeds to logic step 181 where the sense for constraint C is set to equality (=), and the right hand side is set to one. This reflects the generation of the constraint of equation (10). From logic step 181, the logic flow process continues to logic step 182 where a determination is made whether employee E is the most senior employee in the location's transfer in container. If so, the logic flow process proceeds to logic step 184. Otherwise, the logic flow process continues to logic step 183. At logic step 183, employee E is replaced by the next senior employee in the location's transfer in container. From logic step 183, the logic flow process continues to logic step 174 to proceed as before described. At logic step 184 a determination is made whether more locations exist. If so, the logic flow process proceeds to logic step 171 to continue as before described. Otherwise, the logic flow process concludes at logic step 185.

Referring to FIG. 10, the logic steps 70, 71, and 81 of FIG. 4 (the generation of the allow new hire constraints of inequalities (11)-(12) and equations (13)-(14), and the generation of the last half period new hire assignment constrains of inequalities (90)-(91) and equations (92)-(93)) are illustrated in more detail. Because the allow new hire constraints and the last half period new hire assignment constraints are similar, the process of their generation is similar. The following description of FIG. 10 will correspond to the generation of the allow new hire constraints; however, by substituting the phrase "last half period new hire" for "new hire," the description is applicable to the generation of the last half period new hire assignment constraints.

The logic flow process begins at logic step 201 where a unique constraint identifier D is generated. From logic step 201, the logic flow process continues to logic step 202 where the sense for constraint D is set to equality (=), and the right hand side is set to the quantity of unassigned new hires. Constraint D represents equations (14) and (93). The logic flow process next proceeds to logic step 203 where a location is selected. From logic step 203, the logic flow process moves to logic step 204 where the new hire assignment variable is retrieved for the location, and then continues to logic step 205 where the new hire assignment variable is given a coefficient of "1" for constraint D. The logic flow process continues from logic step 205 to logic step 206 where a determination is made whether the location allows new hires. If so, the logic flow process proceeds to logic step 210. Otherwise, the logic flow process moves to logic step 207.

At logic step 207, a unique constraint identifier C is generated. From logic step 207, the logic flow process moves to logic step 208 where the new hire assignment variable is given a coefficient of "1" for constraint C, and then continues to logic step 209 where the sense for constraint C is set to equality (=), and the right hand side is set to zero. This constraint represents equations (13) and (92). From logic step 209, the logic flow process proceeds to logic step 222.

At logic step 210, the most junior employee E is selected from the location's transfer in container. The logic flow process then proceeds from logic step 210 to logic step 211 where a unique constraint identifier C is generated, and then continues to logic step 212 where the location's new hire assignment variable is given a coefficient of "1" for constraint C. The logic flow process then continues to logic step 213 where it is determined whether the location is the primary transfer location for employee E. If so, the logic flow process continues to logic step 214. Otherwise, the logic flow process moves to logic step 217.

At logic step 214, the decision variable for employee E's primary transfer request to the location is retrieved. The logic flow process next continues from logic step 214 to logic step 215 where employee E's decision variable is given a coefficient of −H for constraint C, where H is the quantity of unassigned new hires. The logic flow process then proceeds from logic step 215 to logic step 216 where the sense for constraint C is set to less than (=), and the right hand side is set to zero. This reflects the generation of the constraints of inequalities (11) and (90). It is noteworthy to observe that any more allow new hire constraints for the location are mathematically redundant to the constraint just generated. From logic step 216, the logic flow process moves to logic step 222.

At logic step 217, the decision variables representing all of employee E's transfer requests are retrieved. The logic flow process continues from logic step 217 to logic step 218 where employee E's decision variables are given the coefficient of −H for constraint C. The logic flow process then proceeds to logic step 219 where the sense for constraint C is set to less than (=) and the right hand side is set to zero. This reflects the generation of the constraints of inequalities (12) and (91). From logic step 219, the logic flow process continues to logic step 220 where a determination is made whether employee E is the most senior employee in the location's transfer in container. If so, the logic flow process proceeds to logic step 222. Otherwise, the logic flow process moves to logic step 221. At logic step 221, employee E is replaced by the next senior employee in the location's transfer in container. From logic step 221, the logic flow process continues to logic step 211 to proceed as before described. At logic step 222, a determination is made whether more locations exist. If so, the logic flow process proceeds to logic step 203 to continue as before described. Otherwise, the logic flow process concludes at logic step 223.

Referring to FIG. 11, the logic steps 72 and 82 of FIG. 4 (the generation of the minimum/maximum transfer range constraints of inequalities (15)-(16) restricting the transfer awards into a location) is illustrated in more detail. The logic flow process begins at logic step 231 where the type of constraint, minimum or maximum, is input. The logic flow process then continues to logic step 232 where a location is selected, and then proceeds to logic step 233 where it is determined whether the input constraint type's range value is not null. If the value is not null, the logic flow process proceeds to logic step 234. Otherwise, the logic flow process moves to logic step 240. At logic step 234 a unique constraint identifier C is generated. From logic step 234, the logic flow process continues to logic step 235 where an employee is selected from the location's transfer in container, and then proceeds to logic step 236 where the decision variable representing the employee's transfer request to the location is retrieved. From logic step 236, the logic flow process moves to logic step 237 where the decision variable is given a coefficient of "1" for constraint C, and then continues to logic step 238 where it is determined whether there exist more employees in the location's transfer in container. If so, the logic flow process returns to logic step 235 to continue as before described. Otherwise, the logic flow process proceeds to logic step 239. At logic step 239, the sense and right hand side for constraint C are set. If the input constraint type is minimum, then the sense is greater than (=), and the right hand side is the minimum range value for transfers into the location. This represents the generation of inequality (15). If the input constraint type is maximum, then the sense is less than (=), and the right hand side is the maximum range value for transfers into the location. This represents the generation of inequality (16). From logic step 239, the logic flow process continues to logic step 240. At logic step 240, a determination is made whether there are more locations. If so, the logic flow process moves to logic step 232 to continue as before described. Otherwise, the logic flow process concludes at logic step 241.

Referring to FIG. 12, the logic steps 72 and 82 of FIG. 4 (the generation of the minimum/maximum transfer range constraints of inequalities (17)-(18) restricting the transfer awards out of a location) is illustrated in more detail. The logic flow process begins at logic step 251 where the type of constraint, minimum or maximum, is input. The logic flow process then continues to logic step 252 where a location is selected, and then moves to logic step 253 where it is determined if the input constraint type's range value is not null. If the value is not null then the logic flow process proceeds to logic step 254. Otherwise, the logic flow process moves to logic step 260. At logic step 254, a unique constraint identifier C is generated. From logic step 254, the logic flow process continues to logic step 255 where an employee is selected from the location's transfer out container, and then moves to logic step 256 where the decision variable representing the employee's transfer request out of the location is retrieved. The logic flow process moves next to logic step 257 where the decision variable is given a coefficient of "1" for constraint C, and then continues to logic step 258 where it is determined whether there exist more employees in the location's transfer out container. If so, the logic flow process returns to logic step 255 to continue as before described. Otherwise, the logic flow process proceeds to logic step 259. At logic step 259, the sense and right hand side for constraint C are set. If the input constraint type is minimum, then the sense is greater than (=) and the right hand side is the minimum range value for transfers out of the location. This represents the generation of inequality (17). If the input constraint type is maximum, then the sense is less than (=) and the right hand side is the maximum range value for transfers out of the location. This represents the generation of inequality (18). From logic step 259, the logic flow process continues to logic step 260. At logic step 260, a determination is made whether there are more locations. If so, the logic flow process moves to logic step 252 to continue as before described. Otherwise, the logic flow process concludes at logic step 261.

Referring to FIG. 13, the logic step 85 of FIG. 4 (the generation of the exact leave staffing constraints of equations (25)-(27)) is illustrated in more detail. The logic flow process commences at logic step 271 where a location is selected. From logic step 271, the logic flow process continues to logic step 272 where a unique constraint identifier C is generated. Next, the logic flow process proceeds to logic step 273 where an employee is selected from the location's full period leave container. From logic step 273, the logic flow process moves to logic step 274 where the decision variable representing the employee's full period leave request for the location is retrieved. Proceeding further, the logic flow process continues from logic step 274 to logic step 275 where a determination is made whether the employee's full period leave request is a jobshare request, whether the employee is the senior partner in the request, and whether the employee has an alternate full period leave request as well. If so, then the logic flow process continues to logic step 276. Otherwise, the logic flow process moves to logic step 277. At logic step 276, the decision variable representing the employee's alternate full period leave request is retrieved. From logic step 276, the logic flow process proceeds to logic step 277.

At logic step 277, the decision variables retrieved for the employee are given the coefficient of 1 for constraint C. From logic step 277 the logic flow process continues to logic step 278 where a determination is made whether there are more employees in the location's full period leave container. If so, the logic flow process returns to logic step 273 to continue as before described. Otherwise, the logic flow process continues from logic step 278 to logic step 279.

At logic step 279, the location's full period leave slack variable is given the coefficient of "1" for constraint C. The logic flow process continues from logic step 279 to logic step 280 where the sense for constraint C is set to equality (=), and the right hand side is set to the negative of the staffing deficit. This completes the generation of equation (25).

The logic flow process proceeds from logic step 280 to logic step 281 where a unique constraint identifier C is generated. Next, the logic flow process moves to logic step 282 where an employee is selected from the location's first half period leave container. From logic step 282, the logic flow process continues to logic step 283 where the decision variable representing the employee's first half period leave request for the location is retrieved. Proceeding further, the logic flow process continues from logic step 283 to logic step 284 where the employee's decision variable is given the coefficient of "1" for constraint C, and then moves to logic step 285 where a determination is made whether there are more employees in the location's first half period leave container. If so, the logic flow process returns to logic step 282 to continue as before described. Otherwise, the logic flow process continues to logic step 286.

At logic step 286, the location's full period leave slack variable is given the coefficient of "−1" for constraint C. The logic flow process then continues from logic step 286 to logic step 287 where the sense for constraint C is set to equality (=), and the right hand side is set to zero. This completes the generation of equation (26).

The logic flow process proceeds from logic step 287 to logic step 288 where a unique constraint identifier C is generated. Next, the logic flow process moves to logic step 289 where an employee is selected from the location's last half period leave container. From logic step 289, the logic flow process continues to logic step 290 where the decision variable representing the employee's last half period leave request for the location is retrieved. Proceeding further, the logic flow process continues from logic step 290 to logic step 291 where the employee's decision variable is given the coefficient of "1" for constraint C, and then moves to logic step 292 where a determination is made whether there are more employees in the location's last half period leave container. If so, the logic flow process returns to logic step 289 to continue as before described. Otherwise, the logic flow process continues to logic step 293.

At logic step 293, the location's full period leave slack variable is given the coefficient of "−1" for constraint C. The logic flow process then continues from logic step 293 to logic step 294 where the sense for constraint C is set to equality (=), and the right hand side is set to zero. This completes the generation of equation (27).

From logic step 294, the logic flow process proceeds to logic step 295 where a determination is made whether there exist more locations. If so, the logic flow process continues to logic step 271 to proceed as before described. Otherwise, the logic flow process concludes at logic step 296.

Referring to FIG. 14, the logic step 86 of FIG. 4 (the generation of the approximate leave staffing constraints of equations (28)-(30)) is illustrated in more detail. The logic flow process commences at logic step 301 where a location is selected. From logic step 301, the logic flow process continues to logic step 302 where a unique constraint identifier C is generated. Next, the logic flow process proceeds to logic step 303 where an employee is selected from the location's full period leave container. From logic step 303, the logic flow process moves to logic step 304 where the decision variable representing the employee's full period leave request for the location is retrieved. Proceeding further, the logic flow process continues from logic step 304 to logic step 305 where a determination is made whether the employee's full period leave request is a jobshare request, whether the employee is the senior partner in the request, and whether the employee has an alternate full period leave request as well. If so, then the logic flow process continues to logic step 306. Otherwise, the logic flow process moves to logic step 307. At logic step 306, the decision variable representing the employee's alternate full period leave request is retrieved. From logic step 306, the logic flow process proceeds to logic step 307.

At logic step 307, the decision variables retrieved for the employee are given the coefficient of "1" for constraint C. From logic step 307, the logic flow process continues to logic step 308 where a determination is made whether there are more employees in the location's full period leave container. If so, the logic flow process moves to logic step 303 to continue as before described. Otherwise, the logic flow process continues to logic step 309.

At logic step 309, the location's full period leave slack variable is given the coefficient of "1" for constraint C. The logic flow process then continues from logic step 309 to logic step 310 where the location's full period under-awarding decision variable is given the coefficient of "1" for constraint C, and then moves to logic step 311 where the location's full period over-awarding decision variable is given the coefficient of "−1" for constraint C. From logic step 311, the logic flow process proceeds to logic step 312 where the sense for constraint C is set to equality (=), and the right hand side is set to the negative of the staffing deficit. This completes the generation of equation (28) for the location.

The logic flow process proceeds from logic step 312 to logic step 313 where a unique constraint identifier C is generated. Next, the logic flow process moves to logic step 314 where an employee is selected from the location's first half period leave container. From logic step 314, the logic flow process continues to logic step 315 where the decision variable representing the employee's first half period leave request for the location is retrieved. Proceeding further, the logic flow process continues from logic step 315 to logic step 316 where the employee's decision variable is given the coefficient of "1" for constraint C, and then moves to logic step 317 where a determination is made whether there are more employees in the location's first half period leave container. If so, the logic flow process moves to logic step 314 to continue as before described. Otherwise, the logic flow process continues to logic step 318.

At logic step 318, the location's full period leave slack variable is given the coefficient of "−1" for constraint C. The logic flow process continues from logic step 318 to logic step 319 where the location's first half period under-awarding decision variable is given the coefficient of "1" for constraint C, and then moves to logic step 320 where the location's first half period over-awarding decision variable is given the coefficient of "−1" for constraint C. From logic step 320, the logic flow process proceeds to logic step 321 where the sense for constraint C is set to equality (=), and the right hand side is set to zero. This completes the generation of equation (29) for the location.

The logic flow process proceeds from logic step 321 to logic step 322 where a unique constraint identifier C is generated. Next, the logic flow process moves to logic step 323 where an employee is selected from the location's last half period leave container. From logic step 323, the logic flow process continues to logic step 324 where the decision variable representing the employee's last half period leave request for the location is retrieved. Proceeding further, the logic flow process continues from logic step 324 to logic step 325 where the employee's decision variable is given the coefficient of "1" for constraint C, and then moves to logic step 326 where a determination is made whether there are more employees in the location's last half period leave container. If so, the logic flow process returns to logic step 323 to continue as before described. Otherwise, the logic flow process continues to logic step 327.

At logic step 327, the location's full period leave slack variable is given the coefficient of "−1" for constraint C. The logic flow process continues from logic step 327 to logic step 328 where the location's last half period under-awarding decision variable is given the coefficient of "1" for constraint C, and then moves to logic step 329 where the location's last half period over-awarding decision variable is given the coefficient of "−1" for constraint C. From logic step 329, the logic flow process proceeds to logic step 330 where the sense for constraint C is set to equality (=) and the right hand side is set to zero. This completes the generation of equation (30) for the location.

From logic step 330, the logic flow process proceeds to logic step 331 where a determination is made whether there exist more locations. If so, the logic flow process returns to logic step 301 to continue as before described. Otherwise, the logic flow process concludes at logic step 332.

Referring to FIG. 15, the logic step 87 of FIG. 4 (the generation of the full period leave seniority processing constraints of inequalities (31)-(32)) is illustrated in more detail. The logic flow process begins at logic step 341 where a location is selected. From logic step 341, the logic flow process continues to logic step 342 where the most junior employee E is selected from the location's full period leave container. The logic flow process proceeds to logic step 343 where a determination is made whether employee E is the most senior employee in the full period leave container for the location. If so, the logic flow process moves to logic step 360. Otherwise, the logic flow process continues to logic step 344. At logic step 344, the decision variable representing employee E's full period leave request for the location is retrieved. Next, the logic flow process proceeds to logic step 345 where a determination is made whether employee E's full period leave request is a jobshare request, whether employee E is the senior partner in the request, and whether employee E has an alternate full period leave request as well. If so, then the logic flow process continues to logic step 346. Otherwise, the logic flow process moves to logic step 347. At logic step 346 the decision variable representing employee E's alternate full period leave request is retrieved. From logic step 346, the logic flow process proceeds to logic step 347.

At logic step 347, the most junior employee F senior to employee E and in the location's full period leave container is selected. From logic step 347, the logic flow process continues to logic step 348 where a unique constraint identifier C is generated, and then proceeds to logic step 349 where employee E's retrieved decision variables are given a coefficient of "1" for constraint C. Next, the logic flow process proceeds to logic step 350 where it is determined whether employee F's full period leave request is its primary leave request for the location. If so, the logic flow process continues to logic step 351. Otherwise, the logic flow process moves to logic step 354

At logic step 351, the decision variable for employee F's primary full period leave request for the location is retrieved. The logic flow process continues from logic step 351 to logic step 352 where employee F's decision variable is given a coefficient of −1 for constraint C. The logic flow process moves next to logic step 353 where the sense for constraint C is set to less than (=), and the right hand side is set to zero. This reflects the generation of the constraint of inequality (31). It is noteworthy to observe that any more full period leave seniority processing constraints based on junior employee E at the selected location are mathematically redundant to the constraint just generated. From logic step 353, the logic flow process proceeds to logic step 359.

At logic step 354, the decision variables representing all of employee F's leave requests for the location are retrieved.

The logic flow process continues from logic step 354 to logic step 355 where employee F's decision variables are given the coefficient of "−1" for constraint C. The logic flow process moves next to logic step 356 where the sense for constraint C is set to less than (=), and the right hand side is set to zero. This reflects the generation of the constraint of inequality (32). From logic step 356, the logic flow process continues to logic step 357 where a determination is made whether employee F is the most senior employee in the location's full period leave container. If so, the logic flow process proceeds to logic step 359. Otherwise, the logic flow process continues to logic step 358. At logic step 358, employee F is replaced with the next senior employee in the location's full period leave container. From logic step 358, the logic flow process continues to logic step 348.

At logic step 359, employee E is replaced with the next senior employee in the location's full period leave container. The logic flow process then proceeds to logic step 343 to continue as before described. At logic step 360, a determination is made whether more locations exist. If so, the logic flow process proceeds to logic step 341 to continue as before described. Otherwise, the logic flow process concludes at logic step 361.

Referring to FIG. 16, the logic step 88 of FIG. 4 (the generation of the half period leave seniority processing constraints of inequalities (33)-(36)) is illustrated in more detail. Due to the structural equivalence of the first half period leave seniority constraints of inequalities (33)-(34) to the last half period leave seniority constraints of inequalities (35)-(36), the process for their generation is similar. FIG. 16 illustrates this process and accepts as input the type of the half period leave seniority processing constraints to be generated, first half or last half.

The logic flow process begins at logic step 371 where the half period leave type is input. From logic step 371, the logic flow process proceeds to logic step 372 where a location is selected. From logic step 372, the logic flow process continues to logic step 373 where the most junior employee E is selected from the location's input half period leave container. The logic flow process proceeds to logic step 374 where a determination is made whether employee E is the most senior employee in the input half period leave container for the location. If so, the logic flow process moves to logic step 389. Otherwise, the logic flow process continues to logic step 375. At logic step 375, the decision variable representing employee E's input half period leave request for the location is retrieved. Next, the logic flow process proceeds to logic step 376 where the most junior employee F senior to employee E, and in the location's input half period leave container, is selected. From logic step 376, the logic flow process continues to logic step 377 where a unique constraint identifier C is generated, and then proceeds to logic step 378 where employee E's retrieved decision variable is given a coefficient of "1" for constraint C. Next, the logic flow process proceeds to logic step 379 where it is determined whether employee F's input half period leave request is its primary leave request for the location. If so, the logic flow process continues to logic step 380. Otherwise, the logic flow process moves to logic step 383.

At logic step 380, the decision variable for employee F's primary input half period leave request for the location is retrieved. The logic flow process continues from logic step 380 to logic step 381 where employee F's decision variable is given a coefficient of "−1" for constraint C. The logic flow process moves next to logic step 382 where the sense for constraint C is set to less than (=), and the right hand side is set to zero. This reflects the generation of the constraint of inequality (33) if the input half period leave is the first half period leave, and the generation of the constraint of inequality (35) if the input half period leave is the last half period leave. It is noteworthy to observe that any more half period leave seniority processing constraints based on junior employee E at the selected location are mathematically redundant to the constraint just generated. From logic step 382, the logic flow process proceeds to logic step 388.

At logic step 383, the decision variables representing all of employee F's leave requests for the location are retrieved. The logic flow process continues from logic step 383 to logic step 384 where employee F's decision variables are given the coefficient of −1 for constraint C. The logic flow process moves next to logic step 385 where the sense for constraint C is set to less than (=), and the right hand side is set to zero. This reflects the generation of the constraint of inequality (34) if the input half period leave is the first half period leave, and the generation of the constraint of inequality (36) if the input half period leave is the last half period leave. From logic step 385, the logic flow process continues to logic step 386 where a determination is made whether employee F is the most senior employee in the location's input half container. If so, the logic flow process proceeds to logic step 388; otherwise, the logic flow process continues to logic step 387. At logic step 387, employee F is replaced with the next senior employee in the location's input half period leave container. From logic step 387, the logic flow process continues to logic step 377 to proceed as before described.

At logic step 388, employee E is replaced with the next senior employee in the location's input half period leave container, and the logic flow process then proceeds to logic step 374 to continue as before described. At logic step 389, a determination is made whether more locations exist. If so, the logic flow process proceeds to logic step 372 to continue as before described; otherwise, the logic flow process concludes at logic step 390.

Referring to FIG. 17, the logic step 89 of FIG. 4 (the generation of the half period leave award processing constraints of inequalities (37)-(38) is illustrated in more detail. Due to the structural equivalence of the first half period leave award processing constraint of inequality (37) to the last half period leave award processing constraint of inequality (38), the process for their generation is similar. FIG. 17 illustrates this process, and accepts as input the type of the half period leave award processing constraint to be generated, first half or last half.

The logic flow process begins at logic step 401 where the half period leave type is input. From logic step 401, the logic flow process proceeds to logic step 402 where a location is selected. From logic step 402, the logic flow process continues to logic step 403 where an employee E is selected from the location's input half period leave container. The logic flow process then proceeds to logic step 404 where the decision variable representing employee E's input half period leave request for the location is retrieved. Next, the logic flow process proceeds to logic step 405 where an employee F who is not employee E is selected from the location's full period leave container. From logic step 405, the logic flow process continues to logic step 406 where a unique constraint identifier C is generated, and then proceeds to logic step 407 where employee E's decision variable is given a coefficient of "1" for constraint C. Next, the logic flow process proceeds to logic step 408 where the decision variables representing all of employee F's leave requests for the location are retrieved. The logic flow process continues from logic step 408 to logic step 409 where employee F's decision variables are given the coefficient of "−1" for constraint C. The logic flow process moves next to logic step 410 where the sense for constraint C is set to less than (=), and the right hand side is set to zero. This reflects the generation of the constraint of inequality (37) if the input half period leave is the first half period leave, and the generation of the constraint of inequality (38) if the input half period leave is the last half period leave. From logic step 410, the logic flow process continues to logic step 411 where a determination is made whether there are more employees in the location's full period leave container. If so, the logic flow process proceeds to logic step 405 to continue as before described. Otherwise, the logic flow process continues to logic step 412. At logic step 412, the determination is made whether there are more employees in the location's input half period leave container. If so, the logic flow process proceeds to logic step 403 to continue as before described. Otherwise, the logic flow process moves to logic step 413. At logic step 413, a determination is made whether more locations exist. If so, the logic flow process proceeds to logic step 402; otherwise, the logic flow process concludes at logic step 414.

Referring to FIG. 18, the logic step 90 of FIG. 4 (the generation of the single leave award restriction of inequality (39)) is illustrated in more detail. The logic flow process begins at logic step 421 where an employee with leave requests is selected. From logic step 421, the logic flow process continues to logic step 422 where a determination is made whether the employee has more than one leave requests. If so, the logic flow process continues to logic step 423; otherwise, the logic flow process moves to logic step 427. At logic step 423, the decision variables representing all of the employee's leave requests are retrieved. The logic flow process then proceeds to logic step 424 where a unique constraint identifier C is generated, and then moves to logic step 425 where the decision variables are given a coefficient of "1" for constraint C. Next, the logic flow process proceeds to logic step 426 where the sense for constraint C is set to less than (=), and the right hand side is set to one. The logic flow process then continues from logic step 426 to logic step 427 where a determination is made whether there exist more employees with leave requests. If so, the logic flow process continues to logic step 421 to continue as before described. Otherwise, the logic flow process concludes at logic step 428.

Referring to FIG. 19, the logic step 91 of FIG. 4 (the generation of the junior jobshare partner constraint of equation (40)) is illustrated in more detail. The logic flow process begins at logic step 431 where an employee E who is a senior partner in a jobshare request is selected. From logic step 431, the logic flow process continues to logic step 432 where a unique constraint identifier C is generated, and then proceeds to logic step 433 where the decision variable representing employee E's jobshare request is retrieved. The logic flow process then moves to logic step 434 where the decision variable is given a coefficient of "1" for constraint C. Next, the logic flow process proceeds to logic step 435 where the decision variable representing employee E's junior jobshare partner's jobshare request is retrieved. From logic step 435, the logic flow process continues to logic step 436 where employee E's partner's jobshare request decision variable is given the coefficient of −1 for constraint C. The logic flow process then continues to logic step 437 where the sense for constraint C is set to equality (=), and the right hand side is set to zero. From logic step 437, the logic flow process continues to logic step 438 where a determination is made whether there exist more employees who are senior partners in jobshare requests. If so, the logic flow process continues to logic step 431 to proceed as before described. Otherwise, the logic flow process concludes at logic step 439.

Referring to FIG. 20, the logic steps 73 and 92 of FIG. 4 (the generation of the minimum/maximum leave range constraints of inequalities (41)-(46) restricting leave awards for a location) is illustrated in more detail. The logic flow process begins at logic step 441 where the leave type, full period, first half period, or last half period, and type of constraint, minimum or maximum, is input. The logic flow process continues to logic step 442 where a location is selected, and then moves to logic step 443 where it is determined whether the location's range value is not null for the input leave type and constraint type. If the value is not null, the logic flow process continues to logic step 444; otherwise, the logic flow process moves to logic step 454. At logic step 444 a unique constraint identifier C is generated. From logic step 444, the logic flow process continues to logic step 445 where an employee is selected from the location's input leave type container, and then proceeds to logic step 446 where the decision variable representing the employee's leave request to the location is retrieved. The logic flow process moves next to logic step 447 where the decision variable is given a coefficient of "1" for constraint C, and then continues to logic step 448 where it is determined whether the input leave type is the full period leave. If so, the logic flow process continues to logic step 449; otherwise, the logic flow process moves to logic step 452.

At logic step 449, a determination is made whether the selected employee's full period leave request is a jobshare request, whether the employee is the senior partner in the request, and whether the employee has an alternate full period leave request as well. If so, then the logic flow process continues to logic step 450; otherwise, the logic flow process moves to logic step 452. At logic step 450, the decision variable representing the employee's alternate full period leave request is retrieved. From logic step 450, the logic flow process proceeds to logic step 451 where the alternate full period leave decision variable is given a coefficient of "1" for constraint C. The logic flow process next continues to logic step 452.

At logic step 452, it is determined whether there exist more employees in the location's input leave type container. If so, the logic flow process continues to logic step 445 to proceed as before described. Otherwise, the logic flow process proceeds to logic step 453. At logic step 453, the sense and right hand side for constraint C are set. If the input constraint type is minimum, the sense is greater than (=) and the right hand side is the minimum range value for the input leave type for the location. This represents the generation of inequality (41), inequality (42), or inequality (43) depending on the input leave type. If the input constraint type is maximum, then the sense is less than (=), and the right hand side is the maximum range value for the input leave type for the location. This represents the generation of inequality (44), inequality (45), or inequality (46) depending on the input leave type. From logic step 453, the logic flow process continues to logic step 454. At logic step 454, a determination is made whether there are more locations. If so, the logic flow process moves to logic step 442 to continue as before described; otherwise, the logic flow process concludes at logic step 455.

Referring to FIG. 21, the logic step 63 of FIG. 4 (the generation of the exact transfer/leave staffing constraints of equations (55)-(57)) is illustrated in more detail. The logic flow process commences at logic step 461 where a location is selected. From logic step 461, the logic flow process continues to logic step 462 where a unique constraint identifier C is generated. Next, the logic flow process proceeds to logic step 463 where an employee is selected from the location's transfer in container. From logic step 463, the logic flow process moves to logic step 464 where the decision variable representing the employee's transfer request into the location is retrieved. Proceeding further, the logic flow process continues from logic step 464 to logic step 465 where the decision variable is given the coefficient of "1" for constraint C. Next, the logic flow process proceeds to logic step 466 where a determination is made whether there are more employees in the location's transfer in container. If so, the logic flow process returns to logic step 463 to continue as before described. Otherwise, the logic flow process continues to logic step 467.

At logic step 467, an employee is selected from the location's transfer out container. From logic step 467, the logic flow process proceeds to logic step 468 where the decision variables representing all the employee's transfer requests out of the location are retrieved. Next, the logic flow process moves to logic step 469 where the decision variables are given the coefficient of "−1" for constraint C. From logic step 469, the logic flow process proceeds to logic step 470 where a determination is made whether there are more employees in the location's transfer out container. If so, the logic flow process returns to logic step 467 to continue as before described; otherwise, the logic flow process continues to logic step 471.

At logic step 471, an employee is selected from the location's full period leave container. From logic step 471, the logic flow process moves to logic step 472 where the decision variable representing the employee's full period leave request for the location is retrieved. Proceeding further, the logic flow process continues from logic step 472 to logic step 473 where a determination is made whether the employee's full period leave request is a jobshare request, whether the employee is the senior partner in the request, and whether the employee has an alternate full period leave request as well. If so, the logic flow process continues to logic step 474; otherwise, the logic flow process moves to logic step 475. At logic step 474, the decision variable representing the employee's alternate full period leave request is retrieved. From logic step 474, the logic flow process proceeds to logic step 475.

At logic step 475, the decision variables retrieved for the employee are given the coefficient of "−1" for constraint C. From logic step 475, the logic flow process continues to logic step 476 where a determination is made whether there are more employees in the location's full period leave container. If so, the logic flow process returns to logic step 471 to continue as before described; otherwise, the logic flow process continues to logic step 477.

At logic step 477, the location's new hire assignment variable is given a coefficient of "1" for constraint C. Proceeding from logic step 477 to logic step 478, the location's full period leave slack variable is given the coefficient of "−1" for constraint C. The logic flow process then continues from logic step 478 to logic step 479 where the sense for constraint C is set to equality (=)) and the right hand side is set to the required staffing deficit for the location. This completes the generation of equation (55) for the location.

The logic flow process next proceeds from logic step 479 to logic step 480 where a unique constraint identifier C is generated. The logic flow process then moves to logic step 481 where an employee is selected from the location's first half period leave container. From logic step 481, the logic flow process continues to logic step 482 where the decision variable representing the employee's first half period leave request for the location is retrieved. Proceeding further, the logic flow process continues from logic step 482 to logic step 483 where the employee's decision variable is given the coefficient of "1" for constraint C, and then moves to logic step 484 where a determination is made whether there are more employees in the location's first half period leave container. If so, the logic flow process moves to logic step 481 to continue as before described; otherwise, the logic flow process continues to logic step 485. At logic step 485, the location's full period leave slack variable is given the coefficient of "−1" for constraint C. The logic flow process then continues from logic step 485 to logic step 486 where the sense for constraint C is set to equality (=), and the right hand side is set to zero. This completes the generation of equation (56) for the location.

The logic flow process proceeds from logic step 486 to logic step 487 where a unique constraint identifier C is generated. Next, the logic flow process moves to logic step 488 where an employee is selected from the location's last half period leave container. From logic step 488, the logic flow process continues to logic step 489 where the decision variable representing the employee's last half period leave request for the location is retrieved. Proceeding further, the logic flow process continues from logic step 489 to logic step 490 where the employee's decision variable is given the coefficient of "−1" for constraint C, and then moves to logic step 491 where a determination is made whether there are more employees in the location's last half period leave container. If so, the logic flow process moves to logic step 488 to continue as before described; otherwise, the logic flow process continues to logic step 492. At logic step 492 the location's last half new hire assignment variable is given the coefficient of "1" for constraint C.

The logic flow process continues from logic step 492 to logic step 493 where the location's full period leave slack variable is given the coefficient of "1" for constraint C. The logic flow process next moves from logic step 493 to logic step 494 where the sense for constraint C is set to equality (=) and the right hand side is set to the negative of the quantity of user-specified last half period new hires assigned to the location. This completes the generation of equation (57) for the location.

From logic step 494 the logic flow process proceeds to logic step 495 where a determination is made whether there exist any more locations. If so, the logic flow process continues to logic step 461 to continue as before described; otherwise, the logic flow process concludes at logic step 496.

Referring to FIG. 22, the logic step 64 of FIG. 4 (the generation of the approximate transfer/leave staffing constraints of equations (58)-(60)) is illustrated in more detail. The logic flow process commences at logic step 501 where a location is selected. From logic step 501, the logic flow process continues to logic step 502 where a unique constraint identifier C is generated. Next, the logic flow process proceeds to logic step 503 where an employee is selected from the location's transfer in container. From logic step 503, the logic flow process moves to logic step 504 where the decision variable representing the employee's transfer request into the location is retrieved. Proceeding further, the logic flow process continues from logic step 504 to logic step 505 where the decision variable is given the coefficient of "1" for constraint C. Next, the logic flow process proceeds to logic step 506 where a determination is made whether there are more employees in the location's transfer in container. If so, the logic flow process returns to logic step 503 to continue as before described; otherwise, the logic flow process continues to logic step 507.

At logic step 507, an employee is selected from the location's transfer out container. From logic step 507, the logic flow process proceeds to logic step 508 where the decision variables representing all of the employee's transfer requests out of the location are retrieved. Next, the logic flow process moves to logic step 509 where the decision variables are given the coefficient of "−1" for constraint C. From logic step 509, the logic flow process proceeds to logic step 510 where a determination is made whether there are more employees in the location's transfer out container. If so, the logic flow process returns to logic step 507 to continue as before described; otherwise, the logic flow process continues to logic step 511.

At logic step 511, an employee is selected from the location's full period leave container. From logic step 511, the logic flow process moves to logic step 512 where the decision variable representing the employee's full period leave request for the location is retrieved. Proceeding further, the logic flow process continues from logic step 512 to logic step 513 where a determination is made whether the employee's full period leave request is a jobshare request, whether the employee is the senior partner in the request, and whether the employee has an alternate full period leave request as well. If so, the logic flow process continues to logic step 514; otherwise, the logic flow process moves to logic step 515. At logic step 514, the decision variable representing the employee's alternate full period leave request is retrieved. From logic step 514, the logic flow process proceeds to logic step 515.

At logic step 515, the decision variables retrieved for the employee are given the coefficient of "−1" for constraint C. From logic step 515, the logic flow process continues to logic step 516 where a determination is made whether there are more employees in the location's full period leave container. If so, the logic flow process returns to logic step 511 to continue as before described; otherwise, the logic flow process proceeds to logic step 517.

At logic step 517, the location's new hire assignment variable is given a coefficient of "1" for constraint C. Proceeding from logic step 517 to logic step 518, the location's full period leave under-awarding variable is given the coefficient of "−1" for constraint C. From logic step 518, the logic flow process continues to logic step 519 where the location's full period leave over-awarding variable is given the coefficient of "1" for constraint C. The logic flow process continues from logic step 519 to logic step 520 where the sense for constraint C is set to equality (=), and the right hand side is set to the required staffing deficit for the location. This completes the generation of equation (58) for the location.

The logic flow process proceeds from logic step 520 to logic step 521 where a unique constraint identifier C is generated. Next, the logic flow process moves to logic step 522 where an employee is selected from the location's first half period leave container. From logic step 522, the logic flow process continues to logic step 523 where the decision variable representing the employee's first half period leave request for the location is retrieved. Proceeding further, the logic flow process continues from logic step 523 to logic step 524 where the employee's decision variable is given the coefficient of "1" for constraint C, and then proceeds to logic step 525 where a determination is made whether there are more employees in the location's first half period leave container. If so, the logic flow process returns to logic step 522 to continue as before described; otherwise, the logic flow process continues to logic step 526. At logic step 526, the location's full period leave under-awarding variable is given the coefficient of "−1" for constraint C. From logic step 526, the logic flow process proceeds to logic step 527 where the location's full period leave over-awarding variable is given the coefficient of "1" for constraint C. Next, the logic flow process moves to logic step 528 where the location's first half period leave under-awarding variable is given the coefficient of "1" for constraint C, and then continues to logic step 529 where the location's first half period leave over-awarding variable is given the coefficient of "−1" for constraint C. The logic flow process proceeds from logic step 529 to logic step 530 where the sense for constraint C is set to equality (=), and the right hand side is set to zero. This completes the generation of equation (59) for the location.

The logic flow process proceeds from logic step 530 to logic step 531 where a unique constraint identifier C is generated. Next, the logic flow process moves to logic step 532 where an employee is selected from the location's last half period leave container. From logic step 532, the logic flow process continues to logic step 533 where the decision variable representing the employee's last half period leave request for the location is retrieved. Proceeding further, the logic flow process continues from logic step 533 to logic step 534 where the employee's decision variable is given the coefficient of "−1" for constraint C, and then moves to logic step 535 where a determination is made whether there are more employees in the location's last half period leave container. If so, the logic flow process returns to logic step 532 to continue as before described; otherwise, the logic flow process continues to logic step 536. At logic step 536, the location's full period leave under-awarding variable is given the coefficient of "1" for constraint C. From logic step 536, the logic flow process proceeds to logic step 537 where the location's full period leave over-awarding variable is given the coefficient of "−1" for constraint C. Next, the logic flow process moves to logic step 538 where the location's last half period leave under-awarding variable is given the coefficient of "−1" for constraint C, and then continues to logic step 539 where the location's last half period leave over-awarding variable is given the coefficient of "1" for constraint C. From logic step 539, the logic flow process proceeds to logic step 540 where the location's last half new hire assignment variable is given the coefficient of "1" for constraint C. The logic flow process then continues from logic step 540 to logic step 541 where the sense for constraint C is set to equality (=), and the right hand side is set to the negative of the quantity of user-specified last half period new hires assigned to the location. This completes the generation of equation (60) for the location.

From logic step 541, the logic flow process proceeds to logic step 542 where a determination is made whether there exist more locations. If so, the logic flow process continues to logic step 501 to proceed as before described; otherwise, the logic flow process concludes at logic step 543.

Referring to FIG. 23, the logic step 66 of FIG. 4 (the generation of the transfer/full period leave seniority processing constraints of inequalities (61)-(68)) is illustrated in more detail. The logic flow process begins at logic step 551 where a location is selected. From logic step 551, the logic flow process continues to logic step 552 where the most junior employee E is selected from the location's full period leave container. The logic flow process then proceeds to logic step 553 where a determination is made whether employee E is the most senior employee in the full period leave container for the location. If so, the logic flow process moves to logic step 581; otherwise, the logic flow process continues to logic step 554. At logic step 554, the decision variable representing employee E's full period leave request for the location is retrieved. Next, the logic flow process proceeds to logic step 555 where a determination is made whether employee E's full period leave request is a jobshare request, whether employee E is the senior partner in the request, and whether employee E has an alternate full period leave request as well. If so, the logic flow process continues to logic step 556; otherwise, the logic flow process moves to logic step 557. At logic step 556, the decision variable representing employee E's alternate full period leave request is retrieved. From logic step 556, the logic flow process proceeds to logic step 557.

At logic step 557, the most junior employee F senior to employee E and in the location's full period leave container is selected. From logic step 557, the logic flow process continues to logic step 558 where a unique constraint identifier C is generated, and then proceeds to logic step 559 where it is determined whether employee F has a transfer request into the location. If so, the logic flow process proceeds to logic step 560; otherwise, the logic flow process continues to logic step 564. At logic step 560, the decision variable representing employee F's transfer request into the location is retrieved. The logic flow process next moves to logic step 561 where a temporary variable X is set to "−2", and then continues to logic step 562 where the left hand side for constraint C is set to zero and the constraint C's left hand side sense is set to less than (=). From logic step 562, the logic flow process proceeds to logic step 563 where employee F's retrieved transfer decision variable is given a coefficient of "1" for constraint C. The logic flow process next proceeds to logic step 568.

At logic step 564, a determination is made whether employee F has a transfer request out of the location. If so, the logic flow process proceeds to logic step 565; otherwise, the logic flow process continues to logic step 568. At logic step 565, the decision variables representing all of employee F's transfer requests out of the location are retrieved. From logic step 565, the logic flow process continues to logic step 566 where a temporary variable X is set to "−1", and then moves to logic step 567 where employee F's retrieved transfer decision variables are given a coefficient of "−1" for constraint C. From logic step 567, the logic flow process proceeds to logic step 569.

At logic step 568, a temporary variable X is set to "−1". From logic step 568, the logic flow process continues to logic step 569. At logic step 569, employee E's retrieved leave decision variables are given the coefficient of "1" for constraint C. The logic flow process then continues to logic step 570, where a determination is made whether employee F's full period leave request at the location is its primary request for the location. If so, the logic flow process proceeds to logic step 571; otherwise, the logic flow process moves to logic step 575.

At logic step 571, the decision variable for employee F's primary full period leave request for the location is retrieved. The logic flow process continues from logic step 571 to logic step 572 where employee F's full period leave decision variable is given a coefficient of value X for constraint C. The logic flow process moves next to logic step 573 where the sense for constraint C is set to less than (=), and the right hand side is set to zero if X equals "−1" or to one if X equals "−2". This reflects the generation of the constraint of inequality (61) if employee F has no transfer requests, the constraint of inequality (62) if employee F has transfer requests out of the location, the constraint of inequality (63) if employee F has a primary transfer request into the location, and the constraint of inequality (64) if employee F has a secondary transfer request into the location. It is noteworthy to observe that if the constraint of inequality (61) has been generated for junior employee E, then additional transfer/full period leave seniority processing constraints for junior employee E are mathematically redundant to the constraint of inequality (61) just generated. From logic step 573, the logic flow process proceeds to logic step 574 where a determination is made whether employee F has any transfer requests. If so, the logic flow process continues to logic step 578; otherwise, the logic flow process moves to logic step 580.

At logic step 575, the decision variables representing all of employee F's leave requests for the location are retrieved. The logic flow process continues from logic step 575 to logic step 576 where employee F's leave decision variables are given the coefficient of value X for constraint C. The logic flow process moves next to logic step 577 where the sense for constraint C is set to less than (=), and the right hand side is set to zero if X equals "−1" or to one if X equals "−2". This reflects the generation of the constraint of inequality (65) if employee F has no transfer requests, the constraint of inequality (66) if employee F has transfer requests out of the location, the constraint of inequality (67) if employee F has a primary transfer request into the location, and the constraint of inequality (68) if employee F has a secondary transfer request into the location. From logic step 577, the logic flow process continues to logic step 578.

At logic step 578, a determination is made whether employee F is the most senior employee in the location's full period leave container. If so, the logic flow process proceeds to logic step 580; otherwise, the logic flow process continues to logic step 579. At logic step 579, employee F is replaced with the next senior employee in the location's full period leave container. From logic step 579, the logic flow process continues to logic step 558 to proceed as before described.

At logic step 580, employee E is replaced with the next senior employee in the location's full period leave container. From logic step 580, the logic flow process proceeds to logic step 553. At logic step 581, a determination is made whether more locations exist. If so, the logic flow process proceeds to logic step 551 to continue as before described; otherwise, the logic flow process concludes at logic step 582.

Referring to FIG. 24, the logic step 67 of FIG. 4 (the generation of the transfer/half period leave seniority processing constraints of inequalities (69)-(84)) is illustrated in more detail. Due to the structural equivalence of the transfer/first half period leave seniority constraints of inequalities (69)-(76) to the transfer/last half period leave seniority constraints of inequalities (77)-(84), the process for their generation is similar. FIG. 24 illustrates this process and accepts as input the type of the half period leave seniority processing constraints to be generated, first half or last half.

The logic flow process begins at logic step 591 where the half period leave type is input. From logic step 591, the logic flow process proceeds to logic step 592 where a location is selected. From logic step 592, the logic flow process continues to logic step 593 where the most junior employee E is selected from the location's input half period leave container. The logic flow process proceeds to logic step 594 where a determination is made whether employee E is the most senior employee in the input half period leave container for the location. If so, the logic flow process moves to logic step 620; otherwise, the logic flow process continues to logic step 595. At logic step 595, the decision variable representing employee E's input half period leave request for the location is retrieved. Next, the logic flow process proceeds to logic step 596 where the most junior employee F senior to employee E and in the location's input half period leave container is selected. From logic step 596, the logic flow process continues to logic step 597 where a unique constraint identifier C is generated, and then moves to logic step 598 where it is determined whether employee F has a transfer request into the location. If so, the logic flow process proceeds to logic step 599; otherwise, the logic flow process continues to logic step 603. At logic step 599, the decision variable representing employee F's transfer request into the location is retrieved. The logic flow process next moves to logic step 600 where a temporary variable Y is set to "−2", and then proceeds to logic step 601 where the left hand side for constraint C is set to zero and constraint C's left hand side sense is set to less than (=). From logic step 601, the logic flow process proceeds to logic step 602 where employee F's retrieved transfer decision variable is given a coefficient of "1" for constraint C. The logic flow process next proceeds to logic step 606.

At logic step 603, a determination is made whether employee F has a transfer request out of the location. If so, the logic flow process proceeds to logic step 604; otherwise, the logic flow process continues to logic step 607. At logic step 604, the decision variables representing all of employee F's transfer requests out of the location are retrieved. From logic step 604, the logic flow process continues to logic step 605 where a temporary variable Y is set to "−1", and then moves to logic step 606 where employee F's retrieved transfer decision variables are given a coefficient of "−1" for constraint C. From logic step 606, the logic flow process proceeds to logic step 608.

At logic step 607, a temporary variable Y is set to "−1". From logic step 607, the logic flow process continues to logic step 608. At logic step 608, employee E's input half period leave decision variable is given the coefficient of "1" for constraint C. Continuing the logic flow process to logic step 609, a determination is made whether employee F's input half period leave request at the location is its primary request for the location. If so, the logic flow process proceeds to logic step 610; otherwise, the logic flow process moves to logic step 614.

At logic step 610, the decision variable for employee F's primary input half period leave request for the location is retrieved. The logic flow process continues from logic step 610 to logic step 611 where employee F's input half period leave decision variable is given a coefficient of value Y for constraint C. The logic flow process moves next to logic step 612 where the sense for constraint C is set to less than (=), and the right hand side is set to zero if Y equals "−1" or to one if Y equals "−2". This reflects the generation of the constraint of inequality (69) if employee F has no transfer requests and the input half period leave type is first half, the constraint of inequality (77) if employee F has not transfer requests and the input half period leave type is last half, the constraint of inequality (70) if employee F has transfer requests out of the location and the input half period leave type is first half, the constraint of inequality (78) if employee F has transfer requests out of the location and the input half period leave type is last half, the constraint of inequality (71) if employee F has a primary transfer request into the location and the input half period leave type is first half, the constraint of inequality (79) if employee F has a primary transfer request into the location and the input half period leave type is last half, the constraint of inequality (72) if employee F has a secondary transfer request into the location and the input half period leave type is first half, and the constraint of inequality (80) if employee F has a secondary transfer request into the location and the input half period leave type is last half. It is noteworthy to observe that if one of the constraints of inequalities (69) or (77) has been generated for junior employee E, then additional transfer/full period leave seniority processing constraints for junior employee E are mathematically redundant to the constraint just generated. From logic step 612, the logic flow process proceeds to logic step 613 where a determination is made whether employee F has any transfer requests. If so, the logic flow process continues to logic step 617; otherwise, the logic flow process moves to logic step 619.

At logic step 614, the decision variables representing all of employee F's leave requests for the location are retrieved. The logic flow process continues from logic step 614 to logic step 615 where employee F's leave decision variables are given the coefficient of value Y for constraint C. The logic flow process moves next to logic step 616 where the sense for constraint C is set to less than (=), and the right hand side is set to zero if Y equals "−1" or to one if Y equals "−2". This reflects the generation of the constraint of inequality (73) if employee F has no transfer requests and the input half period leave type is first half, the constraint of inequality (81) if employee F has no transfer requests and the input half period leave type is last half, the constraint of inequality (74) if employee F has transfer requests out of the location and the input half period leave type is first half, the constraint of inequality (82) if employee F has transfer requests out of the location and the input half period leave type is last half, the constraint of inequality (75) if employee F has a primary transfer request into the location and the input half period leave type is first half, the constraint of inequality (83) if employee F has a primary transfer request into the location and the input half period leave type is last half, the constraint of inequality (76) if employee F has a secondary transfer request into the location and the input half period leave type is first half, and the constraint of inequality (84) if employee F has a secondary transfer request into the location and the input half period leave type is last half. From logic step 616, the logic flow process continues to logic step 617.

At logic step 617, a determination is made whether employee F is the most senior employee in the location's input half period leave container. If so, the logic flow process proceeds to logic step 619; otherwise, the logic flow process continues to logic step 618. At logic step 618, employee F is replaced with the next senior employee in the location's input half period leave container. From logic step 618, the logic flow process continues to logic step 597 to proceed as before described.

At logic step 619, employee E is replaced with the next senior employee in the location's input half period leave container, and the logic flow process then proceeds to logic step 594 to continue as before described. At logic step 620, a determination is made whether more locations exist. If so, the logic flow process proceeds to logic step 592 to continue as before described; otherwise, the logic flow process concludes at logic step 621.

Referring to FIG. 25, the logic step 68 of FIG. 4 (the generation of the transfer/leave single award restrictions of inequalities (87)-(89)) is illustrated in more detail. Generation of the constraint of inequality (85) of the transfer/leave single award restrictions is illustrated in FIG. 8 for employees having only transfer requests. Generation of the constraint of inequality (86) of the transfer/leave single award restrictions is illustrated in FIG. 18 for employees having only leave requests. FIG. 25 illustrates the generation of the transfer/leave single award restrictions for employees having both transfer requests and leave requests.

The logic flow process of FIG. 25 begins at logic step 631 where an employee with both transfer requests and leave requests is selected. From logic step 631, the logic flow process continues to logic step 632 where a unique constraint identifier C is generated, and then moves to logic step 633 where the decision variables representing each of the employee's transfer requests are retrieved. The logic flow process proceeds to logic step 634 where the employee's transfer decision variables are given a coefficient of "1" for constraint C. From logic step 634, the logic flow process moves to logic step 635 where the decision variables representing each of the employee's leave requests at its current location are retrieved, and then proceeds to logic step 636 where the retrieved leave decision variables are given a coefficient of "1" for constraint C. The logic flow process continues to logic step 637 where the sense for constraint C is set to less than (=), and the right hand side is set to one. This reflects the generation of the constraint of inequality (87) for the employee.

From logic step 637, the logic flow process continues to logic step 638. At logic step 638, one of the employee's transfer requests is selected. The logic flow process proceeds to logic step 639 where a unique constraint identifier C is generated, and then continues to logic step 640 where the decision variable representing the employee's selected transfer request is retrieved. The logic flow process next moves to logic step 641 where the employee's selected transfer request decision variable is given a coefficient of "−1" for constraint C. From logic step 641, the logic flow process continues to logic step 642 where the decision variables for the employee's leave requests for the selected transfer location are retrieved, and then moves to logic step 643 where the employee's retrieved leave decision variables are given the coefficient of "1" for constraint C. The logic flow process proceeds to logic step 644 where the sense for constraint C is set to less than (=), and the right hand side is set to zero. This reflects the generation of the constraint of inequality (88) for the employee if the selected transfer request is its primary transfer request, and the constraint of inequality (89) if the employee's selected transfer request is its secondary transfer request.

From logic step 644, the logic flow process continues to logic step 645 where it is determined whether the employee has more transfer requests. If so, the logic flow process returns to logic step 638 to continue as before described; otherwise, the logic flow process moves to logic step 646. At logic step 646, a determination is made whether there are more employees with both transfer and leave requests. If so, the logic flow process continues to logic step 631 to proceed as before described; otherwise, the logic flow process concludes at logic step 647.

The invention described herein provides a means to generate a solution in seconds to a few minutes, and thus near real time. The employee transfer and leave optimization processor in accordance with the invention is parameter driven (e.g., parameter values and configurations may be varied to control the optimization processor). The user may set a variety of parameters in order to control the optimization processor. These parameters include the minimum and maximum quantity of awarded transfers into and out of specific locations, the minimum and maximum quantity of awarded leaves by type at specific locations, indicators allowing new hires into specific locations, indicators requiring transfer requests to be cleared (i.e., the most junior request is awarded) into specific locations, an indicator whether to process only transfer requests, an indicator whether to process only leave requests, and an indicator specifying that the required staffing levels be met exactly for the next time period. Because the invention is parameter driven, it can be executed several times with different parameter settings to generate a variety of solutions. With several solutions in hand, a user can converge towards solutions that were not previously attainable through their manual process.

The invention may be used to conduct what-if analysis of several operating scenarios by executing with distinct sets of parameter values and configuration settings. By generating a solution with an initial set of parameter values and configuration settings, inspecting the solution, and modifying one or more of the parameter values and/or configuration settings, a user can generate additional solutions to determine which meet the staffing requirements in such a way that the ability to meet future staffing levels is not compromised.

The parameter values that may be modified to generate additional solutions include the required staffing level for each location, quantity of last half period new hires assigned to specified locations, minimum quantity of awarded transfers into specified locations, maximum quantity of transfers permitted into specified locations, minimum quantity of transfers permitted out of specified locations, maximum quantity of transfers permitted out of specified locations, minimum quantity of awarded full period leaves for specified locations, maximum quantity of permitted full period leaves for specified locations, minimum quantity of awarded first half period leaves for specified locations, maximum quantity of permitted full period leaves for specified locations, minimum quantity of awarded last half period leaves for specified locations, maximum quantity of permitted last half period leaves for specified locations, a value representing the quantity of unassigned new hires requiring assignments, and a value representing the quantity of unassigned last half period new hires requiring assignments.

The configuration settings that may be modified to generate additional solutions include the indicator requiring transfer request processing, the indicator requiring leave request processing, the indicator requiring staffing levels to be matched exactly at all locations, the indicator allowing new hires into specified location, and the indicator requiring the inbound transfer lists to be cleared for specified locations.

Through the modification of the parameter values and configuration settings, the user is capable of executing the invention multiple times to converge upon a specific solution that more nearly fits the operational requirements of the organization. This what-if capability empowers the user to proactively and interactively optimize the processing of employee transfer and leave requests, and the location assignments of new hires and last half period new hires.

The invention has been particularly shown and described in detail with reference to a preferred embodiment, which is merely illustrative of the principles of the invention and is not to be taken as a limitation to its scope. It further will be readily understood by those skilled in the art, operations research, that substitution of equivalent elements, reordering of steps, and other modifications and alterations of the invention may occur without departing from the scope and spirit of the invention. The appended claims are intended to include within their scope such modifications and alterations.

What is claimed is:

1. A parameter driven system for generating in near real time an optimal solution in response to employee transfer requests and leave requests for an entire enterprise, which comprises;

receiving means for providing input data including employee data, parameter values configuration settings, said transfer requests, and said leave requests from a user; and optimization processor means in electrical communication with said receiving means for automatically generating a mixed integer programming model with decision variables and constraints from said input data, and solving said mixed integer programming model in near real time to generate awards to employees including said transfer requests, said leave requests, new hire location assignments, and last half period new hire location assignments, wherein the optimization processor optimally awards transfer and leave requests based on seniority of the employee, and wherein said constraints include the following seniority transfer processing constraints:

$$x_{k,j} - x_{k',j} \leq 0, \forall k \in \Phi'_j, \forall k' \in \Phi'_j, \forall k' \gg k, \forall j \in J; \quad (i)$$

$$y_{k,j} - x_{k',j} \leq 0, \forall k \in \Phi_j \backslash \Phi'_j, \forall k' \in \Phi'_j, \forall k' \gg k, \forall j \in J; \quad (ii)$$

$$x_{k,j} - x_{k',j} - y_{k',j} \leq 0, \forall k \in \Phi'_j, \forall k' \in \Phi_j \backslash \Phi'_j, \forall k' \gg k, \forall j \in J; \text{ and} \quad (iii)$$

$$y_{k,j} - x_{k',j} - y_{k',j} \leq 0, \forall k \in \Phi_j \backslash \Phi'_j, \forall k' \in \Phi_j \backslash \Phi'_j, \forall k' \gg k, \forall j \in J; \quad (iv)$$

wherein k, k' are employees;
i, i', j, j' are locations;
j is a set of locations;
$\Phi_j$ is a set of all employees with requests to transfer into location j;
$\Phi'_j$ is a set of all employees primary transfer request is into location j;
$x_{i,j}$ is a primary request for employee k to transfer into location j; and
$y_{i,j}$ secondary request for employee k to transfer into location j.

2. The parameter driven system of claim 1, further including means for modifying said parameter values to generate parameter value sets from which said optimization processor generates corresponding award sets from which an optimal set may be selected to avoid compromising future staffing requirements.

3. The parameter driven system of claim 1, further including means for modifying said configuration settings to generate configuration setting sets from which said optimization processor generates corresponding award sets from which an optimal set may be selected to avoid compromising fixture staffing requirements.

4. A system for optimized processing of transfer requests, leave requests, new hire location assignments, and last half period new hire location assignments in managing employee staffing, which comprises:

a user interface for receiving parameter values and configuration settings from a user, and accessing said transfer requests, said leave requests, and employee data;

a database in electrical communication with said user interface and having stored therein said transfer requests, said leave requests, and said employee data; and an optimization processor in electrical communication with said user interface and receiving said employee data, said parameter values, and said configuration settings from said user, and at least one of said transfer requests and said leave requests from said database for generating an optimized solution in near real time for all employees of an organization, said optimized solution having at least one of awards of said leave requests and awards of said transfer requests, wherein the transfer and leave awards are based on seniority of the employees said new hire location assignments, and said last half period new hire location assignments, wherein said optimized solution is obtained by solving a mixed integer programming model having at least one objective function, and comprised of decision variables and constraints developed from said employee data, said leave requests, said transfer requests, said parameter values, and said configuration settings, and wherein said constraints include the following seniority transfer processing constraints:

$$x_{k,j} - x_{k',j} \leq 0, \forall k \in \Phi'_j, \forall k' \in \Phi'_j, \forall k' \gg k, \forall j \in J; \quad (i)$$

$$y_{k,j} - x_{k',j} \leq 0, \forall k \in \Phi_j \backslash \Phi'_j, \forall k' \in \Phi'_j, \forall k' \gg k, \forall j \in J; \quad (ii)$$

$$x_{k,j} - x_{k',j} - y_{k',j} \leq 0, \forall k \in \Phi'_j, \forall k' \in \Phi_j \backslash \Phi'_j, \forall k' \gg k, \forall j \in J; \text{ and} \quad (iii)$$

$$y_{k,j} - x_{k',j} - y_{k',j} \leq 0, \forall k \in \Phi_j \backslash \Phi'_j, \forall k' \in \Phi_j \backslash \Phi'_j, \forall k' \gg k, \forall j \in J; \quad (iv)$$

wherein k, k' are employees;
i, i', j, j' are locations;
j is a set of locations;
$\Phi_j$ is a set of all employees with requests to transfer into location j;
$\Phi'_j$ is a set of all employees primary transfer request is into location j;
$x_{k,j}$ is a primary request for employee k to transfer into location j; and
$y_{k,j}$ secondary request for employee k to transfer into location j.

5. The system of claim 4, wherein said constraints include the following full period leave seniority processing constraints:

$$\sum_{t \in \{JS, FP\}} (w_{k,t} + u_{k,t} + v_{k,t} + z_{k,t}) - \sum_{t \in \{JS, FP\}} w_{k',t} \leq 0, \text{ where} \quad (i)$$

$$k \in A_j \cup B_j, k' \in A_j \cup B'_j, k' \gg k, \forall j \in J; \text{ and}$$

$$\sum_{t \in \{JS, FP\}} (w_{k,t} + u_{k,t} + v_{k,t} + z_{k,t}) - \sum_{t \in T} (w_{k',t} + u_{k',t} + v_{k',t} + z_{k',t}) \leq 0, \quad (ii)$$

$$\text{where } k \in A_j \cup B_j, k' \in B_j \backslash (A_j \cup B'_j), k' \gg k, \forall j \in J;$$

wherein k, k' are employees;
i, i', j, j' are locations;
t are leave types;
J is a set of all locations;
$A_j$ is a set of all employees who are senior partners of a jobshare request at location j;
$B_j$ is a set of all employees with full period leave requests at location j;
$B'_j$ is a set of all employees whose primary leave request is a full period leave request at location j;
T is a set of all leave types;
$u_{k,j}$ is a secondary leave request at location j for employee k;

$v_{k,j}$ is a third preference leave request at location j for employee k;

$w_{k,j}$ is a primary leave request at location j for employee k; and $z_{k,j}$ is a fourth preference leave request at location j for employee k.

6. The system of claim 4 wherein said constraints include the following half period leave seniority processing constraints:

$$w_{k,LH} + u_{k,LH} + v_{k,LH} + z_{k,LH} - w_{k',LH} \leq 0, \text{ where} \quad \text{(i)}$$
$$k \in C_j, k' \in C'_j, k' \gg k, \ \forall j \in J; \text{ and}$$

$$w_{k,FH} + u_{k,FH} + v_{k,FH} + z_{k,FH} - \sum_{t \in T}(w_{k',t} + u_{k',t} + v_{k',t} + z_{k',t}) \leq 0, \quad \text{(ii)}$$

$$w_{k,LH} + u_{k,LH} + v_{k,LH} + z_{k,LH} - w_{k',LH} \leq 0, \text{ where} \quad \text{(iii)}$$
$$k \in D_j, k' \in D'_j, k' \gg k, \ \forall j \in J; \text{ and}$$

$$w_{k,LH} + u_{k,LH} + v_{k,LH} + z_{k,LH} - \sum_{t \in T}(w_{k',t} + u_{k',t} + v_{k',t} + z_{k',t}) \leq 0, \quad \text{(iv)}$$
$$\text{where } k \in D_j, k' \in D'_j, k' \gg, \ \forall j \in J;$$

wherein k, k' are employees;
i, i', j, j' are locations;
t are leave types;
J is a set of all locations;
T is a set of all leave types;
$C_j$ is a set of all employees with first half leave requests at location j;
$C'_j$ is a set of all employees whose primary leave request is a first half leave request at location j;
$D_j$ is a set of all employees with last half leave requests at location j;
$D'_j$ is a set of all employees whose primary leave request is a last half leave request at location j;
$u_{k,j}$ is a secondary leave request at location j for employee k;
$v_{k,j}$ is a third preference leave request at location j for employee k;
$w_{k,j}$ is a primary leave request at location j for employee k; and
$z_{k,j}$ is a fourth preference leave request at location j for employee k.

7. The system of claim 4, wherein said constraints include the following transfer/full period leave seniority processing constraints:

$$\sum_{t \in \{JS,FP\}}(w_{k,t} + u_{k,t} + v_{k,t} + z_{k,t}) - \sum_{t \in \{JS,FP\}} w_{k',t} \leq 0, \text{ where} \quad \text{(i)}$$
$$k \in A_j \cup B_j, k' \in (A_j \cup B'_j) \backslash \Theta_j \backslash \Phi_j, k' \gg k, \ \forall j \in J;$$

$$\sum_{t \in \{JS,FP\}}(w_{k,t} + u_{k,t} + v_{k,t} + z_{k,t}) - \sum_{t \in \{JS,FP\}} w_{k',t} - x_{k',i} - y_{k',i'} \leq 0, \quad \text{(ii)}$$
$$\text{where } k \in A_j \cup B_j, k' \in (A_j \cup B'_j) \cap \Theta_j, k' \gg k, \ \forall j \in J;$$

$$0 \leq \sum_{t \in \{JS,FP\}}(w_{k,t} + u_{k,t} + v_{k,t} + z_{k,t}) - 2\sum_{t \in \{JS,FP\}} w_{k',t} + x_{k',j} \leq 1, \quad \text{(iii)}$$
$$\text{where } k \in A_j \cup B_j, k' \in (A_j \cup B'_j) \cup \Phi'_j, k' \gg k, \ \forall j \in J;$$

-continued $$0 \leq \sum_{t \in \{JS,FP\}}(w_{k,t} + u_{k,t} + v_{k,t} + z_{k,t}) - 2\sum_{t \in \{JS,FP\}} w_{k',t} + y_{k',j} \leq 1, \quad \text{(iv)}$$
$$\text{where } k \in A_j \cup B_j, k' \in (A_j \cup B'_j) \cap (\Phi_j \backslash \Phi'_j), k' \gg k, \ \forall j \in J;$$

$$\sum_{t \in \{JS,FP\}}(w_{k,t} + u_{k,t} + v_{k,t} + z_{k,t}) - \sum_{t \in T}(w_{k',t} + u_{k',t} + v_{k',t} + z_{k',t}) \leq 0, \quad \text{(v)}$$
$$\text{where } k \in A_j \cup B_j, k' \in (B_j \backslash B'_j \backslash A_j) \backslash \Theta_j \backslash \Phi_j, k' \gg k, \ \forall j \in J;$$

$$\sum_{t \in \{JS,FP\}}(w_{k,t} + u_{k,t} + v_{k,t} + z_{k,t}) - \quad \text{(vi)}$$
$$\sum_{t \in T}(w_{k',t} + u_{k',t} + v_{k',t} + z_{k',t}) - x_{k',i} - y_{k',i'} \leq 0,$$

where $$k \in A_j \cup B_j, k' \in (B_j \backslash B'_j \backslash A_j) \cap \Theta_j, k' \gg k, \ \forall j \in J; \quad \text{(vii)}$$
$$0 \leq \sum_{t \in \{JS,FP\}}(w_{k,t} + u_{k,t} + v_{k,t} + z_{k,t}) -$$
$$2\sum_{t \in T}(w_{k',t} + u_{k',t} + v_{k',t} + z_{k',t}) + x_{k',j} \leq 1,$$

where
$k \in A_j \cup B_j$, $k' \in (B_j \backslash B'_j \backslash A_j) \cap \Phi'_j$, $k' \gg k$, $\forall j \in J$; and $$0 \leq \sum_{t \in \{JS,FP\}}(w_{k,t} + u_{k,t} + v_{k,t} + z_{k,t}) - \quad \text{(viii)}$$
$$2\sum_{t \in T}(w_{k',t} + u_{k',t} + v_{k',t} + z_{k',t}) + y_{k',j} \leq 1,$$

where
$k \in A_j \cup B_j$, $k' \in (B_j \backslash B'_j \backslash A_j) \cap (\Phi_j \backslash \Phi'_j)$, $k' \gg k$, $\forall j \in J$;
wherein k, k' are employees;
i, i', j, j' are locations;
t are leave types;
J is a set of all locations;
T is a set off all leave types;
$A_j$ is a set of all employees who are senior partners of a jobshare request at location j;
$B_j$ is a set of all employees with full period leave requests at location j;
$B'_j$ is a set of all employees whose primary leave request is a full period leave request at location j;
$\Theta_j$ is a set of all employees currently at location j with requests to transfer out of location j;
$\Phi_j$ is a set of all employees with requests to transfer into location j;
$\Phi'_j$ is a set of all employees whose primary transfer request is into location j;
$u_{k,j}$ is a secondary leave request at location j for employee k;
$v_{k,j}$ is a third preference leave request at location j for employee k;
$w_{k,j}$ is a primary leave request at location j for employee k;
$x_{k,j}$ is a primary request for employee k to transfer into location j;
$y_{k,j}$ is a secondary request for employee k to transfer into location j; and $z_{k,j}$ is a fourth preference leave request at location j for employee k.

8. The system of claim 4, wherein said constraints include the following transfer/first half period leave seniority processing constraints:

$$w_{k,FH}+u_{k,FH}+v_{k,FH}+z_{k,FH}-w_{k',FH} \leq 0, \text{ where } k \in C_j, \quad (i)$$
$$k' \in C'_j \backslash \Theta_j \backslash \Phi_j, \ k' \gg k, \ \forall j \in J;$$

$$w_{k,FH}+u_{k,FH}+v_{k,FH}+z_{k,FH}-w_{k',FH}-x_{k',i}-y_{k',j'} \leq 0, \text{ where } \quad (ii)$$
$$k \in C_j, \ k' \in C'_j \cap \Theta_j, \ k' \gg k, \ \forall j \in J;$$

$$0 \leq w_{k,FH}+u_{k,FH}+v_{k,FH}+z_{k,FH}-2w_{k',FH}+x_{k',j} \leq 1, \text{ where } \quad (iii)$$
$$k \in C_j, \ k' \in C'_j \cap \Phi_j, \ k' \gg k, \ \forall j \in J;$$

$$0 \leq w_{k,FH}+u_{k,FH}+v_{k,FH}+z_{k,FH}-2w_{k',FH}+y_{k',j} \leq 1, \text{ where } \quad (iv)$$
$$k \in C_j, \ k' \in C'_j \cap (\Phi_j \backslash \Phi'_j), \ k' \gg k, \ \forall j \in J;$$

$$w_{k,FH}+u_{k,FH}+v_{k,FH}+z_{k,FH}-w_{k',FH} \leq 0, \text{ where} \quad (i)$$
$$k \in C_j, k' \in C'_j \backslash \Theta_j \backslash \Phi_j, k' \gg k, \forall j \in J;$$

$$w_{k,FH}+u_{k,FH}+v_{k,FH}+z_{k,FH}-w_{k',FH}-x_{k',i}-y_{k',j'} \leq 0, \text{ where} \quad (ii)$$
$$k \in C_j, k' \in C'_j \cap \Theta_j, k' \gg k, \forall j \in J;$$

$$0 \leq w_{k,FH}+u_{k,FH}+v_{k,FH}+z_{k,FH}-2w_{k',FH}+x_{k',j} \leq 1, \text{ where} \quad (iii)$$
$$k \in C_j, k' \in C'_j \cap \Theta_j, k' \gg k, \forall j \in J;$$

$$0 \leq w_{k,FH}+u_{k,FH}+v_{k,FH}+z_{k,FH}-2w_{k',FH}+y_{k',j} \leq 1, \text{ where} \quad (iv)$$
$$k \in C_j, k' \in C'_j \cap (\Phi_j \backslash \Phi'_j), k' \gg k, \forall j \in J;$$

$$w_{k,FH}+u_{k,FH}+v_{k,FH}+z_{k,FH} - \sum_{t \in T}(w_{k',t}+u_{k',t}+v_{k',t}+z_{k',t}) \leq 0, \quad (v)$$
where
$$k \in C_j, k' \in (C_j \backslash C'_j) \backslash \Theta_j \backslash \Phi_j, k' \gg k, \forall j \in J;$$

$$w_{k,FH}+u_{k,FH}+v_{k,FH}+z_{k,FH} - \quad (vi)$$
$$\sum_{t \in T}(w_{k',t}+u_{k',t}+v_{k',t}+z_{k',t}) - x_{k',i}-y_{k',j'} \leq 0, \text{ where}$$
$$k \in C_j, k' \in (C_j \backslash C'_j) \cap \Theta_j, k' \gg k, \forall j \in J;$$

$$0 \leq w_{k,FH}+u_{k,FH}+v_{k,FH}+z_{k,FH} - \quad (vii)$$
$$2\sum_{t \in T}(w_{k',t}+u_{k',t}+v_{k',t}+z_{k',t})+x_{k',j} \leq 1, \text{ where}$$
$$k \in C_j, k' \in (C_j \backslash C'_j) \cap \Theta'_j, k' \gg k, \forall j \in J; \text{ and}$$

$$0 \leq w_{k,FH}+u_{k,FH}+v_{k,FH}+z_{k,FH} - \quad (viii)$$
$$2\sum_{t \in T}(w_{k',t}+u_{k',t}+v_{k',t}+z_{k',t})+y_{k',j} \leq 1, \text{ where}$$
$$k \in C_j, k' \in (C_j \backslash C'_j) \cap (\Phi_j \backslash \Phi'_j), k' \gg k, \forall j \in J;$$

where k, k' are employees;
i, i', j, j' are locations;
t are leave types;
J is a set of all locations;
T is a set of all leave types;
$C_j$ is a set of all employees with first half leave requests at location j;
$C'_j$ is a set of all employees whose primary leave request is a first half leave request at location j;
$\Theta_j$ a set of all employees currently at location j with requests to transfer out of location j;
$\Phi_j$ is a set of all employees with requests to transfer into location j;
$\Phi'_j$ is a set of all employees whose primary transfer request is into location j;

$u_{k,j}$ is a secondary leave request at location j for employee k;
$v_{k,j}$ is a third preference leave request at location j for employee k;
$w_{k,j}$ is a primary leave request at location j for employee k;
$x_{k,j}$ is a primary request for employee k to transfer into location j;
$y_{k,j}$ is a secondary request for employee k to transfer into location j; and
$z_{k,j}$ is a fourth preference leave request at location j for employee k.

9. The system of claim 4, wherein said constraints include the following transfer/last half period leave seniority processing constraints:

$$w_{k,LH}+u_{k,LH}+v_{k,LH}+z_{k,LH}-w_{k',LH} \leq 0, \text{ where } k \in D_j, \quad (i)$$
$$k' \in D'_j \backslash \Theta_j \backslash \Phi_j, \ k' \gg k, \ \forall j \in J;$$

$$w_{k,LH}+u_{k,LH}+v_{k,LH}+z_{k,LH}-w_{k',LH}-x_{k',i}-y_{k',j'} \leq 0, \text{ where } \quad (ii)$$
$$k \in D_j, \ k' \in D'_j \cap \Theta_j, \ k' \gg k, \ \forall j \in J;$$

$$0 \leq w_{k,LH}+u_{k,LH}+v_{k,LH}+z_{k,LH}-2w_{k',LH}+x_{k',j} \leq 1, \text{ where } \quad (iii)$$
$$k \in D_j, \ k' \in D'_j \cap \Phi_j, \ k' \gg k \ \forall j \in J;$$

$$0 \leq w_{k,LH}+u_{k,LH}+v_{k,LH}+z_{k,LH}-2w_{k',LH}+y_{k',j} \leq 1, \text{ where } \quad (iv)$$
$$k \in D_j, \ k' \in D'_j \cap (\Phi_j \backslash \Phi'_j), \ k' \gg k, \ \forall j \in J;$$

$$w_{k,LH}+u_{k,LH}+v_{k,LH}+z_{k,LH}-w_{k',LH} \leq 0, \text{ where} \quad (i)$$
$$k \in D_j, k' \in D'_j \backslash \Theta_j \backslash \Phi_j, k' \gg k, \forall j \in J;$$

$$w_{k,LH}+u_{k,LH}+v_{k,LH}+z_{k,LH}-w_{k',LH}-x_{k',i}-y_{k',j'} \leq 0, \text{ where} \quad (ii)$$
$$k \in D_j, k' \in D'_j \cap \Theta_j, k' \gg k, \forall j \in J;$$

$$0 \leq w_{k,LH}+u_{k,LH}+v_{k,LH}+z_{k,LH}-2w_{k',LH}+x_{k',j} \leq 1, \text{ where} \quad (iii)$$
$$k \in D_j, k' \in D'_j \cap \Phi_j, k' \gg k, \forall j \in J;$$

$$0 \leq w_{k,LH}+u_{k,LH}+v_{k,LH}+z_{k,LH}-2w_{k',LH}+y_{k',j} \leq 1, \text{ where} \quad (iv)$$
$$k \in D_j, k' \in D'_j \cap (\Phi_j \backslash \Phi'_j), k' \gg k, \forall j \in J;$$

$$w_{k,LH}+u_{k,LH}+v_{k,LH}+z_{k,LH} - \sum_{t \in T}(w_{k',t}+u_{k',t}+v_{k',t}+z_{k',t}) \leq 0, \quad (v)$$
where
$$k \in D_j, k' \in (D_j \backslash D'_j) \backslash \Theta_j \backslash \Phi_j, k' \gg k, \forall j \in J;$$

$$w_{k,LH}+u_{k,LH}+v_{k,LH}+z_{k,LH} - \quad (vi)$$
$$\sum_{t \in T}(w_{k',t}+u_{k',t}+v_{k',t}+z_{k',t}) - x_{k',i}-y_{k',i} \leq 0, \text{ where}$$
$$k \in D_j, k' \in (D_j \backslash D'_j) \cap \Theta_j, k' \gg k, \forall j \in J;$$

$$0 \leq w_{k,LH}+u_{k,LH}+v_{k,LH}+z_{k,LH} - \quad (vii)$$
$$2\sum_{t \in T}(w_{k',t}+u_{k',t}+v_{k',t}+z_{k',t})+x_{k',j} \leq 1, \text{ where}$$
$$k \in D_j, k' \in (D_j \backslash D'_j) \cap \Phi'_j, k' \gg k, \forall j \in J; \text{ and}$$

$$0 \leq w_{k,LH}+u_{k,LH}+v_{k,LH}+z_{k,LH} - \quad (viii)$$
$$2\sum_{t \in T}(w_{k',t}+u_{k',t}+v_{k',t}+z_{k',t})+y_{k',j} \leq 1, \text{ where}$$
$$k \in D_j, k' \in (D_j \backslash D'_j) \cap (\Phi_j \backslash \Phi'_j), k' \gg k, \forall j \in J;$$

wherein k, k' are employees;
i, i', j, j' are locations;
t are leave types;
J is a set of all locations;
T is a set of all leave types;

$D_j$ is a set of all employees with last half leave requests at location j;

$D'_j$ is a set of all employees whose primary leave request is a last half leave request at location j;

$\Theta_j$ is a set of all employees currently at location j with requests to transfer out of location j;

$\Phi_j$ is a set of all employees with requests to transfer into location j;

$\Phi'_j$ is a set of all employees whose primary transfer request is into location j;

$u_{k,j}$ is a secondary leave request at location j for employee k;

$v_{k,j}$ is a third preference leave request at location j for employee k;

$w_{k,j}$ is a primary leave request at location j for employee k;

$x_{k,j}$ is a primary request for employee k to transfer into location j;

$y_{k,j}$ is a secondary request for employee k to transfer into location j; and $z_{k,j}$ is a fourth preference leave request at location j for employee k.

10. The system of claim 4, wherein said optimization processor is parameter driven and may be executed plural times with different parameter values and configuration settings to generate a variety of solutions from which a user can converge toward an optimal solution.

11. The system of claim 4, wherein said optimization processor is operated with distinct sets of parameter values and configuration settings to determine which of said distinct sets meets staffing requirements in such a way that future staffing levels are not compromised.

12. A method for near real time optimized processing of all employee transfer requests, leave requests, new hire location assignments, and last half period new hire location assignments of an organization in managing employee staffing, which comprises the following steps:

receiving input data including said transfer requests, said leave requests, employee data, parameter values, and configuration settings from a user interface;

creating decision variables from said input data for use in a mixed integer programming model;

generating constraints from said input data such that coefficient values are determined for said decision variables, and constraint sense and right hand values are determined for each of said constraints; and solving said mixed integer programming model to generate awards to employees wherein said awards include at least one of transfer and leave awards based on seniority of the employees and wherein said constraints include the following seniority transfer processing constraints:

$$x_{k,j} - x_{k',j} \leq 0, \ \forall k \in \Phi'_j, \ \forall k' \in \Phi'_j, \ \forall k' >> k, \ \forall j \in J; \qquad (i)$$

$$y_{k,j} - x_{k',j} \leq 0, \ \forall k \in \Phi_j \backslash \Phi'_j, \ \forall k' \in \Phi'_j, \ \forall k' >> k, \ \forall j \in J; \qquad (ii)$$

$$x_{k,j} - x_{k',j} - y_{k',j} \leq 0, \ \forall k \in \Phi'_j, \ \forall k' \in \Phi_j \backslash \Phi'_j, \ \forall k' >> k, \ \forall j \in J; \text{ and} \qquad (iii)$$

$$y_{k,j} - x_{k',j} - y_{k',j} \leq 0, \ \forall k \in \Phi_j \backslash \Phi'_j, \ \forall k' \in \Phi_j \backslash \Phi'_j, \ \forall k' >> k, \ \forall j \in J; \qquad (iv)$$

wherein k, k' are employees;

i, i', j, j' are locations;

j is a set of locations;

$\Phi_j$ is a set of all employees with requests to transfer into location j;

$\Phi'_j$ is a set of all employees primary transfer request is into location j;

$x_{i,j}$ is a primary request for employee k to transfer into location j; and $y_{i,j}$ secondary request for employee k to transfer into location j.

13. The method of claim 12, wherein said awards include only said transfer requests, and the step of solving includes determining new hire location assignments.

14. The method of claim 12, wherein said awards include only said leave requests.

15. The method of claim 12, wherein said awards include both said transfer requests and said leave requests, and the step of solving includes determining said new hire location assignments and said last half period new hire location assignments.

* * * * *

UNITED STATES PATENT AND TRADEMARK OFFICE
CERTIFICATE OF CORRECTION

PATENT NO. : 7,249,047 B2
APPLICATION NO. : 10/045806
DATED : July 24, 2007
INVENTOR(S) : Arguello et al.

It is certified that error appears in the above-identified patent and that said Letters Patent is hereby corrected as shown below:

Claim 6, Column 69, line 12, delete:

" $w_{k,LH} + u_{k,LH} + v_{k,LH} + z_{k,LH} - w_{k',LH} \leq 0$, where (i)"

and replace with

-- $w_{k,FH} + u_{k,FH} + v_{k,FH} + z_{k,FH} - w_{k',FH} \leq 0$, where (i)--

Claim 8, Column 71, lines 7 through 15, delete the first instance of *sections (i) through (iv) (they were repeated)*:

" $w_{k,FH} + u_{k,FH} + v_{k,FH} + z_{k,FH} - w_{k',FH} \leq 0$, where (i)

$k \in C_j, \; k' \in C'_j \setminus \Theta_j \setminus \Phi_j, \; k' >> k, \; \forall j \in J;$ $w_{k,FH} + u_{k,FH} + v_{k,FH} + z_{k,FH} - w_{k',FH} - x_{k',i} - y_{k',i} \leq 0$, where (ii)

$k \in C_j, \; k' \in C'_j \cap \Theta_j, \; k' >> k, \; \forall j \in J;$ $0 \leq w_{k,FH} + u_{k,FH} + v_{k,FH} + z_{k,FH} - 2w_{k',FH} + x_{k',j} \leq 1$, where (iii)

$k \in C_j, \; k' \in C'_j \cap \Phi_j, \; k' >> k, \; \forall j \in J;$ $0 \leq w_{k,FH} + u_{k,FH} + v_{k,FH} + z_{k,FH} - 2w_{k',FH} + y_{k',j} \leq 1$, where (iv)

$k \in C_j, \; k' \in C'_j \cap (\Phi_j \setminus \Phi'_j), \; k' >> k, \; \forall j \in J;$"

UNITED STATES PATENT AND TRADEMARK OFFICE
CERTIFICATE OF CORRECTION

PATENT NO. : 7,249,047 B2
APPLICATION NO. : 10/045806
DATED : July 24, 2007
INVENTOR(S) : Arguello et al.

It is certified that error appears in the above-identified patent and that said Letters Patent is hereby corrected as shown below:

Claim 9, Column 72, line 29 through 40, delete the first instance of *sections (i) through (iv) (they were repeated)*:

"$w_{k,LH} + u_{k,LH} + v_{k,LH} + z_{k,LH} - w_{k',LH} \leq 0$, where (i)

$k \in D_j$, $k' \in D'_j \setminus \Theta_j \setminus \Phi_j$, $k' >> k$, $\forall j \in J$;

$w_{k,LH} + u_{k,LH} + v_{k,LH} + z_{k,LH} - w_{k',LH} - x_{k',i} - y_{k',i'} \leq 0$, where (ii)

$k \in D_j$, $k' \in D'_j \cap \Theta_j$, $k' >> k$, $\forall j \in J$;

$0 \leq w_{k,LH} + u_{k,LH} + v_{k,LH} + z_{k,LH} - 2w_{k',LH} + x_{k',j} \leq 1$, where (iii)

$k \in D_j$, $k' \in D'_j \cap \Phi'_j$, $k' >> k$, $\forall j \in J$;

$0 \leq w_{k,LH} + u_{k,LH} + v_{k,LH} + z_{k,LH} - 2w_{k',LH} + y_{k',j} \leq 1$, where (iv)

$k \in D_j$, $k' \in D'_j \cap (\Phi_j \setminus \Phi'_j)$, $k' >> k$, $\forall j \in J$;"

Signed and Sealed this

Sixteenth Day of October, 2007

JON W. DUDAS
*Director of the United States Patent and Trademark Office*